US012371643B2

(12) United States Patent
Arinsmier et al.

(10) Patent No.: US 12,371,643 B2
(45) Date of Patent: Jul. 29, 2025

(54) AUTOMATIC DISHWASHING DETERGENT WATER-SOLUBLE POUCH

(71) Applicant: The Procter & Gamble Company, Cincinnati, OH (US)

(72) Inventors: Keri Marsh Arinsmier, Mason, OH (US); Lindsay Suzanne Bewick, Whitley Bay (GB); Vania Cristina Croce Mago, Newcastle upon Tyne (GB); Patrick Firmin August Delplancke, Steenhuize-Wijnhuize (BE); Simon Howe, Cincinnati, OH (US); Kirsten Louise McKillop, Cincinnati, OH (US); Elvira Katalin Morris, Gateshead (GB); Lisa Marie Roedig, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/736,624

(22) Filed: Jun. 7, 2024

(65) Prior Publication Data

US 2024/0409852 A1 Dec. 12, 2024

(30) Foreign Application Priority Data

Jun. 7, 2023 (EP) .................................... 23178148

(51) Int. Cl.
*C11D 17/04* (2006.01)

(52) U.S. Cl.
CPC .................................. *C11D 17/045* (2013.01)

(58) Field of Classification Search
CPC .... C11D 17/045; C11D 2111/14; B65D 65/46
See application file for complete search history.

(56) References Cited

U.S. PATENT DOCUMENTS

2002/0086806 A1* 7/2002 Giblin ................ B65D 75/5822 510/296
2009/0233830 A1 9/2009 Dirr
(Continued)

FOREIGN PATENT DOCUMENTS

EP 1375637 A1 * 1/2004 ........... C11D 17/042
EP 1394065 A1 * 3/2004 ............... B65D 1/36
(Continued)

OTHER PUBLICATIONS

All Office Actions; U.S. Appl. No. 18/736,629, filed Jun. 7, 2024.
(Continued)

*Primary Examiner* — Alexander Markoff
(74) *Attorney, Agent, or Firm* — Elizabeth A. Conklin; Carolyn S. Powell

(57) ABSTRACT

An automatic dishwashing detergent water-soluble pouch includes a water-soluble film that forms at least two separate chambers that are enclosed by water-soluble film. The separate chambers are: a first chamber; and a second chamber. The first chamber is connected to the second chamber by a linking portion of water-soluble film, the length of the linking portion of water-soluble film between the first chamber and second chamber is at least 0.5 cm, and the first chamber and second chamber include detergent ingredients.

3 Claims, 1 Drawing Sheet

(56) References Cited

U.S. PATENT DOCUMENTS

| | | | | |
|---|---|---|---|---|
| 2011/0139182 | A1 | 6/2011 | Lapham | |
| 2011/0189413 | A1 | 8/2011 | Denome et al. | |
| 2016/0222325 | A1 | 8/2016 | Letzelter et al. | |
| 2017/0067003 | A1 | 3/2017 | Souter et al. | |
| 2017/0158994 | A1 | 6/2017 | Letzelter | |
| 2018/0057776 | A1 | 3/2018 | Brandt Sanz | |
| 2019/0256801 | A1 | 8/2019 | Krubasik et al. | |
| 2020/0362277 | A1 | 11/2020 | Meier | |
| 2021/0163860 | A1 | 6/2021 | Meier | |
| 2023/0129529 | A1 | 4/2023 | Al-Bayati | |
| 2024/0409852 | A1* | 12/2024 | Arinsmier | C11D 17/045 |
| 2024/0409853 | A1* | 12/2024 | Arinsmier | C11D 3/386 |
| 2024/0409854 | A1* | 12/2024 | Arinsmier | C11D 3/32 |
| 2024/0409855 | A1* | 12/2024 | Arinsmier | C11D 3/33 |
| 2024/0409856 | A1* | 12/2024 | Arinsmier | A47L 15/4409 |
| 2024/0409857 | A1* | 12/2024 | Arinsmier | C11D 3/38618 |
| 2024/0409858 | A1* | 12/2024 | Arinsmier | C11D 3/43 |

FOREIGN PATENT DOCUMENTS

| | | | | |
|---|---|---|---|---|
| EP | 2617659 A1 | | 7/2013 | |
| EP | 3530723 A1 | | 8/2019 | |
| EP | 3599270 A1 | | 1/2020 | |
| WO | 0208371 A2 | | 1/2002 | |
| WO | 0242400 A2 | | 5/2002 | |
| WO | WO-2009098660 A1 | * | 8/2009 | B65D 65/46 |
| WO | 2015118010 A1 | | 8/2015 | |
| WO | 2017013158 A1 | | 1/2017 | |
| WO | 2021001248 A1 | | 1/2021 | |

OTHER PUBLICATIONS

All Office Actions; U.S. Appl. No. 18/736,640, filed Jun. 7, 2024.
All Office Actions; U.S. Appl. No. 18/736,650, filed Jun. 7, 2024.
All Office Actions; U.S. Appl. No. 18/736,657, filed Jun. 7, 2024.
All Office Actions; U.S. Appl. No. 18/736,668, filed Jun. 7, 2024.
All Office Actions; U.S. Appl. No. 18/736,692, filed Jun. 7, 2024.
PCT Search Report and Written Opinion for PCT/US2024/032891 dated Sep. 19, 2024, 14 pages.
EPO Search Report and Opinion for 23178148.5 dated Nov. 8, 2023, 11 pages.
Unpublished U.S. Appl. No. 18/736,629, filed Jun. 7, 2024, to Keri Marsh Arinsmier et al.
Unpublished U.S. Appl. No. 18/736,640, filed Jun. 7, 2024, to Keri Marsh Arinsmier et al.
Unpublished U.S. Appl. No. 18/736,650, filed Jun. 7, 2024, to Keri Marsh Arinsmier et al.
Unpublished U.S. Appl. No. 18/736,657, filed Jun. 7, 2024, to Keri Marsh Arinsmier et al.
Unpublished U.S. Appl. No. 18/736,668, filed Jun. 7, 2024, to Keri Marsh Arinsmier et al.
Unpublished U.S. Appl. No. 18/736,692, filed Jun. 7, 2024, to Keri Marsh Arinsmier et al.

* cited by examiner

AUTOMATIC DISHWASHING DETERGENT WATER-SOLUBLE POUCH

TECHNICAL FIELD

The present disclosure relates to a multi-chambered automatic dishwashing detergent water-soluble pouch. The pouch of the present disclosure enables chemistry to be specifically targeted to the pre-wash stage of an automatic dishwashing cycle as well as the main-wash stage of an automatic dishwashing cycle.

BACKGROUND

Unit dose detergent articles are particularly popular with consumers. The ease of use and consistent performance are two characteristics that consumers find desirable. For automatic dishwashing applications, unit dose detergent articles in water-soluble pouch form are very popular with consumers.

These automatic dishwashing detergent water-soluble pouches comprise an automatic dishwashing detergent composition that is enclosed by a water-soluble film. The pouches are designed to fit into the dispensing drawer of an automatic dishwashing appliance. These dispensing drawers are closed when the automatic dishwashing cycle starts and open at a pre-determined time during the main-washing step of the automatic dishwashing cycle. When the dispensing drawer opens, the pouch is dispensed from the drawer into the washing-zone of the appliance and the detergent chemistry is released and becomes active.

However, prior to the opening of the dispensing drawer, the detergent chemistry contained within the pouch is inactive and provides no benefit to the dishware being cleaned. The automatic dishwashing cycle has multiple steps, many of which occur before the pouch is dispensed from the dispenser drawer. The pre-washing step is one such step that occurs before the pouch is dispensed into the washing-zone of the appliance. During the pre-washing step, water is distributed around the dishware contained in the washing zone of the appliance.

Enabling detergent chemistry to be active in the washing-zone of the appliance prior to the opening of the dispenser drawer would provide opportunities to enhance the performance of the dishwashing-cycle. Doing this in a consumer-friendly manner using a single unit dose detergent article would be an extremely attractive proposition.

The present disclosure meets these needs by providing an automatic dishwashing detergent water-soluble pouch that has a design and structure that allows a portion of the pouch (a first chamber) to be placed into a dispenser drawer, whilst also allowing a portion of the pouch (a second chamber) to hang outside of the dispenser drawer. The two portions (the first chamber and second chamber) are connected to each other by a linking portion of water-soluble film to form a single pouch.

The detergent chemistry contained within the first chamber can access the main-washing step of the dishwashing cycle, whilst the detergent chemistry contained within the second chamber can access the pre-washing step of the dishwashing cycle. This enables a significant improvement in performance of the dishwashing cycle. Furthermore, by linking the two chambers together to form a single pouch, provides a single pouch product proposition that is greatly favored by consumers.

This pouch structure and design also enables the detergent formulator to greatly enhance performance by being able to target specific chemistry into the pre-washing step as well as being able to target specific chemistry into the main-washing step. In addition, the detergent formulator is now able to combine specific pre-wash and main-wash formulation design strategies to further enhance performance.

One formulation strategy is to target bleach chemistry into the pre-wash. Such a strategy can provide improved cleaning performance, especially improved stain removal performance, and more especially improved stain removal for cereal stains and baked cheese stains.

One formulation strategy is to target builder chemistry into the pre-wash. Such a strategy can provide improved shine performance, especially improved shine performance on glass dishware and plastic dishware.

One formulation strategy is to target enzymes into the pre-wash. Such a strategy can provide improved cleaning performance, especially improved stain removal performance, and more especially improved stain removal for baked cheese stains and meat stains.

One formulation strategy is to target polymer chemistry into the pre-wash. Such a strategy can provide improved cleaning performance, especially improved stain removal performance, and more especially improved stain removal for burnt on baked on (BOBO) stains and baked cheese stains.

One formulation strategy is to target solvent chemistry into the pre-wash. Such a strategy can provide improved cleaning performance, especially improved stain removal performance, and more especially improved stain removal for tea stains and baked cheese stains.

SUMMARY

The present disclosure provides an automatic dishwashing detergent water-soluble pouch, wherein the pouch comprises a water-soluble film that forms at least two separate chambers that are enclosed by water-soluble film, the separate chambers are:

(a) a first chamber; and (b) a second chamber, wherein the first chamber is connected to the second chamber by a linking portion of water-soluble film, wherein the length of the linking portion of water-soluble film between the first chamber and 10 second chamber is at least 0.5 cm, preferably at least 1.2 cm, and most preferably at least 1.5 cm, and wherein the first chamber and second chamber comprise detergent ingredients.

DETAILED DESCRIPTION

Automatic Dishwashing Detergent Water-Soluble Pouch

Figure 1:
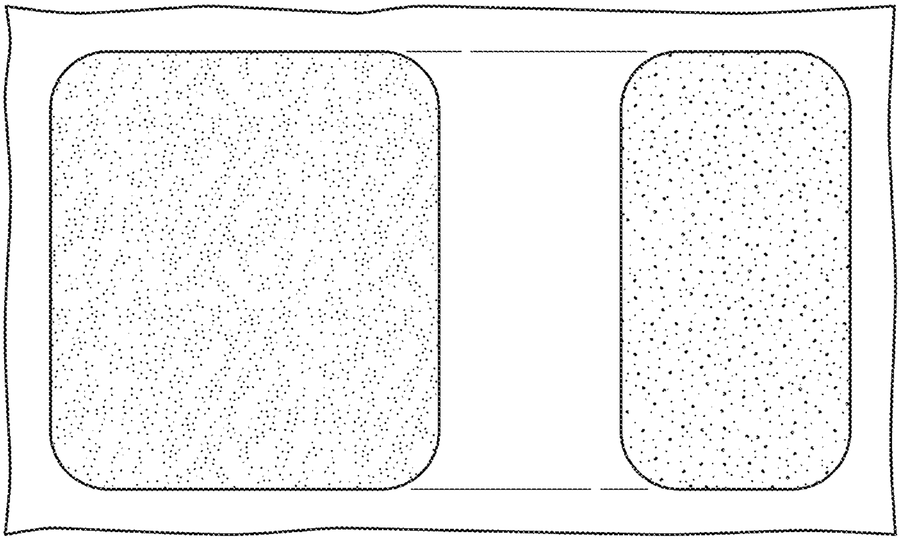
FIGS. 1 and 2 show the automatic dishwashing detergent water-soluble pouch. The first chamber is the left and the second chamber is on the right. The two chambers are connected together by the linking portion of water-soluble film.
Figure 2:
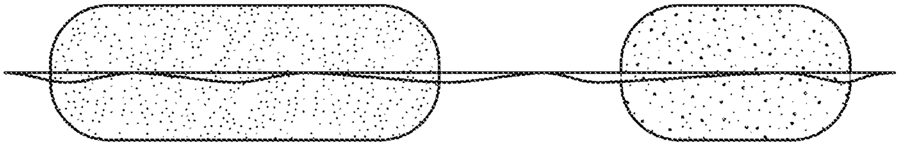

The automatic dishwashing detergent water-soluble pouch comprises a water-soluble film that forms at least two separate chambers that are enclosed by water-soluble film. The separate chambers are:

(a) a first chamber; and (b) a second chamber,

The first chamber is connected to the second chamber by a linking portion of water-soluble film.

The length of the linking portion of water-soluble film between the first chamber and second chamber is at least 0.5 cm.

The first chamber and second chamber comprise detergent ingredients.

Typically, when the pouch is be placed in an automatic dishwashing machine:

(i) the size and shape of the first chamber is suitable for placing in the dispenser drawer of the automatic dishwashing machine such that the dispenser drawer can be closed; and (ii) the size and shape of the linking portion of film and the size and shape of the second chamber is such that the second chamber can hang outside of the dispenser drawer whilst still being connected by the linking portion of film to the first chamber that is in the closed dispenser drawer.

First Chamber Typically, the first chamber has the following dimensions:

(i) a maximum length of from 1.0 cm to 10.0 cm, preferably from 2.0 cm to 6.0 cm;

(ii) a maximum width of from 1.0 cm to 10.0 cm, preferably from 2.0 cm to 5.0 cm; and (iii) a maximum height of from 1.0 cm to 10.0 cm, preferably from 1.0 cm to 3.0 cm.

Typically, the first chamber comprises two or more compartments, or two or more compartments, or three or more compartments, or four or more compartments, or five or more compartments, or six or more compartments, or seven or more compartments.

Typically, the first chamber comprises a solid detergent composition.

Typically, the first chamber comprises a liquid detergent composition.

Typically, the first chamber comprises at least two compartments, wherein the first compartment comprises a solid detergent composition, and wherein the second compartment comprises a liquid detergent composition.

Second Chamber

Typically, the second chamber has the following dimensions:

(i) a maximum length of from 1.0 cm to 10.0 cm, preferably from 2.0 cm to 6.0 cm;

(ii) a maximum width of from 1.0 cm to 10.0 cm, preferably from 1.0 cm to 5.0 cm; and (iii) a maximum height of from 0.1 cm to 10.0 cm, preferably from 0.25 cm to 3.0 cm.

Typically, the second chamber comprises two or more compartments, or two or more compartments, or three or more compartments, or four or more compartments, or five or more compartments, or six or more compartments, or seven or more compartments.

Typically, the second chamber comprises a solid detergent composition.

Typically, the second chamber comprises a liquid detergent composition.

Typically, the second chamber comprises at least two compartments, wherein the first compartment comprises a solid detergent composition, and wherein the second compartment comprises a liquid detergent composition.

The chambers may comprise two or more compartments that are superposed one on top of the other, or that are in side-by-side configuration.

Optional Other Chambers

The pouch may comprise other optional chambers.

The pouch may comprise a third chamber that is enclosed by water-soluble film, wherein the third chamber is connected to a connecting chamber that is the first chamber and/or the second chamber by a second linking portion of water-soluble film, wherein the length of the second linking portion of water-soluble film between the third chamber and the connecting chamber is at least 0.5 cm, and wherein the third chamber comprises a detergent ingredient.

The pouch comprises a fourth chamber, wherein the fourth chamber is connected to a connecting chamber that is the first chamber and/or the second chamber and/or third chamber by a third linking portion of film, wherein the length of the third linking portion of water-soluble film between the fourth chamber and the connecting chamber is at least 0.5 cm, and wherein the fourth chamber comprises a detergent ingredient.

The pouch comprises a fifth chamber, wherein the fifth chamber is connected to a connecting chamber that is the first chamber and/or the second chamber and/or third chamber and/or fourth chamber by a fourth linking portion of film, wherein the length of the fourth linking portion of water-soluble film between the fifth chamber and the connecting chamber is at least 0.5 cm, and wherein the fifth chamber comprises a detergent ingredient.

The length of linking portions of films between these optional other chambers can be at least 0.5 cm, or at least 0.6 cm, or at least 0.8 cm, or at least 1.0 cm, or at least 1.2 cm, or at least 1.5 cm, or at least 2.0 cm, or at least 2.25 cm, or at least 2.5 cm, or at least 2.75 cm, or at least 3.0 cm, or at least 3.5 cm, or at least 3.8. The length is typically measured from the outside edge of the film enclosing one chamber to the outside edge of the film enclosing the other chamber.

Water-Soluble Film

The water-soluble film preferably has a thickness of from 20 to 150 micron, preferably from 35 to 125 micron, or even more preferably from 50 to 110 micron, most preferably about 76 micron.

The water-soluble film is typically soluble or dispersible in water. Preferably, the film has a water-solubility of at least 50%, preferably at least 75% or even at least 95%, as measured by the method set out here after using a glass-filter with a maximum pore size of 20 microns: 5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility (or dispersibility) can be calculated.

The water-soluble film material may be obtained by casting, blow-moulding, extrusion or blown extrusion of the polymeric material, as known in the art.

The water-soluble film preferably comprises polyvinylalcohol (PVA). The polyvinylalcohol may be present between 50% and 95%, preferably between 55% and 90%, more preferably between 60% and 80% by weight of the water-soluble film. The polyvinylalcohol preferably comprises polyvinyl alcohol homopolymer, polyvinylalcohol copolymer, or a mixture thereof. Preferably, the water-soluble film comprises a blend of polyvinylalcohol homopolymers and/or anionic polyvinylalcohol copolymers, preferably wherein the polyvinylalcohol copolymers are selected from sulphonated and carboxylated anionic polyvinylalcohol copolymers especially carboxylated anionic polyvinylalcohol copolymers, most preferably the water-soluble film comprises a blend of a polyvinylalcohol homopolymer and a carboxylated anionic polyvinylalcohol copolymer, or a blend of polyvinylalcohol homopolymers. Alternatively, the polyvinylalcohol comprises an anionic polyvinyl alcohol copolymer, most preferably a carboxylated anionic polyvinylalcohol copolymer. When the polyvinylalcohol in the water-soluble film is a blend of a polyvinylalcohol homopolymer and a carboxylated anionic polyvinylalcohol copolymer, the homopolymer and the anionic copolymer are present in a relative weight ratio of 90/10 to 10/90, preferably 80/20 to 20/80, more preferably 70/30 to 50/50. Without wishing to be bound by theory, the term "homopolymer" generally includes polymers having a single type of monomeric repeating unit (e.g., a polymeric chain comprising or consisting of a single monomeric repeating unit). For the case of polyvinylalcohol, the term "homopolymer" typically further includes copolymers having a distribution of vinyl alcohol monomer units and optionally vinyl acetate monomer units, depending on the degree of hydrolysis (e.g., a polymeric chain comprising or consisting of vinyl alcohol and vinyl acetate monomer units). In the case of 100% hydrolysis, a polyvinylalcohol homopolymer can include only vinyl alcohol units. Without wishing to be bound by theory, the term "copolymer" generally includes polymers having two or more types of monomeric repeating units (e.g., a polymeric chain comprising or consisting of two or more different monomeric repeating units, whether as random copolymers, block copolymers, etc.). For the particular case of polyvinylalcohol, the term "copolymer" (or "polyvinylalcohol copolymer") typically further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain comprising or consisting of vinyl alcohol monomer units, vinyl acetate monomer units, and one or more other monomer units, for example anionic monomer units). In the case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol co-polymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sufoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between 1 mol. % and 10 mol. %, preferably between 2 mol. % and 5 mol. %.

Preferably, the polyvinyl alcohol, and/or in case of polyvinylalcohol blends the individual polyvinylalcohol polymers, have an average viscosity (1) in a range of between 4 mPa·s and 30 mPa·s, preferably between 10 mPa·s and 25 mPa·s, measured as a 4% polyvinyl alcohol polymer solution in demineralized water at 20° C.

The viscosity of a polyvinyl alcohol polymer is typically determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of 30,000 to 175,000, or 30,000 to 100,000, or 55,000 to 80,000.

Preferably, the polyvinyl alcohol, and/or in case of polyvinylalcohol blends the individual polyvinylalcohol polymers, have an average degree of hydrolysis in a range of between 75% and 99%, preferably between 80% and 95%, most preferably between 85% and 95%.

A suitable test method to measure the degree of hydrolysis is as according to standard method JIS K6726.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 molecular weight, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between 5% and 50%, preferably between 10% and 40%, more preferably between 20% and 30% by weight of the film of the non-aqueous plasticizer.

Preferably, the water-soluble film comprises a surfactant. Preferably, the water-soluble film comprises a surfactant in an amount between 0.1% and 2.5%, preferably between 1% and 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably, the water-soluble film comprises lubricants/release agents. Suitable lubricants/release agents include fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film is typically in a range of from 0.02% to 1.5%, preferably from 0.1% to 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include starches, modified starches, crosslinked polyvinylpyrrolidone, crosslinked cellulose, microcrystalline cellulose, silica, metallic oxides, calcium carbonate, talc and mica. Preferred materials are starches, modified starches and silica.

Preferably, the amount of filler, extender, antiblocking agent, detackifying agent or mixture thereof in the water-soluble film is in a range of from 0.1% to 25%, preferably from 1% to 10%, more preferably from 2% to 8%, most preferably from 3% to 5% by weight of the water-soluble film. In the absence of starch, one preferred range for a suitable filler, extender, antiblocking agent, detackifying agent or mixture thereof is from 0.1% to 1%, preferably 4%, more preferably 6%, even more preferably from 1% to 4%, most preferably from 1% to 2.5%, by weight of the water-soluble film.

Preferably the water-soluble film has a residual moisture content of at least 4%, more preferably in a range of from 4% to 15%, even more preferably of from 5% to 10% by weight of the water-soluble film, typically as measured by Karl Fischer titration.

Preferred water-soluble films exhibit good dissolution in cold water, meaning unheated distilled water. Preferably, such water-soluble films exhibit good dissolution at temperatures of 24° C., even more preferably at 10° C. By good dissolution it is typically meant that the water-soluble film exhibits a water-solubility of at least 50%, preferably at least 75% or even at least 95%, as measured by the method set out here after using a glass-filter with a maximum pore size of 20 microns, described above.

Preferred films include those supplied by Monosol under the trade references M8630, M8900, M8779, M8310.

The film may be opaque, transparent or translucent.

The film may comprise a printed area. The area of print may be achieved using standard techniques, such as flexographic printing or inkjet printing. Preferably, the ink used in the printed area comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Preferably, the water-soluble film, and each individual component thereof, independently comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known methods and techniques to determine the dioxane level within water-soluble films and ingredients thereof.

Linking Portion of Film

Typically, the linking portion of film has the following dimensions:

(i) a maximum length of from 0.5 cm to 25 cm, preferably from 2.0 cm to 5.0 cm; and (ii) a maximum width of from 1.0 cm to 10.0 cm, preferably from 1.0 cm to 5.0 cm.

The linking portion of film may comprise at least one hole.

Typically, the length of the linking portion of water-soluble film between the first chamber and second chamber is at least 0.5 cm, or at least 0.6 cm, or at least 0.8 cm, or at least 1.0 cm, or at least 1.2 cm, or at least 1.5 cm, or at least 2.0 cm, or at least 2.25 cm, or at least 2.5 cm, or at least 2.75 cm, or at least 3.0 cm, or at least 3.5 cm, or at least 3.8 or at least. The length is typically measured from the outside edge of the film enclosing the first chamber to the outside edge of the film enclosing the second chamber.

Any solid detergent composition could be hygroscopic. This could enable, for example, the product to be packaged in paper and/or cardboard, by helping to control the moisture profile of the product, and avoiding the need for plastic packaging.

Any solid detergent composition may comprise effervescent technology to aid dissolution. Suitable effervescent technology includes cellulosic disintegrants and acetate.

The particle size of any solid particulate detergent composition can be controlled such that the particles may have larger particle sizes. This could help with the carry over of chemistry contained in the particles, so particles that are dosed into the pre-wash may carry over chemistry into the main wash and even the rinse, and particles that are dosed into the main-wash may carry over chemistry into the rinse.

Detergent Ingredients

Suitable detergent ingredients can be described in terms of systems. The composition typically comprises one or more of an alkalinity system, a bleach system, a builder system, a chelant system, an enzyme system, a polymer system, and a surfactant system. Suitable detergent ingredients can also include other detergent ingredients.

Alkalinity System

The alkalinity system typically achieves the target pH profile of the composition. The pH profile of the composition impacts the cleaning profile of the composition. Alkalinity typically provides soil swelling and soil dispersion performance, as well as providing the optimal pH for other detergent ingredients to work, such as the bleach system, builder system, chelant system and enzyme system.

The composition typically comprises from 1.0 g to 15 g alkalinity system. The amount of alkalinity system is typically determined by the desired pH profile of the composition.

Any suitable source of alkalinity can be used. Suitable sources of alkalinity are organic alkaline ingredients and inorganic alkaline ingredients.

A suitable alkalinity system comprises ingredients selected from carbonate salts, silicate salts, and sources of hydroxide anions.

The composition can comprise from 1.0 g to 15 g carbonate salt.

Preferred carbonate salts are selected from alkali metal salts of carbonate and/or alkaline earth metal salts of carbonate. Preferred carbonate salts are selected from magnesium carbonate, potassium carbonate, sodium carbonate, and any combination thereof, most preferably sodium carbonate.

Preferably, the composition comprises from 1.0 g to 10 g sodium carbonate.

The composition can comprise from 0.1 g to 5.0 g silicate salt.

Preferred silicate salts are selected from alkali metal salts of silicate and/or alkaline earth metal salts of silicate. Preferred silicate salts are selected from magnesium silicate, potassium silicate, sodium silicate, and any combination thereof, most preferably sodium silicate. Preferred sodium silicates have a weight ratio $SiO_2$ to $Na_2O$ ratio of from 1.0:1 to 3.5:1, preferably from 1.5:1 to 2.5:1, most preferably 2.0:1 (sodium disilicate).

Preferably, the composition comprises from 0.1 g to 5.0 g sodium silicate.

The composition may comprise from 0.01 g to 2.0 g source of hydroxide.

Preferred sources of hydroxide are selected from alkali metal hydroxide and/or alkaline earth metal hydroxide. Preferred sources of hydroxide are selected from magnesium hydroxide, potassium hydroxide, sodium hydroxide, and any combination thereof, most preferably sodium hydroxide.

It may be preferred for the second chamber to comprise an alkalinity system.

Bleach System.

Typically, the bleach system provides cleaning and disinfection benefits.

Typically, the composition comprises from 0.1 g to 15 g bleach system.

The bleach system typically comprises a source of peroxygen, often in combination with a bleach activator and/or a bleach catalyst.

Typically, the composition comprises from 0.1 g to 10 g, or from 1.0 g to 8.0 g, or from 2.0 g to 6.0 g source of peroxygen.

Any suitable source of peroxygen can be used. A suitable source of peroxygen is a perhydrate salt, especially alkali metal perhydrate salts and/or alkaline earth metal perhydrate salts, preferably alkali metal perhydrate salts. Suitable perhydrate salts are selected from perborate salt, percarbonate salt, perphosphate salt, persilicate salt, persulfate salt and any combination thereof.

The perhydrate salt may be a crystalline solid without additional protection. Alternatively, the perhydrate salt can be coated. Suitable coatings are selected from sodium carbonate, sodium silicate, sodium sulphate, and any combination thereof.

A preferred perhydrate salt is an alkali metal percarbonate, especially preferred is sodium percarbonate. The percarbonate is preferably in a coated form. The coating provides in-product stability.

The composition may comprise from 1.0 g to 10 g, or from 2.0 g to 6.0 g sodium percarbonate.

Another suitable source of peroxygen is a pre-formed peracid. A preferred pre-formed peracid is phthalimidoperoxycaproic acid (PAP).

The composition may comprise from 0.1 g to 5.0 g phthalimidoperoxycaproic acid (PAP).

The composition may comprise a bleach activator. The composition may comprise from 0.05 g to 2.0 g, preferably from 0.1 g to 2.0 g, bleach activator. Any suitable bleach activator can be used. Bleach activators are typically used to enhance the bleaching performance at temperatures of 60° C. and below.

A suitable bleach activator is an organic peracid precursor. Suitable bleach activators are compounds which, under perhydrolysis conditions, give aliphatic peroxycarboxylic acids having preferably from 1 to 12 carbon atoms, in particular from 2 to 10 carbon atoms, and/or optionally substituted perbenzoic acid. Suitable bleach activators comprise O-acyl and/or N-acyl groups of the number of carbon atoms specified and/or optionally substituted benzoyl groups. Preferred bleach activators are polyacylated alkylenediamines. A highly preferred bleach activator is tetraacetylethylenediamine (TAED).

The composition may comprise from 0.05 g to 2.0 g, preferably from 0.1 g to 2.0 g, tetraacetylethylenediamine (TAED).

The composition may comprise a bleach catalyst. The composition may comprise from 0.1 mg to 20 mg, preferably from 0.5 mg to 10 mg, bleach catalyst. Any suitable bleach catalyst can be used.

Suitable bleach catalysts are metal-containing bleach catalysts, preferably transition-metal-containing bleach catalysts. Preferred transition-metal-containing bleach catalysts are selected from cobalt-containing bleach catalysts, iron-containing bleach catalysts, manganese-containing bleach catalysts, and any combination thereof.

Suitable manganese-containing bleach catalysts comprise manganese in an oxidation state of (II), (III), (IV), (v), or any combination thereof, preferably (IV).

Suitable manganese-containing bleach catalyst includes manganese triazacyclononane and related complexes, such as 1,4,7-triazacyclononane (TACN).

Suitable manganese-containing bleach catalysts are dinuclear manganese-complexes having the general formula:

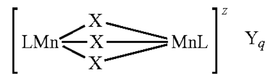

wherein Mn is manganese which can individually be in the III or IV oxidation state; each x represents a coordinating or bridging species selected from the group consisting of H2O, O22-, O2-, OH—, HO2-, SH—, S2-, >SO, Cl—, N3-, SCN—, RCOO—, NH2- and NR3, with R being H, alkyl or aryl, (optionally substituted); L is a ligand which is an organic molecule containing a number of nitrogen atoms which coordinates via all or some of its nitrogen atoms to the manganese centres; z denotes the charge of the complex and is an integer which can be positive or negative; Y is a monovalent or multivalent counter-ion, leading to charge neutrality, which is dependent upon the charge z of the complex; and q=z/[charge Y]

Preferred manganese-containing bleach catalysts are those wherein x is either $CH_3COO^-$ or $O^2$ or mixtures thereof, most preferably wherein the manganese is in the IV oxidation state and x is $O^{2-}$. Preferred ligands are those which coordinate via three nitrogen atoms to one of the manganese centres, preferably being of a macrocyclic nature. Particularly preferred ligands are:

(1) 1,4,7-trimethyl-1,4,7-triazacyclononane, (Me-TACN); and (2) 1,2,4,7-tetramethyl-1,4,7-triazacyclononane, (Me-Me TACN).

The type of counter-ion Y for charge neutrality is not critical for the activity of the complex and can be selected from, for example, any of the following counter-ions: chloride; sulphate; nitrate; methylsulphate; surfactant anions, such as the long-chain alkylsulphates, alkylsulphonates, alkylbenzene-sulphonates, tosylate, trifluoromethylsulphonate, perchlorate ($ClO_4^-$), $BPh_4^-$, and $PF_6^-$' though some counter-ions are more preferred than others for reasons of product property and safety.

Consequently, the preferred manganese-containing bleach catalysts are:

(I) [(Me-TACN)$Mn^{IV}$(Âμ-0)$_3$$Mn^{IV}$(Me-TACN)]$^{2+}$($PF_6^-$)$_2$ (II) [(Me-MeTACN)$Mn^{IV}$(Âμ-0)$_3$$Mn^{IV}$(Me-MeTACN)]$^{2+}$ ($PF_6^-$)$_2$ (III) [(Me-TACN)$Mn^{III}$(Âμ-0)(Âμ-OAc)$_2$$Mn^{III}$(Me-TACN)]$^{2+}$($PF_6^-$)$_2$ (IV) [(Me-MeTACN)$Mn^{III}$(Âμ-0)(Âμ-OAc)$_2$$Mn^{III}$(Me-MeTACN)]$^{2+}$($PF_6^-$)$_2$ which hereinafter may also be abbreviated as:

(I) [$Mn^{IV}_2$(Âμ-0)$_3$(Me-TACN)$_2$] ($PF_6$)$_2$ (II) [$Mn^{IV}_2$(Âμ-0)$_3$(Me-MeTACN)$_2$] ($PF_6$)$_2$ (III) [$Mn^{III}_2$(Âμ-0) (Âμ-OAc)$_2$(Me-TACN)$_2$] ($PF_6$)$_2$ (IV) [$Mn^{III}_2$(Âμ-0) (Âμ-OAc)$_2$(Me-TACN) 2]($PF_6$)$_2$

The structure of I is given below:

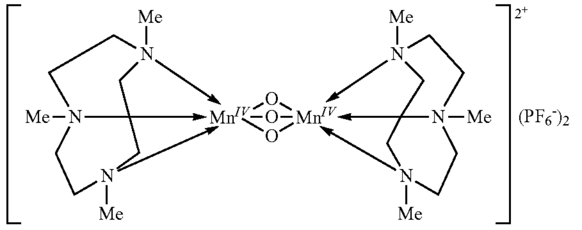

abbreviated as [$Mn^{IV}_2$(Âμ-0)$_3$(Me-TACN)$_2$] ($PF_6$)$_2$.

The structure of II is given below:

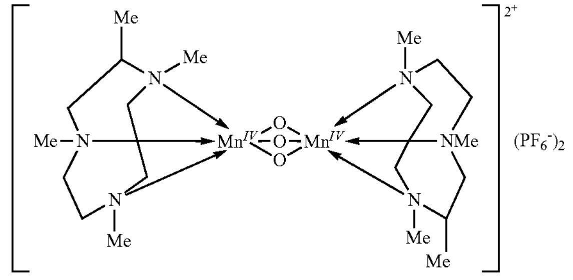

abbreviated as [$Mn^{IV}_2$(Âμ-0)$_3$(Me-MeTACN)$_2$] ($PF_6$)$_2$.

The composition may comprise from 0.1 mg to 20 mg, preferably from 0.5 mg to 10 mg, transition-metal-containing bleach catalyst. The composition may comprise from 0.1 mg to 20 mg, preferably from 0.5 mg to 10 mg, cobalt-containing bleach catalyst. The composition may comprise from 0.1 mg to 20 mg, preferably from 0.5 mg to 10 mg, iron-containing bleach catalyst. The composition may comprise from 0.1 mg to 20 mg, preferably from 0.5 mg to 10 mg, manganese-containing bleach catalyst.

Builder System

The composition may comprise from 1.0 g to 15 g builder system.

The builder system typically comprises detergent ingredients that are complexing agents. Suitable builder complexing agents are capable of sequestering hardness cations, especially calcium cations and/or magnesium cations.

Typically, the builder system controls the hardness of the wash liquor, which in turn aids the cleaning performance and soil suspension performance of the composition. The builder system can also extract calcium and magnesium cations from the soil, which also improves the cleaning performance of the composition.

Any suitable builder complexing agent can be used. Suitable builder complexing agents may also be able to complex other cations, such as transition metal cations.

A preferred builder complexing agent is selected from aminopolycarboxylic acids and/or salts thereof, carboxylic acids and/or salts thereof, and any combination thereof.

Suitable aminopolycarboxylic acids and/or salts thereof are selected from methylglycine-N,N-diacetic acid and/or salts thereof (MGDA), glutamic acid diacetic acid and/or salts thereof (GLDA), iminodisuccinic acid and/or salts thereof (IDS); hydroxyethyleiminodiacetic acid and/or salts thereof (HEIDA), and any combination thereof, preferably methylglycine-N,N-diacetic acid and/or salts thereof (MGDA) and/or glutamic acid diacetic acid and/or salts thereof (GLDA), most preferably methylglycine-N,N-diacetic acid and/or salts thereof (MGDA). A suitable builder complexing agent is the tri-sodium salt of methylglycine-N,N-diacetic acid.

A suitable aminopolycarboxylic acid and/or salts thereof is ethylene diamine disuccinic acid and/or salts thereof (EDDS).

Suitable carboxylic acids and/or salts thereof can be dicarboxylic acids and/or salts thereof, such as glucaric acid and/or salts thereof, itaconic acid and/or salts thereof, maleic acid and/or salts thereof, succinic acid and/or salts thereof, tartaric acid and/or salts thereof, and any combination thereof.

Suitable carboxylic acids and/or salts thereof can be tricarboxylic acids and/or salts thereof, A suitable carboxylic acid and/or salts thereof is citric acid and/or salts thereof. A suitable builder complexing agent is sodium citrate.

The composition may comprise a builder complexing agent selected from methylglycine-N,N-diacetic acid and/or salts thereof (MGDA) and/or citric acid and/or salts thereof. The composition may comprise the combination of methylglycine-N,N-diacetic acid and/or salts thereof (MGDA) and/or citric acid and/or salts thereof.

The composition may comprise from 1.0 g to 15 g methylglycine-N,N-diacetic acid and/or salts thereof (MGDA).

The composition may comprise from 1.0 g to 15 g citric acid and/or salts thereof.

Chelant System

The composition may comprise from 0.1 g to 5.0 g chelant system.

The chelant system typically comprising chelating agents. Suitable chelating agents can chelate transition metal cations, especially copper, iron and zinc.

Typically, the chelant system stabilizes the bleaching system by protecting the bleach from transition metal cation degradation. The chelant system can also extract transition metal cations from soils, such as tea soils.

Any suitable chelating agent can be used. Suitable chelating agents may also be able to complex other cations, such as hardness cations like calcium and magnesium.

Suitable chelating agents are selected from phosphonic acids and/or salts thereof. Phosphonic acids and/or salts thereof typically provide crystal growth inhibition performance.

A preferred phosphonic acid and/or salts thereof is selected from: amino trimethyl phosphonic acid and/or salts thereof (ATMP), diethylene triamine pentamethylene phosphonic acid and/or salts thereof (DTMP), 1-hydroxy ethylidene-1,1 diphosphonic acid and/or salts thereof (HEDP), 2-phosphono 1,2,4-butane tricarboxylic acid and/or salts thereof (PBTC), and any combination thereof, preferably 1-hydroxy ethylidene-1,1 diphosphonic acid and/or salts thereof (HEDP). A suitable chelating agent is the tetrasodium salt of 1-hydroxy ethylidene-1,1 diphosphonic acid.

The composition may comprise from 0.1 g to 5.0 g chelating agent. The composition may comprise from 0.1 g to 1.5 g 1-hydroxy ethylidene-1,1 diphosphonic acid and/or salts thereof (HEDP).

Enzyme System

The composition may comprise from 1.0 g to 400 mg enzyme system.

The enzyme system provides cleaning benefits.

The enzyme typically comprises an enzyme selected from amylase, cellulase, lipase, protease and any combination thereof. Preferably, the enzyme system comprises an amylase and/or a protease.

The composition typically comprises, on an active enzyme basis, from 1.0 mg to300 mg of each enzyme type included in the composition.

The composition may comprise, on an active enzyme basis, from 10.0 mg to 300 mg protease and from 2.0 mg to 30 mg amylase.

Suitable enzymes can be in the form of granulates. Suitable enzyme granulates comprise less than 29 wt % of sodium sulphate. Suitable granulates comprise sodium sulphate in an amount such that the weight ratio of the sodium sulphate and enzyme (on an active enzyme basis) is less than 4:1.

In describing enzymes, the following nomenclature is used for ease of reference: Original amino acid(s): position(s):substituted amino acid(s). Standard enzyme IUPAC 1-letter codes for amino acids are used.

Identity

Percent sequence “identity” means that a particular sequence has at least a certain percentage of amino acid residues identical to those in a specified reference sequence, when aligned using sofware programs such as the CLUSTAL W algorithm with default parameters. See Thompson et al. (1994) Nucleic Acids Res. 22:4673-4680. Default parameters for the CLUSTAL W algorithm are:

Gap opening penalty: 10.0
Gap extension penalty: 0.05
Protein weight matrix: BLOSUM series
DNA weight matrix: IUB
Delay divergent sequences %: 40
Gap separation distance: 8
DNA transitions weight: 0.50
List hydrophilic residues: GPSNDQEKR
Use negative matrix: OFF
Toggle Residue specific penalties: ON
Toggle hydrophilic penalties: ON
Toggle end gap separation penalty OFF Deletions are counted as non-identical residues, compared to a reference sequence.

Amylase

Suitable amylases include alpha-amylases. Suitable amylases are from bacterial or fungal origin.

A preferred alkaline alpha-amylase is derived from a strain of *Bacillus*, such as *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512 or NCIB 12513.

A preferred amylase is a variant of *Bacillus* sp. DSM12651.

A preferred amylase is a variant of *Bacillus* sp. DSM12651 amylase and has at least 90%, or at least 95%, or even at least 99% identity to the *Bacillus* sp. DSM12651 amylase wildtype sequence.

A preferred amylase is a variant of *Bacillus* sp. DSM12651 amylase and has one or more, or two or more, or three or more, or four or more, or five or more, or even six or more mutations at the following positions:

1, 2, 7, 9, 11, 16, 19, 25, 37, 43, 48, 54, 56, 58, 59, 60, 63, 81, 84, 86, 90, 98, 104, 109, 111, 113, 116, 118, 125, 127, 130, 132, 133, 134, 135, 136, 139, 142, 144, 149, 158, 160, 163, 167, 169, 170, 171, 172, 173, 174, 175, 176, 178, 181, 182, 186, 187, 195, 202, 203, 204, 206, 209, 210, 212, T227, 235, 238, 246, 256, 259, 264, 265, 266, 267, 269, 270, 272, 273, 274, 275, 276, 284, 286, 291, 293, 295,298, 299, 302, 303, 304, 306, 310, 311, 314, 315, 317, 319, 320, 323, 328, 337, 339, 345, 357, 365, 377, 375, 385, 391, 395, 400, 406, 408, 410, 431, 435, 439, 444, 445, 458, 465, 466, 469, 473, 476, and 481.

A preferred amylase is a variant of *Bacillus* sp. DSM12651 amylase and has one or more, or two or more, or three or more, or four or more, or five or more, or even six or more mutations selected from the following mutations:

H1*; H2*, G7A; I9M; Q11H; N16E; N16H; N16Y; N19D; N25K N25M; N25T; A37V; W43Y; W48Y; N54Q; N54S; V56I; V56T; Y58F; G59A; A60S; A60T; L63F; T81A; E84Q; E86 L; R90H; R90N; R90Q; Q98N; V104A; G109A; A111IT; F113A; F113G; F113N; F113Q; F1 13T; F1 13Y; R116C; R116D; R116F; R116H; R116K; R116N; R116S; R116Y; Q118N; Q118T; Q125G; Q125S; R127A; R127F; R1271; R127 L; R127N; R127T; E130D; E130F; E130I; E130K; E130 L; E130N; E130S; E130T; E130V; S132A; S132D; S132F; S132 L; S132M; S132P; S132T; G133D; T134C; T134E; T134N: T134P; T134R; T134S; T 134 W: T134Y; T134A; Y135H; Q136D; Q136E; Q136G; Q136N; Q136R; Q136S; A139T; G142H; N144H; G149A; R158C; R158H: R158K; R158Q; R158S; Y160D; Y160F; T160H; Y160N; D163H; W167*; Q169*; Q169E; Q169F; S170*; S170A; R171*; R171H; R171K; R171 L; R171Y; Q172*; Q172K; Q172N; Q172S; L173*; L173K; A174*; A174N; A174S; N175*; N175S; R176*; R176A; Y178F; R181*; R181A; R181C; R181 E; R181G; R181H; R181K; R181 N; R181 Q; G182*; G1182T; A186D; A186E; A186H; A186K; A186N; A186T; W187M; N195D; N195F; N195H; N195Q; N195Y; M202 L; Y203 L; A204V; V206 L; D209N; H210K; H210N; E212D; T227K; T227N; L2351; V238A; M2461; M246 L; M246T; M246V; Q256H; Q256N: K259G; K259H; V264A; V2461; V264T; A265G; E266V; Y267F; Y267H; Y267 L; K269M; K269Q; K269R; N270G; N270P; L2721; G273V; A274K; A274S; L275A; 12751: L275V; E276N; W284R; W284Y; M286 L; V291A; V291 I; V291T; L2931; L293V Y295F; Y298E; Y298N; Q299N; Q299Y; N302A; N302H; N302K; N302Q; S3030; S304G; S304Q; N3061-H; N306K; N306Q; N306R; N306Y; R310N; R310S; R310Q; N311K; N311R; N314Q; G315N; L317V; Q319H; R320K; R320Q; R320S; S323T; 11323K; F328 L; G337D; 0337E; A339S; Q345N; Q345R; L357F; Q365A; Q365C; Q365E; Q365I; Q365K; Q365M; Q365S; P377K; P377T; D375H; D375N; D375Y; Q386 L; K391A: Q395K: R400S: D40611; W408H: V4101: S431F: G4435C; W439R; W439T; R444T; Q445S; R458K; N465G; Q466S; W469N; W469Y; F4731; F473P; F473S; G476K; and V481A.

A preferred amylase is a variant of *Bacillus* sp. DSM 12649 amylase.

A preferred amylase is a variant of *Bacillus* sp. DSM 12649 amylase and has at least 90%, or at least 95%, or even at least 99% identity to the *Bacillus* sp. DSM 12649 amylase wildtype sequence.

A preferred amylase is a variant of *Bacillus* sp. DSM 12649 amylase and has one or more, or two or more, or three or more, or four or more, or five or more, or even six or more mutations at the following positions:

3, 6, 9, 10, 11, 26, 30, 33, 37, 82, 37, 106, 118, 128, 133, 149, 150, 160, 167, 178, 182, 186, 193, 195, 202, 203, 210, 214, 231, 232, 246, 256, 257, 258, 269, 270, 272, 283, 295, 296, 298, 299, 303, 304, 305, 311, 314, 315, 318, 319, 320, 323, 339, 345, 361, 366, 378, 383, 419, 421, 437, 441, 444, 445, 446, 447, 450, 458, 461, 471, 482, and 484, preferably that also contain the deletions of 183* and/or 184*.

A preferred amylase is a variant of *Bacillus* sp. AA2560 amylase.

A preferred amylase is a variant of *Bacillus* sp. AA2560 amylase and has at least 90%, or at least 95%, or even at least 99% identity to the *Bacillus* sp. AA2560 amylase wildtype sequence.

A preferred amylase is a variant of *Bacillus* sp. AA2560 amylase and has one or more, or two or more, or three or more, or four or more, or five or more, or even six or more mutations at the following positions:

6, 7, 40, 51, 91, 96, 98, 100, 116, 125, 172, 227, 229, 230, 231, 244, 262, 263, 281, 285, 286, 287, 288, 322, 323, 324, 325, 362, 363, and 364, and may preferably also contain the deletions of D183* and/or G184*.

A preferred amylase is a variant of *Bacillus* sp. AA2560 amylase.

A preferred amylase is *Bacillus* sp. SP707 amylase or a variant thereof.

A preferred amylase is *Bacillus* sp. SP707 amylase or a variant thereof, and has at least 90%, or at least 95%, or even at least 99% identity to the *Bacillus* sp. SP707 amylase wildtype sequence.

A preferred amylase is a variant of *Bacillus* sp. NCIB12513 amylase.

A preferred amylase is a variant of *Bacillus* sp. NCIB12513 amylase and has at least 90%, or at least 95%, or even at least 99% identity to the *Bacillus* sp. NCIB12513 amylase wildtype sequence.

A preferred amylase is a variant of *Bacillus* sp. NCIB12513 amylase and has one or more, or two or more, or three or more, or four or more, or five or more, or even six or more mutations at the following positions:

1, 7, 109, 140, 181, 182, 183, 184, 195, 206, 243, 260, 280, 284, 304, 320, 323, 391 and 476.

Suitable commercially available alpha-amylases include: KEMZYM® (AT 9000 Biozym Biotech Trading GmbH Wehlistrasse 27b A-1200 Wien Austria); ENZYSIZE®, OPTISIZE HT PLUS®, PURASTAR®, PURASTAR OXAM®, and RAPIDASE®, (Genencor International Inc., Palo Alto, California); KAM® (Kao, 14-10 Nihonbashi Kayabacho, 1-chome, Chuo-ku Tokyo 103-8210, Japan); BAN®, DURAMYL®, FUNGAMYL®, LIQUEZYME®, NATALASE®, POWERASE®, STAINZYME®, STAINZYME PLUS®, SUPRAMYL®, TERMAMYL®, and TERMAMYL ULTRA® (Novozymes A/S, Bagsvaerd, Denmark); and any combination thereof.

Preferred amylases include NATALASE®, POWERASE®, STAINZYME®, STAINZYME PLUS®, and any combination thereof.

Cellulase

Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Fusarium oxysporum*, and *Myceliophthora thermophila.*

Commercially available cellulases include: Biotouch® series of enzymes (AB Enzymes); Revitalenz® series of enzymes (Du Pont); Carezyme®, Carezyme® Premium, Celluclean®, Celluzyme® and Whitezyme® (Novozymes A/S); and any combination thereof.

Suitable commercially available cellulases include Celluclean® Classic and/or Carezyme® Premium.

Lipase

Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

A suitable lipase is a variant of the wild-type lipase from *Thermomyces lanuginosus*, preferably comprising T231R and/or N233R mutations. Preferred lipases include those sold under the tradenames Lipex®, Lipoclean®, and Lipolex® by Novozymes, Bagsvaerd, Denmark.

Other suitable lipases include Liprl 139 and/or TfuLip2.

Protease

Suitable proteases include metalloproteases and serine proteases. Suitable proteases include neutral or alkaline microbial serine proteases, such as subtilisins, as well as chemically or genetically modified variants thereof.

Suitable proteases include proteases derived from *Bacillus*. Suitable proteases include variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

A preferred protease is a variant of *Bacillus gibsonii* protease. A preferred protease is a variant of *Bacillus gibsonii* Bgi02446 protease or a variant of *Bacillus gibsonii* DSM14391 protease.

A preferred protease is a variant of *Bacillus gibsonii* Bgi02446 protease.

A preferred protease is a variant of *Bacillus gibsonii* Bgi02446 protease and has at least 90%, or at least 95%, or even at least 99% identity to the *Bacillus gibsonii* Bgi02446 protease wildtype sequence.

A preferred protease is a variant of *Bacillus gibsonii* Bgi02446 protease and has one or more, or two or more, or three or more, or four or more, or five or more, or even six or more mutations at the following positions:

1, 3, 4, 8, 9, 10, 12, 14, 15, 16, 17, 18, 19, 20, 21, 24, 25, 26, 33, 36, 37, 39, 42, 43, 44, 47, 51, 52, 54, 55, 56, 57, 59, 60, 66, 69, 73, 74, 76, 80, 82, 83, 84, 85, 86, 87, 88, 89, 91, 95, 96, 97, 99, 101, 102, 104, 105, 106, 107, 108, 109, 110, 112, 113, 114, 115, 116, 118, 120, 122,124, 126, 127, 128, 129, 131, 133, 135, 136, 137, 138, 139, 141, 142, 143, 144, 145, 147, 148, 150, 156, 157, 158, 159, 160, 161, 164, 166, 167, 170, 174, 176, 177, 178, 179, 180, 182, 186, 188, 189, 190, 191, 192, 193, 198, 199, 200, 203, 207, 209, 210, 211, 212, 216, 218, 227, 228, 230, 231, 232, 234,236, 238, 239, 242, 245, 246, 247, 249, 250, 253,254, 255, 256, 257, 259, 262, 263, 264, 265, 266, 268, and 269.

A preferred protease is a variant of *Bacillus gibsonii* DSM14391 protease.

A preferred protease is a variant of *Bacillus gibsonii* DSM14391 protease and has at least 90%, or at least 95%, or even at least 99% identity to the *Bacillus gibsonii* DSM14391 protease wildtype sequence.

A preferred protease is a variant of *Bacillus gibsonii* DSM14391 protease and has one or more, or two or more, or three or more, or four or more, or five or more, or even six or more mutations at the following positions:

12, 43, 122, 127, 154, 156, 160, 211, 212, and 222.

A preferred protease is a variant of *Bacillus alcalophilus* protease.

A preferred protease is a variant of *Bacillus alcalophilus* protease and has at least 90%, or at least 95%, or even at least 99% identity to the *Bacillus alcalophilus* protease wildtype sequence.

A preferred protease is a variant of *Bacillus alcalophilus* protease and has one or more, or two or more, or three or more, or four or more, or five or more, or even six or more mutations at the following positions:

87, 99, 116, 118, 126, 127, 128, 129, and 130.

A preferred protease is a variant of *Bacillus lentus* protease.

A preferred protease is a variant of *Bacillus lentus* protease and has at least 90%, or at least 95%, or even at least 99% identity to the *Bacillus lentus* protease wildtype sequence.

A preferred protease is a variant of *Bacillus lentus* protease and has one or more, or two or more, or three or more, or four or more, or five or more, or even six or more mutations at the following positions:

9, 15, 27, 66, 74, 76, 85, 99, 101, 103, 104, 116, 123, 126, 127, 128, 159, 212, 232, 236, 239, 245, 248, 252, and 274.

Suitable commercially available protease enzymes include those sold under the trade names Savinase®, Polarzyme®, Kannase®, Ovozyme®, Everlase® and Esperase® by Novozymes A/S (Denmark), those sold under the tradename Properase®, Purafect®, Purafect Prime®, Purafect Ox®, FN3®, FN4®, Excellase®, Ultimase® and Purafect OXP® by Genencor International, those sold under the tradename Opticlean® and Optimase® by Solvay Enzymes, those available from Henkel/Kemira, namely BLAP, and any combination thereof.

Other Enzymes

Other suitable enzymes are bleaching enzymes. Preferred bleaching enzymes are peroxidases/oxidases. Typical bleaching enzymes include those of plant, bacterial or fungal origin, and variants thereof. Commercially available peroxidases include Guardzyme® (Novozymes A/S).

Other suitable bleaching enzymes include choline oxidases and/or perhydrolases.

Suitable enzymes include sugar degrading enzymes. Suitable enzymes include glycosyl hydrolase. A suitable enzyme is selected from glucanase, hemicellulase, mannanase, xylanase, and any combination thereof.

Suitable mannanases are sold under the tradenames Mannastar® (Du Pont) and

Mannaway® (Novozymes A/S, Bagsvaerd, Denmark).

Suitable enzymes include pectate lyases. Suitable pectate lyases are sold under the tradenames PrimaGreen® (DuPont) and X-Pect®, Pectaway® (from Novozymes A/S, Bagsvaerd, Denmark).

A suitable enzyme is phospholipase.

Polymer System

The composition may comprise from 0.1 g to 5.0 g, or from 0.5 g to 2.0 g polymer system.

The polymer system can act as soil dispersant as well, as a co-builder to help complex hardness cations such as calcium and magnesium.

The polymer system typically comprises polymers. Suitable polymers are selected from modified polyamine polymers, modified polysaccharide polymers, polyalkylene oxide polymers, polycarboxylate polymers, silicone polymers, terephthalate polymers, other polyester polymers, and any combination thereof.

Preferably, the polymer system comprises polymers selected from polyamine polymers, modified polysaccharide polymers, polyalkylene oxide polymers, polycarboxylate polymers, and any combination thereof, most preferably, polycarboxylate polymers.

The composition may comprise from 0.1 g to 5.0 g, or from 0.5 g to 2.0 g polycarboxylate polymers.

Modified Polyamine Polymers

Suitable modified polyamine polymers comprise a polyamine core structure and a plurality of alkoxylate groups attached to the core structure. The polyamine core structure includes polyalkyleneimine, and linear or branched oligoamine.

The polyamine core structure and the alkoxylate groups attached to the core structure can be further derivatized. For example, the polyamine core structure can be further partly or completely quaternized with $C_1$-$C_{30}$ linear or branched alkyl, more preferably $C_1$-$C_{10}$ or even $C_1$-$C_5$ linear or branched alkyl, most preferably methyl. The alkoxylate group can be further sulphated, sulphonated and/or substituted with an amino functional group.

Suitable modified polyamine dispersing agent includes ethoxylated polyethyleneimine (EPEI). EPEI are effective dispersing agent for hydrophilic stains, especially hydrophilic particulate stain such as clay.

Preferably, the EPEI comprises a polyethyleneimine backbone having weight average molecular weight of between 100 g/mol and 2000 g/mol, preferably between 200 g/mol and 1500 g/mol, more preferably between 300 g/mol and 1000 g/mol, even more preferably between 400 g/mol and 800 g/mol, most preferably between 500 g/mol and 700 g/mol, preferably about 600. The ethoxylation chains within the EPEI may be from 200 g/mol to 2000 g/mol weight average molecular weight, preferably from 400 g/mol to 1500 g/mol weight average molecular weight, more preferably from 600 g/mol to 1000 g/mol weight average molecular weight, most preferably about 880 g/mol weight average molecular weight per ethoxylated chain. The ethoxylation chains within the EPEI have on average 5 to 40, preferably 10 to 30, more preferably 15 to 25, even more preferably 18 to 22, most preferably about 20 ethoxy units per ethoxylation chain. The EPEI may have a total weight average molecular weight of from 5000 g/mol to 20000 g/mol, preferably from 7500 g/mol to 17500 g/mol, more preferably from 10000 g/mol to 15000 g/mol, even more preferably from 12000 g/mol to 13000 g/mol, most preferably about 12700 g/mol. A preferred example is polyethyleneimine core (with average molecular weight about 600 g/mol) ethoxylated to 20 EO groups per NH. Suitable EPEI this type includes Sokalan HP20 available from BASF, Lutensol FP620 from BASF. Examples of available polyethyleneimine ethoxylates also include those prepared by reacting ethylene oxide with Epomine SP-006 manufactured by Nippon Shokubai.

The EPEI may comprise polyethyleneimine having an average molecular weight (Mw) ranging from 1800 to 5000 g/mol (prior to ethoxylation), and the polyoxyethylene side chains may have an average of from 25 to 40 ethoxy units per side chain bonded to the polyethyleneimine backbone.

Suitable modified polyamine polymers include amphiphilic alkoxylated polyalkyleneimine polymer. These polymers have balanced hydrophilic and hydrophobic properties such that they remove grease and body soil particles from surfaces, and keep the particles suspended in washing liquor. Suitable amphiphilic water-soluble alkoxylated polyalkyleneimine polymers comprise polyalkyleneimine core, preferable polyethyleneimine core, and alkoxylate group connected to the core. Suitable alkoxylate groups have the structure:

$$*\text{-}[A^2\text{-}O]_m—[CH_2—CH_2—O]_n\text{-}[A^3\text{-}O]_p—R \qquad (V)$$

wherein:

"*" in each case denotes one-half of bond to the nitrogen atom of the core.

$A^2$ is in each case independently selected from 1,2-propylene, 1,2-butylene, and 1,2-isobutylene.

$A^3$ is 1,2-propylene.

R is in each case independently selected from hydrogen and $C_1$-$C_4$-alkyl, preferably hydrogen.

m has an average value in the range of from 0 to 2, preferably 0.

n has an average value in the range of 5 to 50.

p has an average value in the range of 3 to 50.

Suitable alkoxylated polyalkyleneimine polymers have a degree of quaterization ranging from 0 to 50, preferably from 0 to 20, and more preferably from 0 to 10.

A preferred alkoxylated polyalkyleneimine polymer is polyethyleneimine (MW=600) modified with 24 ethoxylate groups per —NH and 16 propoxylate groups per —NH. Another preferred alkoxylated polyalkyleneimine polymer is polyethyleneimine (MW=600) modified with 10 ethoxylate groups per —NH and 7 propoxylate groups per —NH.

Suitable alkoxylated polyalkyleneimine polymers include Sokalan HP30 Booster available from BASF.

Suitable modified polyamine polymers includes zwitterionic polyamines. Suitable zwitterionic polyamines have the structure:

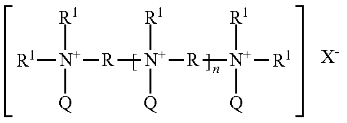

wherein:

R is each independently $C_3$-$C_{20}$ linear or branched alkylene.

$R^1$ is an anionic unit-capped polyalkyleneoxy unit having the formula: $—(R^2O)_xR^3$.

$R^2$ is $C_2$-$C_4$ linear or branched alkylene, preferably $C_2$ (ethylene).

$R^3$ is hydrogen, an anionic unit, and mixtures thereof, in which not all $R^3$ groups are hydrogen, preferably wherein $R^3$ anionic units are selected from $—(CH_2)_pCO_2M$; $—(CH_2)_qSO_3M$; $—(CH_2)_qOSO_3M$; $—(CH_2)_qCH(SO_3M)—CH_2SO_3M$; $—(CH_2)_qCH(OSO_3M)CH_2OSO3M$; $—(CH_2)_qCH(SO_3M)CH_2SO_3M$; $—(CH_2)_pPO_3M$; $—PO_3M$; $—SO_3M$ and mixtures thereof; wherein M is hydrogen or a water soluble cation, preferably selected from sodium, potassium, ammonium, and mixtures thereof and in sufficient amount to satisfy charge balance.

x is from 5 to 50, preferably from 10 to 40, even more preferably from 15 to 30, most preferably from 20 to 25.

Q is a quaternizing unit selected from the group consisting of $C_1$-$C_{30}$ linear or branched alkyl, $C_6$-$C_{30}$ cycloalkyl, $C_7$-$C_{30}$ substituted or unsubstituted alkylenearyl, and mixtures thereof, preferably $C_1$-$C_{30}$ linear or branched alkyl, even more preferably $C_1$-$C_{10}$ or even $C_1$-$C_5$ linear or branched alkyl, most preferably methyl; the degree of quaternization preferably is more than 50%, more preferably more than 70%, even more preferably more than 90%, most preferably about 100.

$X^-$ is an anion present in sufficient amount to provide electronic neutrality, preferably a water-soluble anion selected from the group consisting of chlorine, bromine, iodine, methylsulfate, and mixtures thereof, more preferably chloride.

n is from 0 to 8, preferably 0 to 4, preferably 0 to 2, most preferably 0.

A suitable zwitterionic polyamine having the following general structure: bis($(C_2H_5O)(C_2H_4O)n)(CH_3)$—$N^+$—$C_xH_{2x}$—$N^+$—$(CH_3)$-bis($(C_2H_5O)(C_2H_4O)n$), wherein n=from 20 to 30, and x=from 3 to 8, or sulphated or sulphonated variants thereof.

A particular preferred zwitterionic polyamine is available from BASF as Lutensit Z96 polymer (zwitterionic hexamethylene diamine according to below formula: 100% quaternized and about 40% of the polyethoxy ($EO_{24}$) groups are sulfonated).

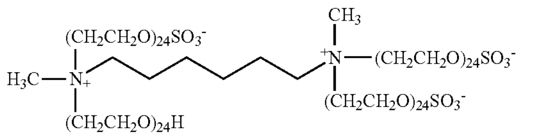

Another suitable zwitterionic polyamine is amphoterically-modified oligopropyleneimine ethoxylates.

Modified Polysaccharide Polymers

Various polysaccharides can be useful as starting material for chemical modification to make modified polysaccharide polymers, including cellulose, starch, guar, dextran, polyglucan, chitin, curdlan, xylose, inulin, pullulan, locust bean gum, *cassia* gum, tamarind gum (xyloglucan), xanthan gum, amylose, amylopectin, scleroglucan and any combination thereof.

The most common type of modified polysaccharide is modified cellulose.

Modified cellulose polymers include anionic modified cellulose polymers which been modified with functional groups that contain negative charge. Suitable anionic modified cellulose polymers include carboxyalkyl cellulose, such as carboxymethyl cellulose. The carboxymethyl cellulose may have a degree of carboxymethyl substitution of from about 0.5 to about 0.9, and a molecular weight from about 80,000 Da to about 300,000 Da. Suitable carboxymethylcellulose include Finnfix® series sold by CP Kelco or Nouryon, which include Finnfix® GDA, a hydrophobically modified carboxymethylcellulose, e.g., the alkyl ketene dimer derivative of carboxymethylcellulose sold under the tradename Finnfix® SH1, or the blocky carboxymethylcellulose sold under the tradename Finnfix®V. Other suitable anionic modified cellulose polymers include sulphoalkyl cellulose and sulfoethyl cellulose.

Modified cellulose polymers also include nonionic modified cellulose polymers which have been modified by a functional group that does not contain any charge. Suitable nonionic modified cellulose polymers include alkyl cellulose, hydroxyalkyl cellulose, hydroxyalkyl alkylcellulose, alkylalkoxyalkyl cellulose. Suitable nonionic modified cellulose polymers also include nonionic cellulose carbamates, and nonionic 6-desoxy-6-amino-celluloses derivative. Examples of alkyl cellulose include methyl cellulose (MC), ethyl cellulose (EC), etc. Suitable ethyl celluloses are sold under tradename Ethocel™ by Dow Chemicals, DuPont, or IFF. Examples of hydroxyalkyl celluloses include hydroxyethyl cellulose (HEC) and hydroxypropyl cellulose (HPC). Suitable HECs are sold under tradename Natrosol™ hydroxyethylcellulose by Ashland, such as Natrosol™ 250 with different grades available which have a total molar substitution (MS) of 2.5. Suitable HECs are also sold under tradename CELLOSIZE™ Hydroxyethyl Cellulose by Dow Chemicals. Suitable HPCs are sold under tradename Klucel™ by Ashland. Example of hydroxyalkyl alkylcellulose include hydroxypropyl methylcellulose (HPMC), suitable HPMC are sold under tradename Methocel™ with different grades available by Dow Chemicals, DuPont or IFF, and under tradename Benecel™ by Ashland.

Modified cellulose polymers also include cationic modified cellulose polymers which been modified by functional group that contain cationic charge. Suitable cationic modified celluloses include quaternized hydroxyethyl cellulose (Polyquaternium-10), which is available under the tradename of Ucare by Dow Chemical, such as Ucare LR400, Ucare LR30M, Ucare JR125, Ucare JR400, etc. Suitable cationic modified cellulose polymers also include quaternized hydroxyethyl cellulose (HEC) polymers with cationic substitution of trimethyl ammonium and dimethyldodecyl ammonium (Polyquaternium-67), which are available under the tradename SoftCAT by Dow Chemical, such as SoftCAT SK, SoftCAT SK-MH, SoftCAT SX, SoftCAT SL. Other suitable cationic modified celluloses include those sold under tradename SupraCare™ by Dow Chemical, such as SupraCare™ 150, SupraCare™ 133, SupraCare™ 212. Suitable cationic modified cellulose polymers also include those modified with cationic group and a hydrophobic group.

Another suitable type of modified polysaccharide is modified guar. The modified guar can be nonionic modified, anionic modified, and/or cationic modified. Suitable nonionic modified guar includes hydroxypropyl guar, such as N-Hance™ HP40 and HP40S guar available from Ashland. Suitable example of modified guar also include carboxymethyl hydroxypropyl guar (CMHPG) which is anionic and nonionic modified, such as Galactasol™ available from Ashland. Suitable modified guar also includes cationic modified guar, such as guar hydroxypropyltrimonium chloride, which is available from by Ashland as AquaCat™ CG518 cationic solution, AquaCat™ PF618 cationic solution, N-Hance™ 3000, 3196, 3215, BF-13, BF-17, C261, C261N, CG13, CCG45. Other cationic modified guar polymers are available from Solvay as Jaguar@ C 162, Excel, Excel SGI, Optima, C 13 S, C 13 SH, C14 S, C-17, LS SGI, C-500 STD. Other nonionic and/or anionic modified guar include for example Jaguar@ HP 105 (Hydroxypropyl Guar gum), Jaguar@ SOFT and HP-120 COS (Carboxymethyl Hydroxypropyl Guar Gum).

Suitable modified polysaccharide polymers also include modified starch. Examples of modified starch include carboxylate ester of starch, esterification product of starch with e.g., $C_6$-$C_{24}$ alk(en)yl succinic anhydride; and starch maleates (starch react with maleic acid anhydride). Examples of modified starch also include, but not limit to, acetylated starch, acetylated distarch adipate, distarch phosphate, hydroxypropyl starch, hydroxy propyl distarch phosphate, phosphated distarch ohosphate, acetylated distarch phosphate, starch sodium octenyl succinate.

Suitable modified polysaccharide polymers also include polymers based on other polysaccharide, such as cationic dextran polymers, the cationic dextran polymers are commercially available under brand name CDC, CDC-L, CDC-H by Meito Sangyo.

Suitable modified polysaccharide polymers also include polymers based on polyglucans. Suitable modified polyglucans are based on alpha 1,3-polyglucans and/or 1,6-polyglucans. Preferably, the modified polyglucans can be cationic modified, such as cationic modified alpha 1,3-polyglucan, such as cationic modified alpha 1,6-polyglucans. Another class of preferred modified polyglucans can be hydrophobic and/or hydrophilic modified. Polyglucan esters are especially preferred due to their performance and biodegradability profiles.

Other suitable polysaccharide polymers include those based on inulin. Example of modified inulin include carboxymethyl group modified inulin (CMI), suitable CMI are Carboxyline series sold by Cosun Beet Company, including Carboxyline 25-40D, Carboxyline 25 D Powder, Carboxyline 20 LS D Powder, Carboxyline 25, Carboxyline 25-30 UP. Example of modified inulin also include cationic modified inulin, suitable cationic modified inulins include the Quatin series sold by Cosun Beet Company, including Quatin 350, Quatin 380 and Quatin 1280 which are characterized by different degree of substitution (DS), cationic density (meq/g) and molecular weight (g/mol).

Suitable modified polysaccharide polymers also include polymers based on other polysaccharide, such as xylose carbamates, carboxy or sulfo-alkylated pullulan, carboxy- or sulfo-alkylated chitosan, and any combination thereof.

Polyalkylene Oxide Polymers

Suitable polyalkylene oxide polymers include poly (ethylene oxide). Preferably the poly (ethylene oxide) has a molecular weight from 1000 to 10000, more preferably from 2000 to 9000, more preferably from 3000 to 8500, most preferably from 4000 to 8000 such as 5000, 6000, 7000.

Suitable polyalkylene oxide polymers include graft polymers. Suitable graft polymers can be based on polyalkylene oxide Suitable polymers comprise polyalkylene oxide backbone (A) as a graft base and polymeric sidechains (B) grafted thereon. The polymeric sidechains (B) are obtainable by polymerization of at least one vinyl ester monomer. The polyalkylene oxide backbone (A) is obtainable by polymerization of at least one monomers selected from the group of ethylene oxide, 1,2-propylene oxide, 1,2-butylene oxide, 2,3-butylene oxide, 1,2-pentene oxide or 2,3-pentene oxide. Such graft polymers are known as effective soil suspension polymers for hydrophobic and hydrophilic stains, surfactant boosters, and sometimes as dye transfer inhibitors.

Suitable graft polymers include amphiphilic graft copolymer comprising polyethylene glycol backbone (A) as a graft base, and at least one pendant sidechains (B) selected from polyvinyl acetate, polyvinyl alcohol and mixtures thereof. A preferred graft polymer of this type is Sokalan HP22 available from BASF.

Suitable graft polymers are amphiphilic graft polymers based on water-soluble polyalkylene oxides (A) as a graft base and side chains formed by polymerization of a vinyl ester component (B), said polymers typically having an average of <one graft site per 50 alkylene oxide units and mean molar masses M typically of from 3 000 to 100 000. One specific preferred graft polymer of this type is polyvinyl acetate grafted polyethylene oxide copolymer having a polyethylene oxide as graft base and multiple polyvinyl acetate side chains. The molecular weight of the polyethylene oxide backbone is typically about 6000 and the weight ratio of the polyethylene oxide to polyvinyl acetate is typically about 40 to 60 and typically no more than 1 grafting point per 50 ethylene oxide units. The most preferred polymer of this type is available from BASF as Sokalan PG101.

Suitable graft polymers include graft polymers comprising a block copolymer backbone (A) as a graft base, wherein said block copolymer backbone (A) is obtainable by polymerization of at least two monomers selected from the group of ethylene oxide, 1,2-propylene oxide, 1,2-butylene oxide, 2,3-butylene oxide, 1,2-pentene oxide or 2,3-pentene oxide, wherein the number (x) of individual blocks within the block copolymer backbone (A) is an integer, wherein x is typically from 2 to 10 and preferably 3 to 5, and (B) polymeric sidechains grafted onto the block copolymer backbone, wherein said polymeric sidechains (B) are obtainable by polymerization of at least one vinyl ester monomer. These polymers have improved biodegradation profiles.

Suitable graft polymers include graft polymers comprising a polyalkylene oxide backbone (A) which has a number average molecular weight of from about 1000 to about 20,000 Daltons and is based on ethylene oxide, propylene oxide, or butylene oxide; and side chains derived from N-vinylpyrrolidone (B), and side chains derived from vinyl ester (C) derived from a saturated monocarboxylic acid containing from 1 to 6 carbon atoms and/or a methyl or ethyl ester of acrylic or methacrylic acid.

Polycarboxylate Polymers

Polycarboxylate polymers typically comprise at least one carboxy group-containing monomer. The carboxy group-containing monomers are typically selected from acrylic acid, methacrylic acid, fumaric acid, maleic acid, itaconic acid, aconitic acid, mesaconic acid, citraconic acid, methylenemalonic acid, salts thereof, anhydrides thereof, and any combination thereof.

Suitable polycarboxylate polymers include polyacrylate homopolymer having a molecular weight of from 4,000 Da to 9,000 Da, or from 6,000 Da to 9,000 Da. Other suitable carboxylate polymers include copolymers of acrylic acid (and/or methacrylic acid) and maleic acid having a molecular weight of from 50,000 Da to 120,000 Da, or from 60,000 Da to 80,000 Da. The polyacrylate homopolymer and copolymer of acrylic acid (and/or methacrylic acid) and maleic acid are commercially available as Acusol 445 and 445N, Acusol 531, Acusol 463, Acusol 448, Acusol 460, Acusol 465, Acusol 497, Acusol 490 from Dow Chemicals, and as Sokalan CP 5, Sokalan CP 7, Sokalan CP 45, and Sokalan CP 12S from BASF.

Suitable polycarboxylate polymers also include polyitaconate homopolymers, such as Itaconix® DSP 2K™ sold by Itaconix, and Amaze SP available from Nouryon.

Suitable polycarboxylate polymers also include co-polymers comprising carboxy group-containing monomers and one or more sulfonate or sulfonic group-containing monomers. The sulfonate or sulfonic group containing monomers are typically selected from 2-acrylamido-2-methyl-1-propanesulfonic acid (AMPS), 2-methacrylamido-2-methyl-1-propanesulfonic acid, 3-methacrylamido-2-hydroxy-propanesulfonic acid, allysulfonic acid, methallysulfonic acid, 3-allyloxy-2-hydroxy-1-propanesulfonic acid, 2-methyl-2-propenen-1-sulfonic acid, styrenesulfonic acid, vinylsulfonic acid, 3-sulfopropyl acrylate, 3-sulfopropylmethacrylate, sulfomethylacrylamide, sulfomethylmethacrylamide and water soluble salts thereof.

Suitable polymers may comprise maleic acid, acrylic acid, and 3-allyloxy-2-hydroxy-1-propanesulfonic acid. Suitable polymers may comprise acrylic acid and 2-acrylamido-2-methyl-propane sulfonate, such as those sold under tradename Acusol 588 by Dow Chemicals, Sokalan CP50 by BASF, Aquatreat AR-545, Versaflex 310 and Versaflex 310-37 by Nouryon.

Suitable polymers include poly(itaconic acid-co-AMPS) sodium salt, such as Itaconix® TSI™ 322 and Itaconix® CHT™ 122 available from Itaconix.

Suitable polymers also includes those comprising other structure units in addition to the sulfonate or sulfonic group group-containing monomers and carboxy group-containing monomers. Suitable additional monomers are ether bond-containing monomers represented by formula (1) and (2) below:

(1)

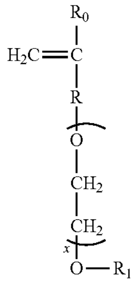

(2)

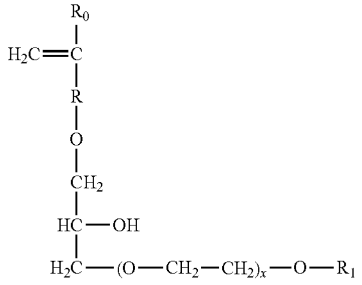

wherein in Formula (1):

$R_0$ represents a hydrogen atom or $CH_3$ group.

R represents a $CH_2$ group, $CH_2CH_2$ group or single bond.

x represents a number 0-50, preferably 0-20, more preferably 0-5 (provided x represents a number 1-5 when R is a single bond).

$R_1$ is a hydrogen atom or $C_1$ to $C_{20}$ organic group.

wherein in Formula (2):

$R_0$ represents a hydrogen atom or $CH_3$ group.

R represents a $CH_2$ group, $CH_2CH_2$ group or single bond.

x represents a number 0-5.

$R_1$ is a hydrogen atom or $C_1$ to $C_{20}$ organic group.

A specific preferred polymer comprises structure units derived from 1 to 49 wt % of 1-(allyloxy)-3-butoxypropan-2-ol, from 50 to 98 wt % acrylic acid or methacrylic acid, and from 1 to 49 wt % of 3-allyloxy-2-hydroxy-1-propanesulfonic acid, and the has a weight average molecular weight of from about 20,000 to about 60,000. a specific preferred polymer of this type comprises structure units derived from 1 to 10 wt % of 1-(allyloxy)-3-butoxypropan-2-ol, from 70 to 89 wt % acrylic acid or methacrylic acid, and from 10 to 20 wt % of 3-allyloxy-2-hydroxy-1-propanesulfonic acid, and the has a weight average molecular weight of from about 30,000 to about 60,000. Herein, 1-(allyloxy)-3-butoxypropan-2-ol is a preferred monomer as represented by formula (2) when $R_0$ is H, R is $CH_2$, x is 0, and $R_1$ is n-butyl ($C_4$-alkyl).

Suitable polycarboxylate polymers also include co-polymers comprising carboxy group-containing monomers and other suitable monomers. Other suitable monomers are selected from esters and/or amide of the carboxy group-containing monomers, such as $C_1$-$C_{20}$ alkyl ester of acrylic acid; alkylene; vinyl ethers, such as methyl vinyl ether, styrene and any mixtures thereof. One specific preferred polymer family of this type is sold under tradename Gantrez by Ashland, which includes Gantrez An (alternating co-polymer of methyl vinyl ether and maleic anhydride), Gantrez S (alternating co-polymer of methyl vinyl ether and maleic acid), Gantrez ES (alternating co-polymer of methyl vinyl ether and maleic acid ester), Gantrez MS (alternating co-polymer of methyl vinyl ether and maleic acid salt).

Suitable polycarboxylate polymers also include polyepoxy succinic acid polymers (PESA). A most preferred polyepoxy succinic acid polymer can be identified using CAS number: 51274-37-4, or 109578-44-1. Suitable polyepoxy succinic acid polymers are commercially available from various suppliers, such as Aquapharm Chemicals Pvt. Ltd (commercial name: Maxinol 600); Shandong Taihe Water Treatment Technologies Co., Ltd (commercial name: PESA), and Sirius International (commercial name: Briteframe PESA).

Suitable polycarboxylate polymers may comprise a monomer having at least one aspartic acid group or a salt thereof, this polymer comprises at least 25 mol %, 40 mol %, or 50 mol %, of said monomer. A preferabed example is sodium salt of poly(aspartic acid) having a molecular weight of from 2000 to 3000 g/mol which is avilable as Baypure® DS 100 from Lanxess. Suitable polyaspartates can be further modified.

Terephthalate Polymers

Suitable terephthalate polymers are terephthalate-derived polyester polymers, which comprise structure unit (I) and/or (II):

$$[(OCHR^1—CHR^2)_a—O—OC—Ar—CO—]_d \qquad (I)$$

$$—[(OCHR^3—CHR^4)_b—O—OC\text{-}sAr\text{-}CO—]_e \qquad (II)$$

wherein:

a, b are from 1 to 200.

d, e are from 1 to 50.

Ar is independently selected from 1,4-substituted phenylene, and 1,3-substituted phenylene. sAr is 1,3-substituted phenylene substituted in position 5 with $—SO_3M$; wherein M is a counterion selected from Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof.

$R^1$, $R^2$, $R^3$, $R^4$ are independently selected from H or $C_1$-$C_{18}$ n-alkyl or iso-alkyl; preferably selected from H or $C_1$ alkyl.

Optionally, the polymer may further comprises one or more terminal group (III) derived from polyalkylene glycolmonoalkylethers, preferably selected from structure (IV-a)

$$—O—[C_2H_4—O]_c—[C_3H_6—O]_d—[C_4H_8—O]_e—R_7 \qquad (IV\text{-}a)$$

wherein:

$R_7$ is a linear or branched $C_{1\text{-}30}$ alkyl, $C_2$-$C_{30}$ alkenyl, or a cycloalkyl group with 5 to 9 carbon atoms, or a $C_8$-$C_{30}$ aryl group, or a $C_6$-$C_{30}$ arylalkyl group; preferably $C_{1\text{-}4}$ alkyl, more preferably methyl.

c, d and e are, based on molar average, a number independently selected from 0 to 200, where the sum of c+d+e is from 2 to 500.

wherein the $[C_2H_4—O]$, $[C_3H_6—O]$ and $[C_4H_8—O]$ groups of the terminal group (IV-a) may be arranged blockwise, alternating, periodically and/or statistically, preferably blockwise and/or statistically, either of the $[C_2H_4—O]$, $[C_3H_6—O]$ and $[C_4H_8—O]$ groups of the terminal group (IV-a) can be linked to $—R_7$ and/or —O. Preferably, $[C_3H_6—O]$ group is linked to —O, and the —O is further connected to —OC—Ar—CO— or —OC-sAr-CO—.

Optionally, the polymer may further comprise one or more anionic terminal unit (IV) and/or (V) as described in EP3222647. Where M is a counterion selected from $Na^+$, $Li^+$, $K^+$, ½ $Mg^{2+}$, ½$Ca^{2+}$, ⅓ $Al^{3+}$, ammonium, mono-, di-, tri-, or tetraalkylammonium wherein the alkyl groups are $C_1$-$C_{18}$ alkyl or $C_2$-$C_{10}$ hydroxyalkyl, or mixtures thereof. $—O—CH_2CH_2—SO_3M$ (IV)

$—O—CH_2CH_2—SO_3M$ (IV)

(V)

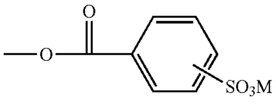

Optionally, the polymer may comprise crosslinking multifunctional structural unit which having at least three functional groups capable of the esterification reaction. The functional which may be for example acid-, alcohol-, ester-, anhydride- or epoxy groups, etc.

Optionally, other di- or polycarboxylic acids or their salts or their (di)alkylesters can be used in the polyesters, such as, naphthalene-1,4-dicarboxylic acid, naphthalene-2,6,-dicarboxylic acid, tetrahydrophthalic acid, trimellitic acid, diphenoxyethane-4,4'-dicarboxylic acid, diphenyl-4,4'-dicarboxylic acid, 2,5-furandicarboxylic acid, adipic acid, sebacic acid, decan-1,10-dicarboxylic acid, fumaric acid, succinic acid, 1,4-cyclohexanedicarboxylic acid, cyclohexanediacetic acid, glutaric acid, azelaic acid, or their salts or their (di)alkyl esters, preferably their ($C_1$-$C_4$)-(di)alkyl esters and more preferably their (di)methyl esters, or mixtures thereof.

One type of preferred polyester polymers are nonionic polyester polymers which do not comprise the above structure unit (II). A particular preferred nonionic terephthalate-derived polymer has a structure according to formula below:

arranged blockwise and the block consisting of the $—(OC_3H_6)$ groups is bound to a COO group, n is based on a molar average a number of from 40 to 50, m is based on a molar average a number of from 1 to 10 and preferably of from 1 to 7.

The polyester may or may not be biodegradable, preferred soil release polymers are readily biodegradable.

Example of suitable polyesters include TexCare® series supplied by Clariant, including nonionic polymers Texcare® SRN 100, SRN 170, SRN 170 C, SRN 170 Terra, SRN 172, SRN 240, SRN 260, SRN 260 life, SRN 260 SG Terra, SRN UL50, SRN 300, SRN 325; and anionic polymers TexCare® SRA 100, SRA 300, SRA300 F. Example of suitable polymers also include REPEL-O-TEX® line of polymers supplied by Rhodia/Solvay, including the nonionic polymer REPEL-O-TEX® Crystal, Crystal PLUS, Crystal NAT, SRP6; and the anionic polymer REPEL-O-TEX® SF-2. Other examples of polymers includes the WeylClean® series of polymers supplied by WeylChem, including nonionic polymers WeylClean® PLN1, PLN2; and anionic polymers WeylClean® PSA1. Other examples of polymers are Marloquest® polymers, such as Marloquest® SL, HSCB, L235M, U, B, and G82, supplied by Sasol. Suitable polymers include Sorez 100 (from ISP or Ashland).

Other Polyester Polymers

Suitable other polyester polymers include polyester soil release polymers derived from bio-based 2,5-furandicarboxylic acid and derivatives thereof.

Surfactant System

Typically, the surfactant system provides cleaning benefits, shine benefits, water drainage and drying benefits. The surfactant system can act to remove soil and suspend soil.

The composition may comprise from 0.5 g to 5.0 g, or from 0.6 g to 4.0 g, or from 0.7 g to 3.0 g surfactant system.

The surfactant system can comprise amphoteric surfactant, anionic surfactant, cationic surfactant, nonionic surfactant, zwitterionic surfactant, and any combination thereof. Most preferably, the surfactant system comprises nonionic surfactant.

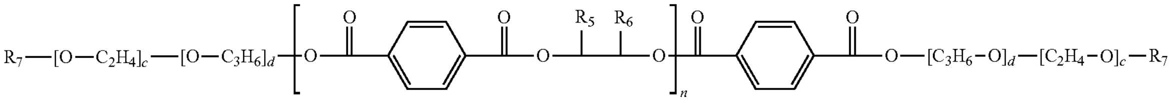

Wherein:

- $R_5$ and $R_6$ are independently selected from H or $CH_3$. More preferably, one of the $R_5$ and $R_6$ is H, and another is $CH_3$.
- c, d are, based on molar average, a number independently selected from 0 to 200, where the sum of c+d is from 2 to 400.

More preferably, d is from 0 to 50, c is from 1 to 200.

More preferably, d is 1 to 10, c is 5 to 150.

$R_7$ is $C_1$-$C_4$ alkyl and more preferably methyl.

N is, based on molar average, from 1 to 50.

One example of most preferred above suitable terephthalate-derived nonionic polymers has one of the $R_5$ and $R_6$ is H, and another is $CH_3$; d is 0; c is from 5-100 and $R_7$ is methyl, and n is from 3-10.

Other suitable terephthalate-derived polyester polymers can be end capped. The end capping group of these SRPs are typically selected from:

$$X—(OC_2H_4)_n—(OC_3H_6)_m—$$

wherein, X is $C_1$-$C_4$ alkyl and preferably methyl, the $—(OC_2H_4)$ groups and the $—(OC_3H_6)$ groups are The surfactant system typically comprises a surfactant, typically one or more, preferably two or more, or three or more, or four or more, or even five or more different types of surfactants, and preferably from 2 to 8, or 3 to 7, or 4 to 6 different types of surfactants.

The surfactant system may have a phase inversion temperature, as measured at a concentration of 1 wt % in distilled water, between 20° C. and 70° C., preferably between 35° C. and 65° C. Phase inversion temperature is the temperature below which a surfactant system partitions preferentially into the water phase (typically as oil-swollen micelles), and above which the surfactant system partitions preferentially into the oil phase (typically as water swollen inverted micelles). Phase inversion temperature can be determined visually by identifying at which temperature cloudiness occurs. The phase inversion temperature of the surfactant system can be determined as follows: a solution containing 1 wt % of the surfactant system, by weight of the solution in distilled water, is prepared. The solution is stirred gently before phase inversion temperature analysis to ensure that the process occurs in chemical equilibrium. The phase inversion temperature is taken in a thermostable bath by immersing the solutions in 75 mm sealed glass test tube. To ensure the absence of leakage, the test tube is weighed before and after phase inversion temperature measurement. The temperature is gradually increased at a rate of less than 1° C. per minute, until the temperature reaches a few degrees below the pre-estimated phase inversion temperature. Phase inversion temperature is determined visually at the first sign of turbidity.

Preferably, the surfactant system comprises a surfactant selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

Suitable surfactants are non-ionic surfactants.

A suitable surfactant has the formula: R—O-$EO_x$, wherein R is a $C_6$-$C_{18}$ alkyl, and x is from 1 to 30. Suitable surfactants are Lutensol AO series of surfactants from BASF and Lutensol TO series of surfactants from BASF.

A suitable surfactant has the formula: R—O-$EO_xPO_y$, wherein R is a $C_6$-$C_{18}$ alkyl, x is from 1 to 20, and y is from 1 to 20. Suitable surfactants are Dehypon LS series of surfactants from BASF.

A suitable surfactant has the formula: R—O—$PO_yEO_x$, wherein R is a $C_6$-$C_{18}$ alkyl, x is from 1 to 20, and y is from 1 to 20. Suitable surfactants are Ecosurf EH series of surfactants from Dow.

A suitable surfactant has the formula: R—O-$EO_xPO_yEO_x$, wherein R is a $C_6$-$C_{18}$ alkyl, each x is independently from 1 to 20, and y is from 1 to 20. A suitable surfactant is Plurafac LF403 from BASF.

A suitable surfactant has the formula: R—O—$PO_yEO_x$-$PO_y$, wherein R is a $C_6$-$C_{18}$ alkyl, x is from 1 to 20, and each y is independently from 1 to 20. A suitable surfactant is Plurafac SLF180 from BASF.

A suitable surfactant has the formula: HO-$EO_xPO_yEO_x$—H, wherein, each x is independently from 1 to 50, and y is from 1 to 50. Suitable surfactants are the Pluronic PE series of surfactants from BASF, and the Tergitol L series of surfactants from Dow.

A suitable surfactant has the formula: HO—$PO_yEO_x$-$PO_y$—H, wherein x is from 1 to 50, and each y is independently from 1 to 50. Suitable surfactants are the Pluronic RPE series of surfactants from BASF.

The above surfactant chemical formula include both the protonated and unprotonated structures, for example a formula showing R—O-$EO_x$ includes the formula R—O-$EO_x$H, and vice versa.

Preferably, the surfactant system comprises a surfactant selected from:

(i) R—O-$EO_x$H, wherein R is a $C_6$-$C_{18}$ alkyl, and x is from 1 to 30; or (ii) R—O-$EO_xPO_y$H, wherein R is a $C_6$-$C_{18}$ alkyl, x is from 1 to 20, and y is from 1 to 20; or (iii) R—O—$PO_xEO_y$H, wherein R is a $C_6$-$C_{18}$ alkyl, x is from 1 to 20, and y is from 1 to 20; or (iv) R—O-$EO_xPO_yEO_z$H, wherein R is a $C_6$-$C_{18}$ alkyl, x is y from 1 to 20, y is from 1 to 20, and z is from 1 to 20; or (v) R—O—$PO_xEO_yPO_z$H, wherein R is a $C_6$-$C_{18}$ alkyl, x is from 1 to 20, y is from 1 to 20, and z is from 1 to 20; or (vi) HO-$EO_xPO_yEO_z$H, wherein, x is from 1 to 50, y is from 1 to 50, and z is from 1 to 50; or (vii) HO—$PO_xEO_yPO_z$H, wherein x is from 1 to 50, y is from 1 to 50, and z is from 1 to 50; or (viii) R—O-$EO_xBO_y$H, wherein R is a $C_6$-$C_{18}$ alkyl, x is from 1 to 20, and y is from 1 to 20; or (ix) R—O—$BO_xEO_y$H, wherein R is a $C_6$-$C_{18}$ alkyl, x is from 1 to 20, and y is from 1 to 20; or (x) any combination thereof.

For the above surfactants (i) to (v) above, the alkyl moiety can be linear or branched, and can be derived from a guerbet alcohol, or can derived from an oxo-alcohol.

Other suitable surfactants include hydroxy mixed ether surfactants. The hydroxy mixed ether surfactants can be modified and/or endcapped. Suitable hydroxy mixed ether surfactants are Dehypon E127 and Dehypon GRA, both from BASF.

A suitable surfactant is amine oxide,

A suitable surfactant is betaine.

A suitable surfactant is an anionic surfactant selected from alkyl ether sulphates, alkyl sulphates, alkyl sulphonates, and any combination thereof.

Other Ingredients

Other suitable ingredients include aesthetic ingredients, fillers, glass care ingredients, metal care ingredients, perfumes, probiotics, solvents, suds control agents, and any combination thereof.

Suitable fillers include sulphate salts. Suitable sulphate salts are alkali metal salts of sulphate and/or alkaline earth metal salts of sulphate. Preferred sulphate salts are selected from magnesium sulphate, sodium sulphate, and any combination thereof, most preferably sodium sulphate.

Suitable glass care ingredients include zinc-containing compounds. Suitable zinc-containing compounds include hydrozincite.

Suitable metal care ingredients include benzotriazole (BTA), tolyltriazole (TTA), their salt-forms, and any combination thereof. Preferred salt-forms are sodium forms of BTA and TTA.

Suitable solvents include alkanolamines, polyethers, polyols, and any combination thereof.

Suitable alkanolamines are selected from monoethanolamine, diethanolamine, triethanolamine, and any combination thereof.

Suitable polyethers are selected from glycerol ethers, polyethyleneglycol (PEG), polypropyleneglycol (PPG), glycol ethers, and any combination thereof. Suitable glycol ethers are the E-series and P-series of glyol ethers from Dow.

Suitable polyols are selected from propanediol, glycerol, sorbitol, and any combination thereof.

The solvent can act as a process aid and/or a benefit agent.

Suitable probiotics include bacterial spores.

Formulation Approaches

The design, shape and structure of the pouch enable the targeting of specific chemistry into the pre-wash stage of the automatic dishwashing machine cycle and the main-wash stage of the automatic dishwashing machine cycle. This enables several formulation strategies to be chosen depending on the product performance need.

For example, the same chemistry, in the same or different amounts, can be incorporated into the second chamber and the first chamber to target the pre-wash stage and main-wash stage respectively.

Alternatively, different chemistry can be incorporated into the second chamber from the chemistry incorporated into the first chamber. In this manner, specific chemistry can be included in each chamber, respectively, to drive different product performance as desired.

For example, it might be desirable for any of the following to be incorporated in the second chamber to target pre-wash stage performance benefits: alkalinity system, bleach system, builder system, chelant system, enzyme system, polymer system, and surfactant system.

Depending on the chemistry chosen to be incorporated in the second chamber to target pre-wash stage performance benefits, or the chemistry chosen to be incorporated into the first chamber to target main-wash stage performance benefits, the remaining chemistry can be incorporated into the pouch in a manner so as to provide a superior overall performance benefit.

Described below are several different formulation approaches that are suitable for the pouch of the present disclosure.

Same Chemistry in First Chamber and Second Chamber

It may be desired for the first chamber and the second chamber to comprise the same, or essentially the same, types of detergent ingredients.

This formulation approach can provide cleaning performance benefits.

The first chamber may comprise a first chamber solid detergent composition. The second chamber may comprise a second chamber solid composition. The first chamber solid detergent composition and the second chamber solid detergent composition may comprise the same type of detergent ingredients.

Preferably, the weight ratio of the first chamber solid detergent composition to the second chamber solid detergent composition is in the range of from greater than 1:1 to 10:1, or from 2:1 to 5:1.

Preferably, the first chamber comprises from 5.0 g to 30 g, or from 5.0 g to 29 g, or from 5.0 g to 28 g, or from 5.0 g to 25 g, or from 7.0 g to 25 g, or even from 10 g to 20 g first chamber solid detergent composition. Preferably, the second chamber comprises from 3.0 g to 20 g, or from 3.0 g to 19 g, or from 3.0 g to 18 g, or from 3.0 g to 15 g, or from 3.0 g to 13 second chamber solid detergent composition.

Preferably, both the first chamber and the second chamber comprise protease. Preferably, both the first chamber solid detergent composition and the second chamber solid detergent composition comprise protease. Preferably, both the first chamber and the second chamber comprise protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

Preferably, the first chamber comprises, on an active enzyme basis, from 10.0 mg to 300 mg protease. Preferably, the second chamber comprises, on an active enzyme basis, from 5.0 mg to 100 mg protease.

Preferably, both the first chamber and the second chamber comprise amylase. Preferably, both the first chamber and the second chamber comprise amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

Preferably, the first chamber comprises, on an active enzyme basis, from 2.0 mg to 30 mg amylase. Preferably, the second chamber comprises, on an active enzyme basis, from 1.0 mg to 10 mg amylase.

Preferably, both the first chamber and the second chamber comprise protease and amylase.

Preferably, the first chamber comprises, on an active enzyme basis, from 10.0 mg to 300 mg protease and from 2.0 mg to 30 mg amylase. Preferably, the second chamber comprises, on an active enzyme basis, from 5.0 mg to 100 mg protease and from 1.0 mg to 10 mg amylase.

Both the first chamber and the second chamber may comprise lipase. Both the first chamber and the second chamber may comprise cellulase. Both the first chamber and the second chamber may comprise a bleaching enzyme. Both the first chamber and the second chamber may comprise a sugar degrading enzyme.

Preferably, both the first chamber and the second chamber comprise a builder. Preferably, both the first chamber solid detergent composition and the second chamber solid detergent composition comprise a builder. Preferably the first chamber comprises from 1.0 g to 10 g builder. Preferably, the second chamber comprises from 0.5 g to 4.0 g builder. Preferably, the first chamber solid detergent composition comprises from 1.0 g to 10 g builder. Preferably, the second chamber solid detergent composition comprises from 0.5 g to 4.0 g builder.

Preferably, both the first chamber solid detergent composition and the second chamber solid detergent composition comprise a builder selected from aminopolycarboxylic acids and/or salts thereof, carboxylic acids and/or salts thereof, and any combination thereof.

Preferably, both the first chamber solid detergent composition and the second chamber solid detergent composition comprise a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

Preferably, both the first chamber solid detergent composition and the second chamber solid detergent composition comprise a builder selected from methylglycine-N,N-diacetic acid and/or salt thereof, glutamic acid diacetic acid and/or salt thereof; citric acid and/or a salt thereof; and any combination thereof.

Preferably, both the first chamber solid detergent composition and the second chamber solid detergent composition comprise a builder selected from methylglycine-N,N-diacetic acid and/or salt thereof; citric acid and/or a salt thereof; and any combination thereof.

Both the first chamber solid detergent composition and the second chamber solid detergent composition may comprise a builder selected from methylglycine-N,N-diacetic acid and/or salt thereof.

Both the first chamber solid detergent composition and the second chamber solid detergent composition may comprise a builder selected from citric acid and/or a salt thereof.

The first chamber solid detergent composition may comprise from 1.0 g to 10 g builder selected from methylglycine-N,N-diacetic acid and/or salt thereof; citric acid and/or a salt thereof; and any combination thereof. The second chamber solid detergent composition may comprise from 0.5 g to 4.0 g builder selected from methylglycine-N,N-diacetic acid and/or salt thereof; citric acid and/or a salt thereof; and any combination thereof.

Preferably, the first chamber solid detergent composition has an equilibrium pH, upon dilution to 0.1 g/l in deionized water at a temperature of 20° C., of from above 7.0 to 12.0. Preferably, the second chamber solid detergent composition has an equilibrium pH, upon dilution to 0.1 g/l in deionized water at a temperature of 20° C., of from above 7.0 to 12.0.

Preferably, the first chamber solid detergent composition has an equilibrium pH, upon dilution to 0.1 g/l in deionized water at a temperature of 20° C., of from 9.0 to 11.0. Preferably, the second chamber solid detergent composition has an equilibrium pH, upon dilution to 0.1 g/l in deionized water at a temperature of 20° C., of from 9.0 to 11.0.

Preferably, the first chamber solid detergent composition has an equilibrium pH, upon dilution to 0.1 g/l in deionized water at a temperature of 20° C., of from 10.0 to 11.0. Preferably, the second chamber solid detergent composition has an equilibrium pH, upon dilution to 0.1 g/l in deionized water at a temperature of 20° C., of from 10.0 to 11.0.

Preferably, the first chamber solid detergent composition comprises an alkalinity source selected from sodium carbonate, sodium silicate, and any combination thereof. Preferably, the second chamber solid detergent composition comprises an alkalinity source selected from sodium carbonate, sodium silicate, and any combination thereof.

Preferably, the first chamber solid detergent composition comprises sodium carbonate. Preferably, the second chamber solid detergent composition comprises sodium carbonate.

Preferably, the first chamber solid detergent composition comprises from 1.0 g to 12.0 g alkalinity source selected from sodium carbonate, sodium silicate, and any combination thereof. Preferably, the second chamber solid detergent composition comprises from 0.5 g to 4.0 g alkalinity source selected from sodium carbonate, sodium silicate, and any combination thereof.

Preferably, the first chamber solid detergent composition comprises from 1.0 g to 12.0 g sodium carbonate. Preferably, the second chamber solid detergent composition comprises from 0.5 g to 4.0 g sodium carbonate.

Preferably, both the first chamber and the second chamber comprise a bleach. Preferably, both the first chamber and the second chamber comprise a source of peroxide. Preferably, both the first chamber and the second chamber comprise a percarbonate bleach. Both the first chamber and the second chamber may comprise a bleach activator. Both the first chamber and the second chamber may comprise a tetraacetylethylenediamine bleach activator. Both the first chamber and the second chamber may comprise a bleach catalyst. Both the first chamber and the second chamber may comprise a bleach catalyst that is a transition metal bleach catalyst. Both the first chamber and the second chamber may comprise a bleach catalyst that is a cobalt bleach catalyst, a manganese bleach catalyst, or any combination thereof.

Preferably, both the first chamber solid detergent composition and the second chamber solid detergent composition comprise a bleach. Preferably, both the first chamber solid detergent composition and the second chamber solid detergent composition comprise a source of peroxide. Preferably, the first chamber solid detergent composition comprises from 1.0 g to 6.0 g source of peroxide. Preferably, the second chamber solid detergent composition comprises from 0.3 g to 3.0 g source of peroxide. Preferably, both the first chamber solid detergent composition and the second chamber solid detergent composition comprise a percarbonate bleach. Preferably, the first chamber solid detergent composition comprises from 1.0 g to 6.0 g percarbonate bleach. Preferably, the second chamber solid detergent composition comprises from 0.3 g to 3.0 g percarbonate bleach. Preferably, both the first chamber solid detergent composition and the second chamber solid detergent composition comprise a percarbonate bleach, wherein the weight ratio of the amount of percarbonate bleach present in the first chamber to the amount of percarbonate bleach present in the second chamber is in the range of from above 1:1 to 5:1, or from 2:1 to 4:1. Both the first chamber solid detergent composition and the second chamber solid detergent composition may comprise a bleach activator. Both the first chamber solid detergent composition and the second chamber solid detergent composition may comprise a tetraacetylethylenediamine bleach activator. Both the first chamber solid detergent composition and the second chamber solid detergent composition may comprise a bleach catalyst. Both the first chamber solid detergent composition and the second chamber solid detergent composition may comprise a bleach catalyst that is a transition metal bleach catalyst. The first chamber solid detergent composition may comprise from 1.0 mg to 10.0 mg transition metal bleach catalyst. The second chamber solid detergent composition may comprise from 0.5 mg to 5.0 mg transition metal bleach catalyst. Both the first chamber solid detergent composition and the second chamber solid detergent composition may comprise a bleach catalyst that is a cobalt bleach catalyst, a manganese bleach catalyst, or any combination thereof.

Preferably, both the first chamber and the second chamber comprise a polymer. Preferably, both the first chamber and the second chamber comprise a polymer selected from polycarboxylate polymer, sulphonated polycarboxylate polymer, and any combination thereof. Preferably, both the first chamber and the second chamber comprise a polycarboxylate polymer and a sulphonated polycarboxylate polymer. Preferably, the first chamber comprises from 0.2 g to 3.0 g polymer selected from polycarboxylate polymer, sulphonated polycarboxylate polymer, and any combination thereof. Preferably the second chamber comprises from 0.1 g to 2.0 g polymer selected from polycarboxylate polymer, sulphonated polycarboxylate polymer, and any combination thereof Preferably, the weight ratio of the total amount of polycarboxylate polymer and sulphonated polycarboxylate polymer present in the first chamber to the total amount of polycarboxylate polymer and sulphonated polycarboxylate polymer present in the second chamber is in the range of from above 1:1 to 5:1, or from 2:1 to 4:1.

The first chamber may comprise from 0.2 g to 3.0 g combination of a polycarboxylate polymer and a sulphonated polycarboxylate polymer. The second chamber may comprise from 0.1 g to 2.0 g combination of a polycarboxylate polymer and a sulphonated polycarboxylate polymer.

Both the first chamber solid detergent composition and the second chamber solid detergent composition may comprise a polymer. Both the first chamber solid detergent composition and the second chamber solid detergent composition may comprise a polymer selected from polycarboxylate polymer, sulphonated polycarboxylate polymer, and any combination thereof.

Both the first chamber solid detergent composition and the second chamber solid detergent composition may comprise a polycarboxylate polymer and a sulphonated polycarboxylate polymer.

The first chamber solid detergent composition preferably comprises from 0.2 g to 3.0 g polymer selected from polycarboxylate polymer, sulphonated polycarboxylate polymer, and any combination thereof. The second chamber solid detergent composition preferably comprises from 0.1 g to 2.0 g polymer selected from polycarboxylate polymer, sulphonated polycarboxylate polymer, and any combination thereof.

Preferably, the weight ratio of the total amount of polycarboxylate polymer and sulphonated polycarboxylate polymer present in the first chamber solid detergent composition to the total amount of polycarboxylate polymer and sulphonated polycarboxylate polymer present in the second chamber solid detergent composition is in the range of from above 1:1 to 5:1, or from 2:1 to 4:1.

The first chamber solid detergent composition may comprise from 0.2 g to 3.0 g combination of a polycarboxylate polymer and a sulphonated polycarboxylate polymer. The second chamber solid detergent composition may comprise from 0.1 g to 2.0 g combination of a polycarboxylate polymer and a sulphonated polycarboxylate polymer.

Both the first chamber and second chamber may comprise filler material. Both the first chamber solid detergent composition and second chamber solid detergent composition may comprise filler material. Both the first chamber solid detergent composition and second chamber solid detergent composition may comprise filler material that is sodium sulphate.

The first chamber solid detergent composition may comprise from 0.5 g to 10 g filler material. The second chamber solid detergent composition may comprise from 0.1 g to 3.0 g filler material.

The first chamber solid detergent composition may comprise from 0.5 g to 10 g sodium sulphate. The second chamber solid detergent composition may comprise from 0.1 g to 3.0 g sodium sulphate.

Preferably, the first chamber comprises a first chamber liquid detergent composition. Preferably, the first chamber comprises a first chamber liquid detergent composition, wherein the first chamber liquid detergent composition is contained within two or more, or three or more, or four or more, or five or more, or even six or more, separate compartments within the first chamber.

The first chamber preferably comprises a first chamber solid detergent composition and a first chamber liquid detergent composition. Preferably, the first chamber comprises a first chamber solid detergent composition and a first chamber liquid detergent composition, wherein the first chamber solid detergent composition and the first chamber liquid detergent are each separately contained within separate compartments within the first chamber. It may also be possible for the first chamber solid detergent composition and first chamber liquid composition to be present in the same compartment. For example, the first chamber solid detergent composition could be a discontinuous phase dispersed within the first chamber liquid detergent composition that is in a continuous phase.

Preferably, the first chamber comprises surfactant. Preferably, the first chamber comprises from 0.5 g to 10 g surfactant. Preferably, the first chamber comprises surfactant selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

Preferably, the first chamber comprises from 0.5 g to 10 g surfactant selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

Alkalinity in Second Chamber

It may be desirable for the second chamber to comprise alkalinity and target the release of alkalinity into the prewashing stage of automatic dishwashing cycle.

This formulation approach can provide improved cleaning performance, especially improved soil wetting and soil swelling, and improved stain removal performance.

The second chamber may preferably comprise a source of alkalinity.

Preferably, the second chamber comprises a second chamber detergent composition that comprises a source of alkalinity. Preferably, the second chamber comprises a second chamber solid detergent composition that comprises a source of alkalinity. Preferably, the second chamber comprises a second chamber liquid detergent composition that comprises a source of alkalinity. Preferably, the second chamber comprises from 1.0 g to 20 g source of alkalinity.

Preferably, the source of alkalinity is selected from sodium carbonate, sodium bicarbonate, sodium silicate and any combination thereof. More preferably, the source of alkalinity is selected from sodium carbonate, sodium bicarbonate and any combination thereof.

The source of alkalinity can be the combination of sodium carbonate and sodium bicarbonate. Preferably, the weight ratio of the amount of sodium carbonate present in the second chamber to the amount of sodium bicarbonate present in the second chamber is in the range of from 1.5:1 to 5:1.

The source of alkalinity can be selected from sodium hydroxide and/or calcium oxide. The source of alkalinity may be sodium hydroxide.

Preferably, the second chamber comprises a second chamber detergent composition having an equilibrium pH, upon dilution to 0.1 g/l in deionized water at a temperature of 20° C., of from above 7.0 to 12.0, or from 9.0 to 11.0, or from 10.0 to 11.0.

The second chamber detergent composition can be a second chamber solid detergent composition, a second chamber liquid detergent composition, or a combination thereof.

The first chamber may comprise enzyme. The first chamber may comprise, on an active basis, from 1.0 mg to 300 mg enzyme.

The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber may comprise cellulase. The first chamber may comprise a bleaching enzyme. The first chamber may comprise a sugar degrading enzyme.

The first chamber may comprise builder. The first chamber may comprise a first chamber detergent composition that comprises builder. The first chamber may comprise a first chamber solid detergent composition that comprises builder. The first chamber may comprise from 1.0 g to 20 g builder. The builder can be selected from aminopolycarboxylic acids and/or salts thereof, carboxylic acids and/or salts thereof, and any combination thereof. The builder can be selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The builder can be selected from methylglycine-N,N-diacetic acid and/or salt thereof. The builder can be selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may also comprise an alkalinity source. The first chamber may comprise a first chamber detergent composition comprising an alkalinity source. The first chamber may comprise a first chamber solid detergent composition comprising an alkalinity source. The first chamber may comprise a first chamber liquid detergent composition comprising an alkalinity source. The first chamber may comprise from 1.0 g to 20 g alkalinity source.

A suitable alkalinity source is selected from sodium bicarbonate, sodium carbonate, sodium silicate, and any combination thereof. A suitable alkalinity source is sodium bicarbonate and/or sodium carbonate. A suitable alkalinity source is sodium carbonate. A suitable alkalinity source is sodium hydroxide and/or calcium oxide. A suitable alkalinity source is sodium hydroxide.

The first chamber may comprise bleach. The first chamber may comprise a first chamber detergent composition that comprises bleach. The first chamber may comprise a first chamber solid detergent composition that comprises bleach. The first chamber may comprise from 1.0 g to 5.0 g bleach. The bleach may comprise a source of peroxide. A suitable the source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst, or any combination thereof. The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer. A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition.

The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

Bleach in Second Chamber

It may be desired for the second chamber to comprise bleach. In this manner, bleach chemistry can be specifically targeted to the pre-wash stage of the automatic dishwashing machine cycle.

This formulation approach can provide improved cleaning performance, especially improved stain removal performance, and more especially improved stain removal for cereal stains and baked cheese stains.

It may be preferred for the second chamber to comprise bleach. The second chamber may comprise a second chamber detergent composition that comprises bleach. The second chamber may comprise a second chamber solid detergent composition that comprises bleach. The second chamber may comprise from 1.0 g to 5.0 g bleach.

The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst, or any combination thereof.

The second chamber may comprise from 1.0 g to 6.0 g source of peroxide. The second chamber may comprise from 1.0 mg to 10.0 mg transition metal bleach catalyst.

The second chamber may comprise a builder. The second chamber may comprise a second chamber solid detergent composition, wherein the second chamber solid detergent composition comprises a builder. The second chamber may comprise from 1.0 g to 10 g builder. The second chamber may comprise a second chamber solid detergent composition, wherein the second chamber solid detergent composition comprises from 1.0 g to 10 g builder.

The second chamber comprises a builder selected from aminopolycarboxylic acids and/or salts thereof, carboxylic acids and/or salts thereof, and any combination thereof. The second chamber may comprise a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The second chamber may comprise a builder selected from methylglycine-N,N-diacetic acid and/or salt thereof, glutamic acid diacetic acid and/or salt thereof; citric acid and/or a salt thereof; and any combination thereof. The second chamber may comprise a builder selected from methylglycine-N,N-diacetic acid and/or salt thereof; citric acid and/or a salt thereof; and any combination thereof. The second chamber may comprise a builder selected from methylglycine-N,N-diacetic acid and/or salt thereof. The second chamber may comprise a builder selected from citric acid and/or a salt thereof.

The second chamber may comprise from 1.0 g to 10 g builder selected from aminopolycarboxylic acids and/or salts thereof, carboxylic acids and/or salts thereof, and any combination thereof. The second chamber may comprise from 1.0 g to 10 g builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The second chamber may comprise from 1.0 g to 10 g builder selected from methylglycine-N,N-diacetic acid and/or salt thereof, glutamic acid diacetic acid and/or salt thereof; citric acid and/or a salt thereof; and any combination thereof. The second chamber may comprise from 1.0 g to 21 g builder selected from methylglycine-N,N-diacetic acid and/or salt thereof; citric acid and/or a salt thereof; and any combination thereof. The second chamber may comprise from 1.0 g to 10 g builder selected from methylglycine-N,N-diacetic acid and/or salt thereof. The second chamber may comprise from 1.0 g to 10 g builder selected from citric acid and/or a salt thereof.

The second chamber may comprise a source of alkalinity. The second chamber may comprise from 1.0 g to 10 g source of alkalinity. The second chamber may comprise a source of alkalinity selected from sodium carbonate, sodium bicarbonate, sodium silicate and any combination thereof. The second chamber may comprise a source of alkalinity selected from sodium carbonate, sodium bicarbonate and any combination thereof. The second chamber may comprise a source of alkalinity that is the combination of sodium carbonate and sodium bicarbonate. The second chamber may comprise a source of alkalinity that is the combination of sodium carbonate and sodium bicarbonate, and wherein the weight ratio of the amount of sodium carbonate present in the second chamber to the amount of sodium bicarbonate present in the second chamber is in the range of from 2:1 to 10:1.

The second chamber may comprise from 1.0 g to 10 g source of alkalinity selected from sodium carbonate, sodium bicarbonate, sodium silicate and any combination thereof. The second chamber may comprise from 1.0 g to 10 g source of alkalinity selected from sodium carbonate, sodium bicarbonate and any combination thereof. The second chamber may comprise from 1.0 g to 10 g source of alkalinity that is the combination of sodium carbonate and sodium bicarbonate. The second chamber may comprise from 1.0 g to 10 g source of alkalinity that is the combination of sodium carbonate and sodium bicarbonate, and wherein the weight ratio of the amount of sodium carbonate present in the second chamber to the amount of sodium bicarbonate present in the second chamber is in the range of from 2:1 to 10:1.

It may be preferred for the second chamber to be free of enzyme.

It may be preferred for the second chamber to be free of surfactant.

It may be preferred for the second chamber to be free of polymer.

It may be preferred for the second chamber to be free of builder.

The first chamber may comprise enzyme. The first chamber may comprise, on an active basis, from 1.0 mg to 300 mg enzyme. The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber comprises cellulase. The first chamber may comprise a bleaching enzyme. The first chamber may comprise a sugar degrading enzyme.

The first chamber may comprise builder. The first chamber may comprise from 1.0 g to 20 g builder. The first chamber may comprise a first chamber detergent composition that comprises builder. The first chamber may comprise a first chamber solid detergent composition that comprises builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise a first chamber detergent composition comprising an alkalinity source. The first chamber may comprise a first chamber solid detergent composition comprising an alkalinity source.

The first chamber may comprise from 1.0 g to 20 g alkalinity source. The first chamber may comprise a first chamber detergent composition comprising from 1.0 g to 20 g alkalinity source. The first chamber may comprise a first chamber solid detergent composition comprising from 1.0 g to 20 g alkalinity source.

A suitable alkalinity source is selected from sodium bicarbonate, sodium carbonate, sodium silicate, and any combination thereof. A suitable alkalinity source is sodium bicarbonate and/or sodium carbonate. A suitable alkalinity source is sodium carbonate.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition. The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

It may be preferred for the first chamber to be free of bleach.

Builder in Second Chamber

It might be desired for the second chamber to comprise builder. In this manner, builder chemistry can be specifically targeted to the pre-wash stage of the automatic dishwashing cycle.

Such a formulation approach can provide improved shine performance, especially improved shine performance on glass dishware and plastic dishware.

The second chamber may comprise builder. The second chamber may comprise from 1.0 g to 10 g builder. The second chamber may comprise a second chamber detergent composition that comprises builder. The second chamber may comprise a second chamber solid detergent composition that comprises builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof, glutamic acid diacetic acid and/or salt thereof; citric acid and/or a salt thereof; and any combination thereof. A suitable builder is selected from methylglycine-N,N-diacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof. A suitable builder comprises the combination of (i) methylglycine-N,N-diacetic acid and/or salt thereof and (ii) citric acid and/or a salt thereof.

The second chamber may comprise a second chamber detergent composition that has an equilibrium pH, upon dilution to 0.1 g/l in deionized water at a temperature of 20° C., of from above 7.0 to 12.0, or from 9.0 to 11.0, or from 10.0 to 11.0.

The second chamber may comprise an alkalinity source. The second chamber may comprise from 1.0 g to 10 g alkalinity source. The second chamber may comprise a second chamber detergent composition that comprises an alkalinity source. The second chamber may comprise a second chamber solid detergent composition that comprises an alkalinity source.

A suitable alkalinity source is selected from sodium bicarbonate, sodium carbonate, sodium silicate, and any combination thereof. A suitable alkalinity source is selected from sodium bicarbonate. sodium carbonate, and any combination thereof. A suitable alkalinity source comprises sodium bicarbonate and sodium carbonate.

The second chamber may comprise sodium bicarbonate and sodium carbonate in a weight ratio of from 0.2:1 to 0.8:1.

The second chamber may be free of enzyme.

The second chamber may be free of bleach.

The second chamber may be free of surfactant.

The second chamber may be free of polymer.

The first chamber may comprise a first chamber composition that has an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise from 1.0 g to 10 g alkalinity source. The first chamber may comprise a first chamber detergent composition that comprises an alkalinity source. The first chamber may comprise a first chamber solid detergent composition that comprises an alkalinity source.

A suitable alkalinity source is selected from sodium bicarbonate, sodium carbonate, sodium silicate, and any combination thereof. A suitable alkalinity source is selected from sodium carbonate, sodium silicate, and any combination thereof. A suitable alkalinity source is sodium carbonate.

The first chamber may comprise enzyme. The first chamber may comprise, on an active basis, from 1.0 mg to 300 mg enzyme. The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber may comprise cellulase. The first chamber may comprise a bleaching enzyme. The first chamber may comprise a sugar degrading enzyme.

The first chamber may comprise bleach. The first chamber may comprise a first chamber detergent composition that comprises bleach. The first chamber may comprise a first chamber solid detergent composition that comprises bleach. The first chamber may comprise from 1.0 g to 5.0 g bleach. The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst or any combination thereof.

The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition. The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

Enzyme in Second Chamber

It might be desired for the second chamber to comprise enzyme. In this manner, enzyme activity can be specifically targeted to the pre-wash stage of the automatic dishwashing cycle.

This formulation approach can provide improved cleaning performance, especially improved stain removal performance, and more especially improved stain removal for baked cheese stains and meat stains.

The second chamber may comprise enzyme. The second chamber may comprise, on an active enzyme basis, from 5 mg to 500 mg enzyme. The second chamber may comprise, on an active enzyme basis, from 10 mg to 100 mg enzyme.

The second chamber may comprise protease. The second chamber may comprise protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*. The second chamber may comprise, on an active enzyme basis, from 5.0 mg to 100 mg protease. The second chamber may comprise, on an active enzyme basis, from 5.0 mg to 100 mg protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*.

The second chamber may comprise amylase. The second chamber may comprise amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513. The second chamber may comprise, on an active enzyme basis, from 1.0 mg to 20 mg amylase. The second chamber may comprise, on an active enzyme basis, from 1.0 mg to 20 mg amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The second chamber may comprise protease and amylase. The second chamber may comprise lipase. The second chamber may comprise cellulase. The second chamber may comprise a bleaching enzyme. The second chamber may comprise a sugar degrading enzyme.

The second chamber may comprise a second chamber liquid detergent composition, and wherein the second chamber liquid detergent composition comprises enzyme. The second chamber may comprise a second chamber solid detergent composition, and wherein the second chamber solid detergent composition comprises enzyme.

The second chamber may comprise a second chamber composition, wherein the second chamber composition, upon dissolution in deionized water to a concentration of 0.1 g/l at a temperature of 20° C., has an equilibrium pH in the range of from 7.0 to 12, or from 8.0 to 12, or 9.0 to 11.

The second chamber may comprise a builder. The second chamber may comprise a second chamber solid detergent composition, wherein the second chamber solid detergent composition comprises a builder. The second chamber may comprise from 1.0 g to 20 g builder. The second chamber may comprise a second chamber solid detergent composition, wherein the second chamber solid detergent composition comprises from 1.0 g to 20 g builder.

The second chamber may comprise a builder selected from aminopolycarboxylic acids and/or salts thereof, carboxylic acids and/or salts thereof, and any combination thereof. The second chamber may comprise a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The second chamber may comprise a builder selected from methylglycine-N,N-diacetic acid and/or salt thereof, glutamic acid diacetic acid and/or salt thereof; citric acid and/or a salt thereof; and any combination thereof. The second chamber may comprise a builder selected from methylglycine-N,N-diacetic acid and/or salt thereof; citric acid and/or a salt thereof; and any combination thereof. The second chamber may comprise a builder selected from methylglycine-N,N-diacetic acid and/or salt thereof. The second chamber may comprise a builder selected from citric acid and/or a salt thereof. The second chamber may comprise from 1.0 g to 20 g builder selected from aminopolycarboxylic acids and/or salts thereof, carboxylic acids and/or salts thereof, and any combination thereof. The second chamber may comprise from 1.0 g to 20 g builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The second chamber may comprise from 1.0 g to 20 g builder selected from methylglycine-N,N-diacetic acid and/or salt thereof, glutamic acid diacetic acid and/or salt thereof; citric acid and/or a salt thereof; and any combination thereof. The second chamber may comprise from 1.0 g to 20 g builder selected from methylglycine-N,N-diacetic acid and/or salt thereof; citric acid and/or a salt thereof; and any combination thereof. The second chamber may comprise from 1.0 g to 20 g builder selected from methylglycine-N,N-diacetic acid and/or salt thereof. The second chamber may comprise from 1.0 g to 20 g builder selected from citric acid and/or a salt thereof.

The second chamber may comprise a source of alkalinity. The second chamber may comprise from 1.0 g to 20 g source of alkalinity. The second chamber may comprise a source of alkalinity selected from sodium carbonate, sodium bicarbonate, sodium silicate and any combination thereof. The second chamber may comprise a source of alkalinity selected from sodium carbonate, sodium bicarbonate and any combination thereof. The second chamber may comprise a source of alkalinity that is the combination of sodium carbonate and sodium bicarbonate. The second chamber may comprise a source of alkalinity that is the combination of sodium carbonate and sodium bicarbonate, and wherein the weight ratio of the amount of sodium carbonate present in the second chamber to the amount of sodium bicarbonate present in the second chamber is in the range of from 0.5:1 to 2:1. The second chamber may comprise from 1.0 g to 20 g source of alkalinity selected from sodium carbonate, sodium bicarbonate, sodium silicate and any combination thereof. The second chamber may comprise from 1.0 g to 20 g source of alkalinity selected from sodium carbonate, sodium bicarbonate and any combination thereof. The second chamber may comprise from 1.0 g to 20 g source of alkalinity that is the combination of sodium carbonate and sodium bicarbonate. The second chamber may comprise from 1.0 g to 20 g source of alkalinity that is the combination of sodium carbonate and sodium bicarbonate, and wherein the weight ratio of the amount of sodium carbonate present in the second chamber to the amount of sodium bicarbonate present in the second chamber is in the range of from 0.5:1 to 2:1.

The second chamber may be free of bleach.

The second chamber may be free of surfactant.

The second chamber may be free of polymer.

The first chamber may comprise builder. The first chamber may comprise from 1.0 g to 10 g builder. The first chamber may comprise builder selected from aminopolycarboxylic acids and/or salts thereof, carboxylic acids and/or salts thereof, and any combination thereof. The first chamber may comprise builder selected builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. The first chamber may comprise builder selected builder selected from methylglycine-N,N-diacetic acid and/or salt thereof. The first chamber may comprise builder selected builder selected from citric acid and/or a salt thereof. The first chamber may comprise a first chamber solid detergent composition comprising builder. The first chamber may comprise a first chamber solid detergent composition comprising from 1.0 g to 10 g builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise a first chamber detergent composition comprising an alkalinity source. The first chamber may comprise a first chamber solid detergent composition comprising an alkalinity source. The first chamber may comprise from 1.0 g to 10 g alkalinity source. The first chamber comprises a first chamber detergent composition comprising from 1.0 g to 10 g alkalinity source. The first chamber may comprise a first chamber solid detergent composition comprising from 1.0 g to 10 g alkalinity source.

A suitable alkalinity source is selected from sodium bicarbonate, sodium carbonate, sodium silicate, and any combination thereof. A suitable alkalinity source comprises sodium bicarbonate and sodium carbonate. Preferably, the weight ratio of sodium bicarbonate to sodium carbonate is in the range of from 0.5:1 to 2:1.

The first chamber may comprise bleach. The first chamber may comprise a first chamber detergent composition comprising bleach. The first chamber may comprise a first chamber solid detergent composition comprising bleach. The first chamber may comprise from 1.0 g to 5.0 g bleach. The first chamber may comprise a first chamber detergent composition comprising from 1.0 g to 5.0 g bleach. The first chamber may comprise a first chamber solid detergent composition comprising from 1.0 g to 5.0 g bleach. The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst, or any combination thereof.

The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber comprises from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber comprises a first chamber detergent composition that comprises surfactant. The first chamber may comprise a first chamber liquid detergent composition that comprises surfactant. The first chamber may comprise from 1.0 g to 10 g surfactant. A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition.

The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

Polymer in Second Chamber

It might be desired for the second chamber to comprise polymer. In this manner, polymer chemistry can be specifically targeted to the pre-wash stage of the automatic dishwashing cycle.

This formulation approach can provide improved cleaning performance, especially improved stain removal performance, and more especially improved stain removal for burnt on baked on (BOBO) stains and baked cheese stains.

The second chamber may comprise polymer. The second chamber may comprise a second chamber detergent composition that comprises polymer. The second chamber may comprise a second chamber solid detergent composition that comprises polymer. The second chamber may comprise from 0.5 g to 10 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The second chamber may comprise a source of alkalinity. The second chamber may comprise a second chamber detergent composition that comprises a source of alkalinity. The second chamber may comprise a second chamber solid detergent composition that comprises a source of alkalinity. The second chamber may comprise from 1.0 g to 20 g source of alkalinity.

A suitable source of alkalinity is selected from sodium carbonate, sodium bicarbonate, sodium silicate and any combination thereof. A suitable source of alkalinity is selected from sodium carbonate, sodium bicarbonate and any combination thereof. A suitable source of alkalinity is the combination of sodium carbonate and sodium bicarbonate. Preferably, the weight ratio of the amount of sodium carbonate present in the second chamber to the amount of sodium bicarbonate present in the second chamber is in the range of from 1.5:1 to 5:1.

The second chamber may comprise enzyme. The second chamber may comprise a second chamber detergent composition that comprises enzyme. The second chamber may comprise a second chamber solid detergent composition that comprises enzyme. The second chamber may comprise, on an active enzyme basis, from 5 mg to 500 mg enzyme. The second chamber may comprise, on an active enzyme basis, from 10 mg to 100 mg enzyme.

The second chamber may comprise protease. The second chamber may comprise a second chamber detergent composition that comprises protease. The second chamber may comprise a second chamber solid detergent composition that comprises protease. The second chamber may comprise, on an active enzyme basis, from 5.0 mg to 100 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*.

The second chamber may comprise amylase. The second chamber may comprise a second chamber detergent composition that comprises amylase. The second chamber may comprise a second chamber solid detergent composition that comprises amylase. The second chamber may comprise, on an active enzyme basis, from 1.0 mg to 20 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The second chamber may comprise both protease and amylase. The second chamber may comprise lipase. The second chamber may comprise cellulase. The second chamber may comprise a bleaching enzyme. The second chamber may comprise a sugar degrading enzyme.

The second chamber may be free of bleach.

The second chamber may be free of surfactant.

The first chamber may comprise enzyme. The first chamber may comprise, on an active basis, from 1.0 mg to 300 mg enzyme. The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber may comprise cellulase. The first chamber may comprise a bleaching enzyme. The first chamber may comprise a sugar degrading enzyme.

The first chamber may comprise builder. The first chamber may comprise a first chamber detergent composition that comprises builder. The first chamber may comprise a first chamber solid detergent composition that comprises builder. The first chamber may comprise from 1.0 g to 20 g builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise a first chamber detergent composition comprising an alkalinity source. The first chamber comprises a first chamber solid detergent composition comprising an alkalinity source. The first chamber may comprise from 1.0 g to 20 g alkalinity source.

A suitable alkalinity source is selected from sodium bicarbonate, sodium carbonate, sodium silicate, and any combination thereof. A suitable alkalinity source is sodium bicarbonate and/or sodium carbonate. A suitable alkalinity source is sodium carbonate.

The first chamber may comprise bleach. The first chamber may comprise a first chamber detergent composition that comprises bleach. The first chamber may comprise a first chamber solid detergent composition that comprises bleach. The first chamber may comprise from 1.0 g to 5.0 g bleach.

The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst, or any combination thereof.

The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition. The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

Solvent in Second Chamber

It might be desired for the second chamber to comprise solvent. In this manner, solvent chemistry can be specifically targeted to the pre-wash stage of the automatic dishwashing cycle.

This formulation approach can provide improved cleaning performance, especially improved stain removal performance, and more especially improved stain removal for tea stains and baked cheese stains.

The second chamber may comprise solvent. The second chamber may comprise a second chamber detergent composition that comprises a solvent. The second chamber may comprise a second chamber liquid detergent composition that comprises a solvent. The second chamber may comprise from 0.5 g to 10 g solvent.

A suitable solvent is an alkanolamine, preferably an ethanolamine. A suitable solvent is selected from monoethanolamine, diethanolamine, triethanolamine, or any combination thereof. A suitable solvent is monoethanolamine. A suitable solvent is diethanolamine. A suitable solvent is triethanolamine. A suitable solvent is methylglucamine.

The second chamber may comprise builder. The second chamber may comprise a second chamber detergent composition that comprises builder. The second chamber comprises a second chamber solid detergent composition that comprises builder. The second chamber comprises a second chamber liquid detergent composition that comprises builder. The second chamber comprises from 0.5 g to 10 g builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof, glutamic acid diacetic acid and/or salt thereof; citric acid and/or a salt thereof; and any combination thereof. A suitable builder is selected from methylglycine-N,N-diacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof. A suitable builder is the combination of (i) methylglycine-N,N-diacetic acid and/or salt thereof and (ii) citric acid and/or a salt thereof.

The second chamber may comprise a source of alkalinity. The second chamber may comprise a second chamber detergent composition that comprises a source of alkalinity. The second chamber may comprise a second chamber solid detergent composition that comprises a source of alkalinity. The second chamber may comprise a second chamber liquid detergent composition that comprises a source of alkalinity. The second chamber may comprise from 1.0 g to 20 g source of alkalinity.

8 source of alkalinity is selected from sodium carbonate, sodium bicarbonate, sodium silicate and any combination thereof. A suitable source of alkalinity is selected from sodium carbonate, sodium bicarbonate and any combination thereof. A suitable source of alkalinity is the combination of sodium carbonate and sodium bicarbonate. Preferably, the weight ratio of the amount of sodium carbonate present in the second chamber to the amount of sodium bicarbonate present in the second chamber is in the range of from 1.5:1 to 5:1.

The first chamber may comprise enzyme. The first chamber may comprise, on an active basis, from 1.0 mg to 300 mg enzyme. The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber may comprise cellulase. The first chamber may comprise a bleaching enzyme. The first chamber may comprise a sugar degrading enzyme.

The first chamber may comprise builder. The first chamber may comprise a first chamber detergent composition that comprises builder. The first chamber may comprise a first chamber solid detergent composition that comprises builder. The first chamber may comprise from 1.0 g to 20 g builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise a first chamber detergent composition comprising an alkalinity source. The first chamber may comprise a first chamber solid detergent composition comprising an alkalinity source. The first chamber may comprise from 1.0 g to 20 g alkalinity source. A suitable alkalinity source is selected from sodium bicarbonate, sodium carbonate, sodium silicate, and any combination thereof. A suitable alkalinity source is sodium bicarbonate and/or sodium carbonate. A suitable alkalinity source is sodium carbonate.

The first chamber may comprise bleach. The first chamber may comprise a first chamber detergent composition that comprises bleach. The first chamber may comprise a first chamber solid detergent composition that comprises bleach. The first chamber may comprise from 1.0 g to 5.0 g bleach. The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst, or any combination thereof.

The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition. The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

Surfactant in Second Chamber

It might be desired for the second chamber to comprise surfactant. In this manner, surfactant chemistry can be specifically targeted to the pre-wash stage of the automatic dishwashing cycle.

This formulation approach can provide cleaning performance benefits. This formulation approach may also provide shine benefits.

The second chamber may comprise surfactant. The second chamber may comprise a second chamber detergent composition that comprises surfactant. The second chamber may comprise a second chamber solid detergent composition that comprises surfactant. The second chamber may comprise a second chamber liquid detergent composition that comprises surfactant. The second chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

A suitable surfactant has the formula:

R—O-$EO_x$ wherein R is a $C_6$-$C_{15}$ alkyl, and x is from 1 to 30.

A suitable surfactant has the formula:

R—O-$EO_xPO_y$, wherein R is a $C_6$-$C_{18}$ alkyl, x is from 1 to 20, and y is from 1 to 20.

A suitable surfactant has the formula:

R—O—$PO_yEO_x$, wherein R is a $C_6$-$C_{18}$ alkyl, x is from 1 to 20, and y is from 1 to 20.

A suitable surfactant has the formula:

R—O-$EO_xPO_yEO_x$, wherein R is a $C_0$-$C_{18}$ alkyl, each x is independently from 1 to 20, and y is from 1 to 20.

A suitable surfactant has the formula:

R—O—$PO_yEO_xPO_y$, wherein R is a $C_6$-$C_{16}$ alkyl, x is from 1 to 20, and each y is independently from 1 to 20.

A suitable surfactant has the formula:

HO-$EO_xPO_yEO_x$—H, wherein, each x is independently from 1 to 50, and y is from 1 to 50.

A suitable surfactant has the formula:

HO—$PO_yEO_xPO_y$—H, wherein x is from 1 to 50, and each y is independently from 1 to 50.

The second chamber may comprise a source of alkalinity. The second chamber may comprise a second chamber detergent composition that comprises a source of alkalinity. The second chamber may comprise a second chamber solid detergent composition that comprises a source of alkalinity. The second chamber may comprise a second chamber liquid detergent composition that comprises a source of alkalinity. The second chamber may comprise from 1.0 g to 20 g source of alkalinity.

A suitable source of alkalinity is selected from sodium carbonate, sodium bicarbonate, sodium silicate and any combination thereof. A suitable source of alkalinity is selected from sodium carbonate, sodium bicarbonate and any combination thereof. A suitable source of alkalinity is the combination of sodium carbonate and sodium bicarbonate. Preferably, the weight ratio of the amount of sodium carbonate present in the second chamber to the amount of sodium bicarbonate present in the second chamber is in the range of from 1.5:1 to 5:1.

The first chamber may comprise enzyme. The first chamber may comprise, on an active basis, from 1.0 mg to 300 mg enzyme. The first chamber may comprise a first chamber detergent composition that comprises enzyme. The first chamber may comprise a first chamber solid detergent composition that comprises enzyme. The first chamber may comprise a first chamber liquid detergent composition that comprises enzyme.

A suitable enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof. A suitable enzyme is selected from protease, amylase, lipase, cellulase, bleaching enzyme, and any combination thereof. A suitable enzyme is selected from protease, amylase, lipase, cellulase, and any combination thereof. A suitable enzyme is selected from protease, amylase, lipase, and any combination thereof. A suitable enzyme is selected from protease, amylase, and any combination thereof.

The first chamber may comprise protease. The first chamber may comprise, on an active enzyme basis, from 1.0 mg to 300 mg protease. A suitable protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

The first chamber may comprise amylase. The first chamber may comprise, on an active enzyme basis, from 1.0 mg to 100 mg amylase. A suitable amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

The first chamber may comprise lipase. The first chamber may comprise cellulase. The first chamber may comprise a bleaching enzyme. The first chamber may comprise a sugar degrading enzyme.

The first chamber may comprise builder. The first chamber may comprise a first chamber detergent composition that comprises builder. The first chamber comprises a first chamber solid detergent composition that comprises builder. The first chamber may comprise from 1.0 g to 20 g builder.

A suitable builder is selected from aminopolycarboxylic acids and/or salts thereof, carboxylic acids and/or salts thereof, and any combination thereof. A suitable builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof. A suitable builder is selected from methylglycine-N,N-diacetic acid and/or salt thereof. A suitable builder is selected from citric acid and/or a salt thereof.

The first chamber may comprise a first chamber solid detergent composition having an equilibrium pH, upon dilution to 0.1 g/l in deionized water at a temperature of 20° C., of from above 7.0 to 12.0, or from 9.0 to 11.0, or from 10.0 to 11.0.

The first chamber may comprise an alkalinity source. The first chamber may comprise a first chamber detergent composition comprising an alkalinity source. The first chamber may comprise a first chamber solid detergent composition comprising an alkalinity source. The first chamber may comprise from 1.0 g to 20 g alkalinity source.

A suitable alkalinity source is selected from sodium bicarbonate, sodium carbonate, sodium silicate, and any combination thereof. A suitable alkalinity source is sodium bicarbonate and/or sodium carbonate. A suitable alkalinity source is sodium carbonate.

The first chamber may comprise bleach. The first chamber may comprise a first chamber detergent composition that comprises bleach. The first chamber may comprise a first chamber solid detergent composition that comprises bleach. The first chamber may comprise from 1.0 g to 5.0 g bleach.

The bleach may comprise a source of peroxide. A suitable source of peroxide is percarbonate. The bleach may comprise a bleach activator. A suitable bleach activator is tetraacetylethylenediamine. The bleach may comprise a bleach catalyst. A suitable bleach catalyst is a transition metal bleach catalyst. A suitable transition metal bleach catalyst is a cobalt bleach catalyst, a manganese bleach catalyst, an iron bleach catalyst or any combination thereof.

The first chamber may comprise from 1.0 g to 6.0 g source of peroxide. The first chamber may comprise from 1.0 mg to 10.0 mg transition metal bleach catalyst.

The first chamber may comprise filler material. The first chamber may comprise a first chamber detergent composition that comprises filler material. The first chamber may comprise a first chamber solid detergent composition that comprises filler material. The first chamber may comprise from 0.5 g to 10 g filler material. A suitable filler material is sodium sulphate.

The first chamber may comprise polymer. The first chamber may comprise a first chamber detergent composition that comprises polymer. The first chamber may comprise from 0.1 g to 3.0 g polymer.

A suitable polymer is selected from polycarboxylate polymer, sulphonated polycarboxylate polymer, and any combination thereof. A suitable polymer comprises both a polycarboxylate polymer and a sulphonated polycarboxylate polymer.

The first chamber may comprise surfactant. The first chamber may comprise a first chamber detergent composition that comprises surfactant. The first chamber may comprise a first chamber liquid detergent composition that comprises surfactant. The first chamber may comprise from 1.0 g to 10 g surfactant.

A suitable surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

The first chamber may comprise a first chamber solid detergent composition and a first chamber liquid detergent composition. The first chamber solid detergent composition and the first chamber liquid detergent composition may be contained within separate compartments of the first chamber.

The first chamber may comprise a first chamber liquid detergent composition, wherein the first chamber liquid detergent composition is contained within two or more, or three or more, or four or more, or five or more, or even six or more, separate compartments within the first chamber.

The second chamber may comprise a second chamber solid detergent composition and a second chamber liquid detergent composition. The second chamber solid detergent composition and the second chamber liquid detergent composition may be contained within separate compartments of the second chamber.

The second chamber may comprise a second chamber liquid detergent composition, wherein the second chamber liquid detergent composition is contained within two or more, or three or more, or four or more, or five or more, or even six or more, separate compartments within the second chamber.

Method of Washing Dishware

The method comprises the steps of:

(a) placing a pouch of the present disclosure in an automatic dishwashing machine such that the first chamber is placed inside a dispenser drawer in the automatic dishwashing machine and the dispenser drawer is closed, and the second chamber, whilst still being connected to the first chamber by the linking portion of film, hangs outside of the dispenser drawer in the washing zone of the automatic dishwashing machine;

(b) introducing first water into the washing zone of the automatic dishwashing machine and performing a pre-wash of the dishware contained therein, wherein during step (b) at least part of the water-soluble film that forms the second chamber dissolves such that at least some of the detergent ingredients comprised within the second chamber are released into the washing zone of the automatic dishwashing machine during this pre-washing step;

(c) optionally, removing at least some of the water from washing zone of the automatic dishwashing machine;

(d) introducing second water into the washing zone of the automatic dishwashing machine and performing a main wash of the dishware contained therein, wherein during step (d) the closed dispenser drawer is opened and at least part of the water-soluble film that forms the first chamber dissolves such that at least some of the detergent ingredients comprised within the first chamber are released into the washing zone of the automatic dishwashing machine during this main washing step; and (e) removing at least some of the water from the washing zone of the automatic dishwashing machine.

The method typically comprises the steps:

(f) introducing third water into the washing zone of the automatic dishwashing machine and rinsing the dishware contained therein; and (g) removing at least some of the water from the washing zone of the automatic dishwashing machine.

The method typically comprises the step:

(h) drying the dishware contained in the washing zone of the automatic dishwashing machine.

There may be additional pre-washing steps and water-removal steps between steps (c) and (d). In this manner, more than one pre-washing step may occur.

Step (a)

Step (a) places a pouch of the present disclosure in an automatic dishwashing machine such that the first chamber is placed inside a dispenser drawer in the automatic dishwashing machine and the dispenser drawer is closed, and the second chamber, whilst still being connected to the first chamber by the linking portion of film, hangs outside of the dispenser drawer in the washing zone of the automatic dishwashing machine.

Step (b)

Step (b) introduces first water into the washing zone of the automatic dishwashing machine and performs a pre-wash of the dishware contained therein. During step (b) at least part of the water-soluble film that forms the second chamber dissolves such that at least some of the detergent ingredients comprised within the second chamber are released into the washing zone of the automatic dishwashing machine during this pre-washing step.

Typically, from 1.0 litre to 8.0 litres, or from 2.0 litres to 6.0 litres first water is introduced. During step (b), the first water distributed throughout the dishware to be cleaned within the washing zone of the appliance. This distribution can be achieved by passing the first water through spray-arms located within the washing zone of the appliance. Typical appliances have from one to three spray-arms, for example, one underneath the dishware, one above the dishware, and maybe even between the dishware, for example on top of a cutlery rack.

The first water can be introduced as a cold fill or can be heated. Typically, the inlet temperature of the first water can be in the range of from 15° C. to 60° C.

The duration of step (b), pre-washing step, can be in the range of from 60 seconds to 30 minutes, typically from 5 minutes to 25 minutes, or from 10 minutes from 20 minutes.

Step (c)

Step (c) is optional. Step (c) removes at least some of the water from washing zone of the automatic dishwashing machine. This is typically achieved by opening a drain in the appliance that allows at least some of the water to be removed from the washing zone. Step (c) typically pumps water from the washing zone of the appliance.

Step (d)

Step (d) introduces second water into the washing zone of the automatic dishwashing machine and performing a main wash of the dishware contained therein. During step (d) the closed dispenser drawer is opened and at least part of the water-soluble film that forms the first chamber dissolves such that at least some of the detergent ingredients comprised within the first chamber are released into the washing zone of the automatic dishwashing machine during this main washing step.

Typically, from 1.0 litre to 8.0 litres, or from 2.0 litres to 6.0 litres of second water is introduced. During step (d), the second water can be distributed throughout the dishware to be cleaned within the washing zone of the appliance. This distribution can be achieved by passing the second water through spray-arms located within the washing zone of the appliance. Typical appliances have from one to three spray-arms, for example, one underneath the dishware, one above the dishware, and maybe even between the dishware, for example on top of a cutlery rack.

The second water can be introduced as a cold fill or can be heated. Typically, the inlet temperature of the first water can be in the range of from 15° C. to 70° C.

The duration of step (d), main-washing step, can be in the range of from 5 minutes to 90 minutes, typically from 5 minutes to 75 minutes, or from 10 minutes from 60 minutes.

Step (e)

Step (e) removes at least some of the water from the washing zone of the automatic dishwashing machine. This is typically achieved by opening a drain in the appliance that allows at least some of the water to be removed from the washing zone. Step (e) typically pumps water from the washing zone of the appliance.

Step (f)

Step (f) is optional. Step (f) introduces third water into the washing zone of the automatic dishwashing machine and rinsing the dishware contained therein.

Typically, from 1.0 litre to 8.0 litres, or from 2.0 litres to 6.0 litres of third water is introduced. During step (f), the third water can be distributed throughout the dishware to be cleaned within the washing zone of the appliance. This distribution can be achieved by passing the third water through spray-arms located within the washing zone of the appliance. Typical appliances have from one to three spray-arms, for example, one underneath the dishware, one above the dishware, and maybe even between the dishware, for example on top of a cutlery rack.

The third water can be introduced as a cold fill or can be heated. Typically, the inlet temperature of the first water can be in the range of from 15° C. to 80° C.

The duration of step (f), rinsing step, can be in the range of from 5 minutes to 60 minutes, typically from 5 minutes to 50 minutes, or from 10 minutes from 45 minutes.

Step (g)

Step (g) is optional. Step (g) removes at least some of the water from the washing zone of the automatic dishwashing machine. This is typically achieved by opening a drain in the appliance that allows at least some of the water to be removed from the washing zone. Step (g) typically pumps water from the washing zone of the appliance.

Step (h)

Step (h) is optional. Step (h) dries the dishware contained in the washing zone of the automatic dishwashing machine.

Maximum drying temperatures can be in the range of from 45° C. to 90° C.

Step (h) can have a duration of from 5 minutes to 60 minutes.

Embodiments

1. An automatic dishwashing detergent water-soluble pouch, wherein the pouch comprises a water-soluble film that forms at least two separate chambers that are enclosed by water-soluble film, the separate chambers are:
   (a) a first chamber; and
   (b) a second chamber,
   wherein the first chamber is connected to the second chamber by a linking portion of water-soluble film,
   wherein the length of the linking portion of water-soluble film between the first chamber and second chamber is at least 0.5 cm, and
   wherein the first chamber and second chamber comprise detergent ingredients.
2. A pouch according to embodiment 1, wherein when the pouch can be placed in an automatic dishwashing machine, and wherein:
   (i) the size and shape of the first chamber is suitable for placing in the dispenser drawer of the automatic dishwashing machine such that the dispenser drawer can be closed; and
   (ii) the size and shape of the linking portion of film and the size and shape of the second chamber is such that the second chamber can hang outside of the dispenser drawer whilst still being connected by the linking portion of film to the first chamber that is in the closed dispenser drawer.
3. A pouch according to any preceding embodiment, wherein the first chamber has the following dimensions:
   (i) a maximum length of from 1.0 cm to 10.0 cm;
   (ii) a maximum width of from 1.0 cm to 10.0 cm; and
   (iii) a maximum height of from 1.0 cm to 10.0 cm.
4. A pouch according to any preceding embodiment, wherein the first chamber has the following dimensions:
   (i) a maximum length of from 2.0 cm to 6.0 cm;
   (ii) a maximum width of from 2.0 cm to 5.0 cm; and
   (iii) a maximum height of from 1.0 cm to 3.0 cm.
5. A pouch according to any preceding embodiment, wherein the second chamber has the following dimensions:
   (i) a maximum length of from 1.0 cm to 10.0 cm;
   (ii) a maximum width of from 1.0 cm to 10.0 cm; and
   (iii) a maximum height of from 0.1 cm to 10.0 cm.
6. A pouch according to any preceding embodiment, wherein the second chamber has the following dimensions:
   (i) a maximum length of from 2.0 cm to 6.0 cm;
   (ii) a maximum width of from 1.0 cm to 5.0 cm; and
   (iii) a maximum height of from 0.25 cm to 3.0 cm.
7. A pouch according to any preceding embodiment, wherein the linking portion of film has the following dimensions:
   (i) a maximum length of from 0.5 cm to 25 cm; and
   (ii) a maximum width of from 1.0 cm to 10.0 cm.
8. A pouch according to any preceding embodiment, wherein the linking portion of film has the following dimensions:
   (i) a maximum length of from 2.0 cm to 5.0 cm; and
   (ii) a maximum width of from 1.0 cm to 5.0 cm.
9. A pouch according to any preceding embodiment, wherein the linking portion of film comprises at least one hole.
10. A pouch according to any preceding embodiment, wherein the length of the linking portion of water-soluble film between the first chamber and second chamber is at least 0.6 cm.
11. A pouch according to any preceding embodiment, wherein the length of the linking portion of water-soluble film between the first chamber and second chamber is at least 0.8 cm.
12. A pouch according to any preceding embodiment, wherein the length of the linking portion of water-soluble film between the first chamber and second chamber is at least 1.0 cm.
13. A pouch according to any preceding embodiment, wherein the length of the linking portion of water-soluble film between the first chamber and second chamber is at least 1.2 cm.
14. A pouch according to any preceding embodiment, wherein the length of the linking portion of water-soluble film between the first chamber and second chamber is at least 1.5 cm.

15. A pouch according to any preceding embodiment, wherein the length of the linking portion of water-soluble film between the first chamber and second chamber is at least 2.0 cm.
16. A pouch according to any preceding embodiment, wherein the length of the linking portion of water-soluble film between the first chamber and second chamber is at least 2.25 cm.
17. A pouch according to any preceding embodiment, wherein the length of the linking portion of water-soluble film between the first chamber and second chamber is at least 2.5 cm.
18. A pouch according to any preceding embodiment, wherein the length of the linking portion of water-soluble film between the first chamber and second chamber is at least 2.75 cm.
19. A pouch according to any preceding embodiment, wherein the length of the linking portion of water-soluble film between the first chamber and second chamber is at least 3.0 cm.
20. A pouch according to any preceding embodiment, wherein the length of the linking portion of water-soluble film between the first chamber and second chamber is at least 3.5 cm.
21. A pouch according to any preceding embodiment, wherein the length of the linking portion of water-soluble film between the first chamber and second chamber is at least 3.8 cm.
22 A pouch according to any preceding embodiment, wherein the first chamber comprises two or more compartments.
23. A pouch according to any preceding embodiment, wherein the first chamber comprises three or more compartments.
24. A pouch according to any preceding embodiment, wherein the first chamber comprises four or more compartments.
25. A pouch according to any preceding embodiment, wherein the first chamber comprises five or more compartments.
26. A pouch according to any preceding embodiment, wherein the first chamber comprises six or more compartments.
27. A pouch according to any preceding embodiment, wherein the first chamber comprises seven or more compartments.
28. A pouch according to any preceding embodiment, wherein the second chamber comprises two or more compartments.
29. A pouch according to any preceding embodiment, wherein the second chamber comprises three or more compartments.
30. A pouch according to any preceding embodiment, wherein the second chamber comprises four or more compartments.
31. A pouch according to any preceding embodiment, wherein the second chamber comprises five or more compartments.
32. A pouch according to any preceding embodiment, wherein the second chamber comprises six or more compartments.
33. A pouch according to any preceding embodiment, wherein the second chamber comprises seven or more compartments.
34. A pouch according to any preceding embodiment, wherein the pouch comprises a third chamber that is enclosed by water-soluble film, wherein the third chamber is connected to a connecting chamber that is the first chamber and/or the second chamber by a second linking portion of water-soluble film, wherein the length of the second linking portion of water-soluble film between the third chamber and the connecting chamber is at least 0.5 cm, and wherein the third chamber comprises a detergent ingredient.
35. A pouch according to embodiment 34, wherein the pouch comprises a fourth chamber, wherein the fourth chamber is connected to a connecting chamber that is the first chamber and/or the second chamber and/or third chamber by a third linking portion of film, wherein the length of the third linking portion of water-soluble film between the fourth chamber and the connecting chamber is at least 0.5 cm, and wherein the fourth chamber comprises a detergent ingredient.
36. A pouch according to embodiment 35, wherein the pouch comprises a fifth chamber, wherein the fifth chamber is connected to a connecting chamber that is the first chamber and/or the second chamber and/or third chamber and/or fourth chamber by a fourth linking portion of film, wherein the length of the fourth linking portion of water-soluble film between the fifth chamber and the connecting chamber is at least 0.5 cm, and wherein the fifth chamber comprises a detergent ingredient.
37. A pouch according to any preceding embodiment, wherein the first chamber comprises a solid detergent composition.
38. A pouch according to any preceding embodiment, wherein the first chamber comprises a liquid detergent composition.
39. A pouch according to any preceding embodiment, wherein the first chamber comprises at least two compartments, wherein the first compartment comprises a solid detergent composition, and wherein the second compartment comprises a liquid detergent composition.
40. A pouch according to any preceding embodiment, wherein the second chamber comprises a solid detergent composition.
41. A pouch according to any preceding embodiment, wherein the second chamber comprises a liquid detergent composition.
42. A pouch according to any preceding embodiment, wherein the second chamber comprises at least two compartments, wherein the first compartment comprises a solid detergent composition, and wherein the second compartment comprises a liquid detergent composition.
43. A pouch according to any preceding embodiment, wherein the water-soluble film comprises polyvinyl alcohol.
44. A pouch according to any preceding embodiment, wherein the first chamber comprises a first chamber solid detergent composition, and wherein the second chamber comprises a second chamber solid composition, and wherein the first chamber solid detergent composition and second chamber solid detergent composition comprise the same type of detergent ingredients.
45. A pouch according to embodiment 44, wherein the weight ratio of the first chamber solid detergent composition to the second chamber solid detergent composition is in the range of from greater than 1:1 to 10:1.
46. A pouch according to any of embodiments 44-55, wherein the weight ratio of the first chamber solid detergent composition to the second chamber solid detergent composition is in the range of from 2:1 to 5:1.

47. A pouch according to any of embodiments 44-46, wherein the first chamber comprises from 5.0 g to 30 g first chamber solid detergent composition, and wherein the second chamber comprises from 3.0 g to 20 g second chamber solid detergent composition.

48. A pouch according to any of embodiments 44-47, wherein the first chamber comprises from 10 g to 20 g first chamber solid detergent composition, and wherein the second chamber comprises from 3.0 g to 15 g second chamber solid detergent composition.

49. A pouch according to any of embodiments 44-48, wherein both the first chamber and the second chamber comprise protease.

50. A pouch according to any of embodiments 44-49, wherein both the first chamber solid detergent composition and the second chamber solid detergent composition comprise protease.

51. A pouch according to any of embodiments 44-50, wherein both the first chamber and the second chamber comprise protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

52. A pouch according to any of embodiments 44-51, wherein the first chamber comprises, on an active enzyme basis, from 10.0 mg to 300 mg protease and the second chamber comprises, on an active enzyme basis, from 5.0 mg to 100 mg protease.

53. A pouch according to any of embodiments 44-52, wherein both the first chamber and the second chamber comprise amylase.

54. A pouch according to any of embodiments 44-53, wherein both the first chamber and the second chamber comprise amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

55. A pouch according to any of embodiments 44-54, wherein the first chamber comprises, on an active enzyme basis, from 2.0 mg to 30 mg amylase and the second chamber comprises, on an active enzyme basis, from 1.0 mg to 10 mg amylase.

56. A pouch according to any of embodiments 44-55, wherein both the first chamber and the second chamber comprise protease and amylase.

57. A pouch according to any of embodiments 44-56, wherein the first chamber comprises, on an active enzyme basis, from 10.0 mg to 300 mg protease and from 2.0 mg to 30 mg amylase, and wherein the second chamber comprises, on an active enzyme basis, from 5.0 mg to 100 mg protease and from 1.0 mg to 10 mg amylase.

58. A pouch according to any of embodiments 44-57, wherein both the first chamber and the second chamber comprise lipase.

60. A pouch according to any of embodiments 44-59, wherein both the first chamber and the second chamber comprise cellulase.

61. A pouch according to any of embodiments 44-60, wherein both the first chamber and the second chamber comprise a bleaching enzyme.

62. A pouch according to any of embodiments 44-61, wherein both the first chamber and the second chamber comprise a sugar degrading enzyme.

63. A pouch according to any of embodiments 44-62, wherein both the first chamber and the second chamber comprise an enzyme selected from mannanase and/or pectate lyase.

64. A pouch according to any of embodiments 44-63, wherein both the first chamber and the second chamber comprise a builder.

65. A pouch according to any of embodiments 44-64, wherein both the first chamber solid detergent composition and the second chamber solid detergent composition comprise a builder.

66. A pouch according to any of embodiments 44-65, wherein the first chamber comprises from 1.0 g to 10 g builder, and wherein the second chamber comprises from 0.5 g to 4.0 g builder.

67. A pouch according to any of embodiments 44-66, wherein the first chamber solid detergent composition comprises from 1.0 g to 10 g builder, and wherein the second chamber solid detergent composition comprises from 0.5 g to 4.0 g builder.

68. A pouch according to any of embodiments 44-67, wherein both the first chamber solid detergent composition and the second chamber solid detergent composition comprise a builder selected from aminopolycarboxylic acids and/or salts thereof, carboxylic acids and/or salts thereof, and any combination thereof.

69. A pouch according to any of embodiments 44-68, wherein both the first chamber solid detergent composition and the second chamber solid detergent composition comprise a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

70. A pouch according to any of embodiments 44-69, wherein both the first chamber solid detergent composition and the second chamber solid detergent composition comprise a builder selected from methylglycine-N,N-diacetic acid and/or salt thereof, glutamic acid diacetic acid and/or salt thereof; citric acid and/or a salt thereof; and any combination thereof.

71. A pouch according to any of embodiments 44-70, wherein both the first chamber solid detergent composition and the second chamber solid detergent composition comprise a builder selected from methylglycine-N,N-diacetic acid and/or salt thereof; citric acid and/or a salt thereof; and any combination thereof.

72. A pouch according to any of embodiments 44-71, both the first chamber solid detergent composition and the second chamber solid detergent composition comprise a builder selected from methylglycine-N,N-diacetic acid and/or salt thereof.

73. A pouch according to any of embodiments 44-72, wherein both the first chamber solid detergent composition and the second chamber solid detergent composition comprise a builder selected from citric acid and/or a salt thereof.

74. A pouch according to any of embodiments 44-73, wherein the first chamber solid detergent composition comprises from 1.0 g to 10 g builder selected from methylglycine-N,N-diacetic acid and/or salt thereof; citric acid and/or a salt thereof; and any combination thereof, and wherein the second chamber solid detergent composition comprises from 0.5 g to 4.0 g builder selected from methylglycine-N,N-diacetic acid and/or salt thereof; citric acid and/or a salt thereof; and any combination thereof.

75. A pouch according to any of embodiments 44-74, wherein the first chamber solid detergent composition has an equilibrium pH, upon dilution to 0.1 g/l in deionized water at a temperature of 20° C., of from above 7.0 to 12.0, and wherein the second chamber solid detergent composition has an equilibrium pH, upon dilution to 0.1 g/l in deionized water at a temperature of 20° C., of from above 7.0 to 12.0.

76. A pouch according to any of embodiments 44-75, wherein the first chamber solid detergent composition has an equilibrium pH, upon dilution to 0.1 g/l in deionized water at a temperature of 20° C., of from 9.0 to 11.0, and wherein the second chamber solid detergent composition has an equilibrium pH, upon dilution to 0.1 g/l in deionized water at a temperature of 20° C., of from 9.0 to 11.0.

77. A pouch according to any of embodiments 44-76, wherein the first chamber solid detergent composition has an equilibrium pH, upon dilution to 0.1 g/l in deionized water at a temperature of 20° C., of from 10.0 to 11.0, and wherein the second chamber solid detergent composition has an equilibrium pH, upon dilution to 0.1 g/l in deionized water at a temperature of 20° C., of from 10.0 to 11.0.

78. A pouch according to any of embodiments 44-77, wherein the first chamber solid detergent composition comprises an alkalinity source selected from sodium carbonate, sodium silicate, and any combination thereof, and wherein the second chamber solid detergent composition comprises an alkalinity source selected from sodium carbonate, sodium silicate, and any combination thereof.

79. A pouch according to any of embodiments 44-78, wherein the first chamber solid detergent composition comprises sodium carbonate, and wherein the second chamber solid detergent composition comprises sodium carbonate.

80. A pouch according to any of embodiments 44-79, wherein the first chamber solid detergent composition comprises from 1.0 g to 12.0 g alkalinity source selected from sodium carbonate, sodium silicate, and any combination thereof, and wherein the second chamber solid detergent composition comprises from 0.5 g to 4.0 g alkalinity source selected from sodium carbonate, sodium silicate, and any combination thereof.

81. A pouch according to any of embodiments 44-80, wherein the first chamber solid detergent composition comprises from 1.0 g to 12.0 g sodium carbonate, and wherein the second chamber solid detergent composition comprises from 0.5 g to 4.0 g sodium carbonate.

82. A pouch according to any of embodiments 44-81, wherein both the first chamber and the second chamber comprise a bleach.

83. A pouch according to any of embodiments 44-82, wherein both the first chamber and the second chamber comprise a source of peroxide.

84. A pouch according to any of embodiments 44-83, wherein both the first chamber and the second chamber comprise a percarbonate bleach.

85. A pouch according to any of embodiments 44-84, wherein both the first chamber and the second chamber comprise a bleach activator.

86. A pouch according to any of embodiments 44-85, wherein both the first chamber and the second chamber comprise a tetraacetylethylenediamine bleach activator.

87. A pouch according to any of embodiments 44-86, wherein both the first chamber and the second chamber comprise a bleach catalyst.

88. A pouch according to any of embodiments 44-87, wherein both the first chamber and the second chamber comprise a bleach catalyst that is a transition metal bleach catalyst.

89. A pouch according to any of embodiments 44-88, wherein both the first chamber and the second chamber comprise a bleach catalyst that is a cobalt bleach catalyst, a manganese bleach catalyst, or any combination thereof.

90. A pouch according to any of embodiments 44-89, wherein both the first chamber solid detergent composition and the second chamber solid detergent composition comprise a bleach.

91. A pouch according to any of embodiments 44-90, wherein both the first chamber solid detergent composition and the second chamber solid detergent composition comprise a source of peroxide.

92. A pouch according to any of embodiments 44-90, wherein both the first chamber solid detergent composition comprises from 1.0 g to 6.0 g source of peroxide, and wherein the second chamber solid detergent composition comprises from 0.3 g to 3.0 g source of peroxide.

93. A pouch according to any of embodiments 44-92, wherein both the first chamber solid detergent composition and the second chamber solid detergent composition comprise a percarbonate bleach.

94. A pouch according to any of embodiments 44-93, wherein both the first chamber solid detergent composition comprises from 1.0 g to 6.0 g percarbonate bleach, and wherein the second chamber solid detergent composition comprises from 0.3 g to 3.0 g percarbonate bleach.

95. A pouch according to any of embodiments 44-94, wherein both the first chamber solid detergent composition and the second chamber solid detergent composition comprise a percarbonate bleach, and wherein the weight ratio of the amount of percarbonate bleach present in the first chamber to the amount of percarbonate bleach present in the second chamber is in the range of from above 1:1 to 5:1.

96. A pouch according to any of embodiments 44-95, wherein both the first chamber solid detergent composition and the second chamber solid detergent composition comprise a percarbonate bleach, and wherein the weight ratio of the amount of percarbonate bleach present in the first chamber to the amount of percarbonate bleach present in the second chamber is in the range of from 2:1 to 4:1.

97. A pouch according to any of embodiments 44-96, wherein both the first chamber solid detergent composition and the second chamber solid detergent composition comprise a bleach activator.

98. A pouch according to any of embodiments 44-97, wherein both the first chamber solid detergent composition and the second chamber solid detergent composition comprise a tetraacetylethylenediamine bleach activator.

99. A pouch according to any of embodiments 44-98, wherein both the first chamber solid detergent composition and the second chamber solid detergent composition comprise a bleach catalyst.

100. A pouch according to any of embodiments 44-99, wherein both the first chamber solid detergent composition and the second chamber solid detergent composition comprise a bleach catalyst that is a transition metal bleach catalyst.

101. A pouch according to any of embodiments 44-100, wherein the first chamber solid detergent composition comprises from 1.0 mg to 10.0 mg transition metal bleach catalyst, and wherein the second chamber solid detergent composition comprises from 0.5 mg to 5.0 mg transition metal bleach catalyst.

102. A pouch according to any of embodiments 44-101, wherein both the first chamber solid detergent composition and the second chamber solid detergent composition comprise a bleach catalyst that is a cobalt bleach catalyst, a manganese bleach catalyst, or any combination thereof.

103. A pouch according to any of embodiments 44-102, wherein both the first chamber and the second chamber comprise a polymer.

104. A pouch according to any of embodiments 44-103, wherein both the first chamber and the second chamber comprise a polymer selected from polycarboxylate polymer, sulphonated polycarboxylate polymer, and any combination thereof.

105. A pouch according to any of embodiments 44-104, wherein both the first chamber and the second chamber comprise a polycarboxylate polymer and a sulphonated polycarboxylate polymer.

106. A pouch according to any of embodiments 44-105, wherein the first chamber comprises from 0.2 g to 3.0 g polymer selected from polycarboxylate polymer, sulphonated polycarboxylate polymer, and any combination thereof, and wherein the second chamber comprises from 0.1 g to 2.0 g polymer selected from polycarboxylate polymer, sulphonated polycarboxylate polymer, and any combination thereof 107. A pouch according to any of embodiments 44-106, wherein the weight ratio of the total amount of polycarboxylate polymer and sulphonated polycarboxylate polymer present in the first chamber to the total amount of polycarboxylate polymer and sulphonated polycarboxylate polymer present in the second chamber is in the range of from above 1:1 to 5:1.

108. A pouch according to any of embodiments 44-107, wherein the weight ratio of the total amount of polycarboxylate polymer and sulphonated polycarboxylate polymer present in the first chamber to the total amount of polycarboxylate polymer and sulphonated polycarboxylate polymer present in the second chamber is in the range of from 2:1 to 4:1.

109. A pouch according to any of embodiments 44-108, wherein the first chamber comprises from 0.2 g to 3.0 g combination of a polycarboxylate polymer and a sulphonated polycarboxylate polymer, and wherein the second chamber comprises from 0.1 g to 2.0 g combination of a polycarboxylate polymer and a sulphonated polycarboxylate polymer.

110. A pouch according to any of embodiments 44-109, wherein both the first chamber solid detergent composition and the second chamber solid detergent composition comprise a polymer.

111. A pouch according to any of embodiments 44-110, wherein both the first chamber solid detergent composition and the second chamber solid detergent composition comprise a polymer selected from polycarboxylate polymer, sulphonated polycarboxylate polymer, and any combination thereof.

112. A pouch according to any of embodiments 44-111, wherein both the first chamber solid detergent composition and the second chamber solid detergent composition comprise a polycarboxylate polymer and a sulphonated polycarboxylate polymer.

113. A pouch according to any of embodiments 44-112, wherein the first chamber solid detergent composition comprises from 0.2 g to 3.0 g polymer selected from polycarboxylate polymer, sulphonated polycarboxylate polymer, and any combination thereof, and wherein the second chamber solid detergent composition comprises from 0.1 g to 2.0 g polymer selected from polycarboxylate polymer, sulphonated polycarboxylate polymer, and any combination thereof 114. A pouch according to any of embodiments 44-113, wherein the weight ratio of the total amount of polycarboxylate polymer and sulphonated polycarboxylate polymer present in the first chamber solid detergent composition to the total amount of polycarboxylate polymer and sulphonated polycarboxylate polymer present in the second chamber solid detergent composition is in the range of from above 1:1 to 5:1.

115. A pouch according to any of embodiments 44-114, wherein the weight ratio of the total amount of polycarboxylate polymer and sulphonated polycarboxylate polymer present in the first chamber solid detergent composition to the total amount of polycarboxylate polymer and sulphonated polycarboxylate polymer present in the second chamber solid detergent composition is in the range of from 2:1 to 4:1.

116. A pouch according to any of embodiments 44-115, wherein the first chamber solid detergent composition comprises from 0.2 g to 3.0 g combination of a polycarboxylate polymer and a sulphonated polycarboxylate polymer, and wherein the second chamber solid detergent composition comprises from 0.1 g to 2.0 g combination of a polycarboxylate polymer and a sulphonated polycarboxylate polymer.

117. A pouch according to any of embodiments 44-116, wherein both the first chamber and second chamber comprise filler material.

118. A pouch according to any of embodiments 44-117, wherein both the first chamber solid detergent composition and second chamber solid detergent composition comprise filler material.

119. A pouch according to any of embodiments 44-118, wherein both the first chamber solid detergent composition and second chamber solid detergent composition comprise filler material that is sodium sulphate.

120. A pouch according to any of embodiments 44-119, wherein the first chamber solid detergent composition comprises from 0.5 g to 10 g filler material, and wherein the second chamber solid detergent composition comprises from 0.1 g to 3.0 g filler material.

121. A pouch according to any of embodiments 44-120, wherein the first chamber solid detergent composition comprises from 0.5 g to 10 g sodium sulphate, and wherein the second chamber solid detergent composition comprises from 0.1 g to 3.0 g sodium sulphate.

122. A pouch according to any of embodiments 44-121, wherein the first chamber comprises a first chamber liquid detergent composition.

123. A pouch according to any of embodiments 44-122, wherein the first chamber comprises a first chamber liquid detergent composition, wherein the first chamber liquid detergent composition is contained within two or more separate compartments within the first chamber.

124. A pouch according to any of embodiments 44-123, wherein the first chamber comprises a first chamber liquid detergent composition, wherein the first chamber liquid detergent composition is contained within three or more separate compartments within the first chamber.

125. A pouch according to any of embodiments 44-124, wherein the first chamber comprises a first chamber liquid detergent composition, wherein the first chamber liquid detergent composition is contained within four or more separate compartments within the first chamber.

126. A pouch according to any of embodiments 44-125, wherein the first chamber comprises a first chamber liquid detergent composition, wherein the first chamber liquid detergent composition is contained within five or more separate compartments within the first chamber.

127. A pouch according to any of embodiments 44-126, wherein the first chamber comprises a first chamber solid detergent composition and a first chamber liquid detergent composition.

128. A pouch according to any of embodiments 44-127, wherein the first chamber comprises a first chamber solid detergent composition and a first chamber liquid detergent composition, wherein the first chamber solid detergent composition and the first chamber liquid detergent are each separately contained within separate compartments within the first chamber.

129. A pouch according to any of embodiments 44-128, wherein the first chamber comprises surfactant.

130. A pouch according to any of embodiments 44-129, wherein the first chamber comprises from 0.5 g to 10 g surfactant.

131. A pouch according to any of embodiments 44-130, wherein the first chamber comprises surfactant selected from:
(i) R—O-$EO_x$, wherein R is a $C_6$-$C_{18}$ alkyl, and x is from 1 to 30; or
(ii) R—O-$EO_xPO_y$, wherein R is a $C_6$-$C_{18}$ alkyl, x is from 1 to 20, and y is from 1 to 20; or
(iii) R—O—$PO_yEO_x$, wherein R is a $C_6$-$C_{18}$ alkyl, x is from 1 to 20, and y is from 1 to 20; or
(iv) R—O-$EO_xPO_yEO_x$, wherein R is a $C_6$-$C_{18}$ alkyl, each x is independently from 1 to 20, and y is from 1 to 20; or
(v) R—O—$PO_yEO_xPO_y$, wherein R is a $C_6$-$C_{18}$ alkyl, x is from 1 to 20, and each y is independently from 1 to 20; or
(vi) HO-$EO_xPO_yEO_x$—H, wherein, each x is independently from 1 to 50, and y is from 1 to 50; or
(vii) HO—$PO_yEO_xPO_y$—H, wherein x is from 1 to 50, and each y is independently from 1 to 50; or
(viii) any combination thereof.

132. A pouch according to any of embodiments 44-131, wherein the first chamber comprises from 0.5 g to 10 g surfactant selected from:
(i) R—O-$EO_x$, wherein R is a $C_6$-$C_{18}$ alkyl, and x is from 1 to 30; or
(ii) R—O-$EO_xPO_y$, wherein R is a $C_6$-$C_{18}$ alkyl, x is from 1 to 20, and y is from 1 to 20; or
(iii) R—O—$PO_yEO_x$, wherein R is a $C_6$-$C_{18}$ alkyl, x is from 1 to 20, and y is from 1 to 20; or
(iv) R—O-$EO_xPO_yEO_x$, wherein R is a $C_6$-$C_{18}$ alkyl, each x is independently from 1 to 20, and y is from 1 to 20; or
(v) R—O—$PO_yEO_xPO_y$, wherein R is a $C_6$-$C_{18}$ alkyl, x is from 1 to 20, and each y is independently from 1 to 20; or
(vi) HO-$EO_xPO_yEO_x$—H, wherein, each x is independently from 1 to 50, and y is from 1 to 50; or
(vii) HO—$PO_yEO_xPO_y$—H, wherein x is from 1 to 50, and each y is independently from 1 to 50; or
(viii) any combination thereof.

133. A pouch according to any of embodiments 1-43, wherein the second chamber comprises enzyme.

134. A pouch according to any of embodiment 133, wherein the second chamber comprises, on an active enzyme basis, from 5 mg to 500 mg enzyme.

135. A pouch according to any of embodiments 133-134, wherein the second chamber comprises, on an active enzyme basis, from 10 mg to 100 mg enzyme.

136. A pouch according to any of embodiments 133-135, wherein the second chamber comprises protease.

137. A pouch according to any of embodiments 133-136, wherein the second chamber comprises protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

138. A pouch according to any of embodiments 133-137, wherein the second chamber comprises, on an active enzyme basis, from 5.0 mg to 100 mg protease.

139. A pouch according to any of embodiments 133-138, wherein the second chamber comprises, on an active enzyme basis, from 5.0 mg to 100 mg protease selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

140. A pouch according to any of embodiments 133-139, wherein the second chamber comprises amylase.

141. A pouch according to any of embodiments 133-140, wherein the second chamber comprises amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

142. A pouch according to any of embodiments 133-141, wherein the second chamber comprises, on an active enzyme basis, from 1.0 mg to 20 mg amylase.

143. A pouch according to any of embodiments 133-142, wherein the second chamber comprises, on an active enzyme basis, from 1.0 mg to 20 mg amylase selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

144. A pouch according to any of embodiments 133-143, wherein the second chamber comprises protease and amylase.

145. A pouch according to any of embodiments 133-144, wherein the second chamber comprises lipase.

146. A pouch according to any of embodiments 133-145, wherein the second chamber comprises cellulase.

147. A pouch according to any of embodiments 133-146, wherein the second chamber comprises a bleaching enzyme.

148. A pouch according to any of embodiments 133-147, wherein the second chamber comprises a sugar degrading enzyme.

149. A pouch according to any of embodiments 133-148, wherein the second chamber comprises an enzyme selected from mannanase and/or pectate lyase.

150. A pouch according to any of embodiments 133-149, wherein the second chamber comprises a second chamber liquid detergent composition, and wherein the second chamber liquid detergent composition comprises enzyme.

151. A pouch according to any of embodiments 133-150, wherein the second chamber comprises a second chamber solid detergent composition, and wherein the second chamber solid detergent composition comprises enzyme.

152. A pouch according to any of embodiments 133-151, wherein the second chamber comprises a second chamber composition, wherein the second chamber composition, upon dissolution in deionized water to a concentration of 0.1 g/1 at a temperature of 20° C., has an equilibrium pH in the range of from 8.0 to 12.

153. A pouch according to any of embodiments 133-152, wherein the second chamber comprises a builder.

154. A pouch according to any of embodiments 133-153, wherein the second chamber comprises a second chamber solid detergent composition, wherein the second chamber solid detergent composition comprises a builder.

155. A pouch according to any of embodiments 133-154, wherein the second chamber comprises from 1.0 g to 20 g builder.

156. A pouch according to any of embodiments 133-155, wherein the second chamber comprises a second chamber solid detergent composition, wherein the second chamber solid detergent composition comprises from 1.0 g to 20 g builder.

157. A pouch according to any of embodiments 133-156, wherein the second chamber comprises a builder selected from aminopolycarboxylic acids and/or salts thereof, carboxylic acids and/or salts thereof, and any combination thereof.

158. A pouch according to any of embodiments 133-157, wherein the second chamber comprises a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

159. A pouch according to any of embodiments 133-158, wherein the second chamber comprises a builder selected from methylglycine-N,N-diacetic acid and/or salt thereof, glutamic acid diacetic acid and/or salt thereof; citric acid and/or a salt thereof; and any combination thereof.

160. A pouch according to any of embodiments 133-159, wherein the second chamber comprises a builder selected from methylglycine-N,N-diacetic acid and/or salt thereof; citric acid and/or a salt thereof; and any combination thereof.

161. A pouch according to any of embodiments 133-160, wherein the second chamber comprises a builder selected from methylglycine-N,N-diacetic acid and/or salt thereof.

162. A pouch according to any of embodiments 133-161, wherein the second chamber comprises a builder selected from citric acid and/or a salt thereof.

163. A pouch according to any of embodiments 133-162, wherein the second chamber comprises from 1.0 g to 20 g builder selected from aminopolycarboxylic acids and/or salts thereof, carboxylic acids and/or salts thereof, and any combination thereof.

164. A pouch according to any of embodiments 133-163, wherein the second chamber comprises from 1.0 g to 20 g builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

165. A pouch according to any of embodiments 133-164, wherein the second chamber comprises from 1.0 g to 20 g builder selected from methylglycine-N,N-diacetic acid and/or salt thereof, glutamic acid diacetic acid and/or salt thereof; citric acid and/or a salt thereof; and any combination thereof.

166. A pouch according to any of embodiments 133-165, wherein the second chamber comprises from 1.0 g to 20 g builder selected from methylglycine-N,N-diacetic acid and/or salt thereof; citric acid and/or a salt thereof; and any combination thereof.

167. A pouch according to any of embodiments 133-166, wherein the second chamber comprises from 1.0 g to 20 g builder selected from methylglycine-N,N-diacetic acid and/or salt thereof.

168. A pouch according to any of embodiments 133-167, wherein the second chamber comprises from 1.0 g to 20 g builder selected from citric acid and/or a salt thereof.

169. A pouch according to any of embodiments 133-168, wherein the second chamber comprises a source of alkalinity.

170. A pouch according to any of embodiments 133-169, wherein the second chamber comprises from 1.0 g to 20 g source of alkalinity.

171. A pouch according to any of embodiments 133-170, wherein the second chamber comprises a source of alkalinity selected from sodium carbonate, sodium bicarbonate, sodium silicate and any combination thereof.

172. A pouch according to any of embodiments 133-171, wherein the second chamber comprises a source of alkalinity selected from sodium carbonate, sodium bicarbonate and any combination thereof.

173. A pouch according to any of embodiments 133-172, wherein the second chamber comprises a source of alkalinity that is the combination of sodium carbonate and sodium bicarbonate.

174. A pouch according to any of embodiments 133-173, wherein the second chamber comprises a source of alkalinity that is the combination of sodium carbonate and sodium bicarbonate, and wherein the weight ratio of the amount of sodium carbonate present in the second chamber to the amount of sodium bicarbonate present in the second chamber is in the range of from 0.5:1 to 2:1.

175. A pouch according to any of embodiments 133-174, wherein the second chamber comprises from 1.0 g to 20 g source of alkalinity selected from sodium carbonate, sodium bicarbonate, sodium silicate and any combination thereof.

176. A pouch according to any of embodiments 133-175, wherein the second chamber comprises from 1.0 g to 20 g source of alkalinity selected from sodium carbonate, sodium bicarbonate and any combination thereof.

177. A pouch according to any of embodiments 133-176, wherein the second chamber comprises from 1.0 g to 20 g source of alkalinity that is the combination of sodium carbonate and sodium bicarbonate.

178. A pouch according to any of embodiments 133-177, wherein the second chamber comprises from 1.0 g to 20 g source of alkalinity that is the combination of sodium carbonate and sodium bicarbonate, and wherein the weight ratio of the amount of sodium carbonate present in the second chamber to the amount of sodium bicarbonate present in the second chamber is in the range of from 0.5:1 to 2:1.

179. A pouch according to any of embodiments 133-178, wherein the second chamber is free of bleach.

180. A pouch according to any of embodiments 133-179, wherein the second chamber is free of surfactant.

181. A pouch according to any of embodiments 133-180, wherein the second chamber is free of polymer.

182. A pouch according to any of embodiments 133-181, wherein the first chamber comprises builder.

183. A pouch according to any of embodiments 133-182, wherein the first chamber comprises from 1.0 g to 10 g builder.

184. A pouch according to any of embodiments 133-183, wherein the first chamber comprises builder selected from aminopolycarboxylic acids and/or salts thereof, carboxylic acids and/or salts thereof, and any combination thereof.

185. A pouch according to any of embodiments 133-184, wherein the first chamber comprises builder selected builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

186. A pouch according to any of embodiments 133-185 wherein the first chamber comprises builder selected builder selected from methylglycine-N,N-diacetic acid and/or salt thereof.

187. A pouch according to any of embodiments 133-186, wherein the first chamber comprises builder selected builder selected from citric acid and/or a salt thereof.

188. A pouch according to any of embodiments 133-187, wherein the first chamber comprises a first chamber solid detergent composition comprising builder.

189. A pouch according to any of embodiments 133-188, wherein the first chamber comprises a first chamber solid detergent composition comprising from 1.0 g to 10 g builder.

190. A pouch according to any of embodiments 188-189, wherein the builder is selected from aminopolycarboxylic acids and/or salts thereof, carboxylic acids and/or salts thereof, and any combination thereof.

191. A pouch according to any of embodiments 188-190, wherein the builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

192. A pouch according to any of embodiments 188-191, wherein the builder is selected from methylglycine-N,N-diacetic acid and/or salt thereof.

193. A pouch according to any of embodiments 188-191, wherein the builder is selected from citric acid and/or a salt thereof.

194. A pouch according to any of embodiments 133-193, wherein the first chamber comprises a first chamber solid detergent composition having an equilibrium pH, upon dilution to 0.1 g/l in deionized water at a temperature of 20° C., of from above 7.0 to 12.0.

195. A pouch according to any of embodiments 133-194, wherein the first chamber comprises a first chamber solid detergent composition having an equilibrium pH, upon dilution to 0.1 g/l in deionized water at a temperature of 20° C., of from 9.0 to 11.0.

196. A pouch according to any of embodiments 133-195, wherein the first chamber comprises a first chamber solid detergent composition having an equilibrium pH, upon dilution to 0.1 g/l in deionized water at a temperature of 20° C., of from 10.0 to 11.0.

197. A pouch according to any of embodiments 133-196, wherein the first chamber comprises an alkalinity source.

198. A pouch according to any of embodiments 133-197, wherein the first chamber comprises a first chamber detergent composition comprising an alkalinity source.

199. A pouch according to any of embodiments 133-198, wherein the first chamber comprises a first chamber solid detergent composition comprising an alkalinity source.

200. A pouch according to any of embodiments 133-199, wherein the first chamber comprises from 1.0 g to 10 g alkalinity source.

201. A pouch according to any of embodiments 133-200, wherein the first chamber comprises a first chamber detergent composition comprising from 1.0 g to 10 g alkalinity source.

202. A pouch according to any of embodiments 133-201, wherein the first chamber comprises a first chamber solid detergent composition comprising from 1.0 g to 10 g alkalinity source.

203. A pouch according to any of embodiments 197-202, wherein the alkalinity source is selected from sodium bicarbonate, sodium carbonate, sodium silicate, and any combination thereof.

204. A pouch according to any of embodiments 197-203, wherein the alkalinity source comprises sodium bicarbonate and sodium carbonate.

205. A pouch according to any of embodiment 204, wherein the weight ratio of sodium bicarbonate to sodium carbonate is in the range of from 0.5:1 to 2:1.

206. A pouch according to any of embodiments 133-205, wherein the first chamber comprises bleach.

207. A pouch according to any of embodiments 133-206, wherein the first chamber comprises a first chamber detergent composition comprising bleach.

208. A pouch according to any of embodiments 133-207, wherein the first chamber comprises a first chamber solid detergent composition comprising bleach.

209. A pouch according to any of embodiments 133-208, wherein the first chamber comprises from 1.0 g to 5.0 g bleach.

210. A pouch according to any of embodiments 133-209, wherein the first chamber comprises a first chamber detergent composition comprising from 1.0 g to 5.0 g bleach.
211. A pouch according to any of embodiments 133-210, wherein the first chamber comprises a first chamber solid detergent composition comprising from 1.0 g to 5.0 g bleach.
212. A pouch according to any of embodiments 206-211, wherein the bleach comprises a source of peroxide.
213. A pouch according to embodiment 212, wherein the source of peroxide is percarbonate.
214. A pouch according to any of embodiments 206-213, wherein the bleach comprises a bleach activator.
215. A pouch according to embodiment 214, wherein the bleach activator is tetraacetylethylenediamine.
216. A pouch according to any of embodiments 206-215, wherein the bleach comprises a bleach catalyst.
217. A pouch according to embodiment 216, wherein the bleach catalyst is a transition metal bleach catalyst.
218. A pouch according to embodiment 217, wherein the transition metal bleach catalyst is a cobalt bleach catalyst, a manganese bleach catalyst, an iron bleach catalyst, or any combination thereof.
219. A pouch according to any of embodiments 133-218, wherein the first chamber comprises from 1.0 g to 6.0 g source of peroxide.
220. A pouch according to any of embodiments 133-219, wherein the first chamber comprises from 1.0 mg to 10.0 mg transition metal bleach catalyst.
221. A pouch according to any of embodiments 133-220, wherein the first chamber comprises filler material.
222. A pouch according to any of embodiments 133-221, wherein the first chamber comprises a first chamber detergent composition that comprises filler material.
223. A pouch according to any of embodiments 133-222, wherein the first chamber comprises a first chamber solid detergent composition that comprises filler material.
224. A pouch according to any of embodiments 133-223, wherein the first chamber comprises from 0.5 g to 10 g filler material.
225. A pouch according to any of embodiments 221-224, wherein the filler material is sodium sulphate.
226. A pouch according to any of embodiments 133-225, wherein the first chamber comprises polymer.
227. A pouch according to any of embodiments 133-226, wherein the first chamber comprises a first chamber detergent composition that comprises polymer.
228. A pouch according to any of embodiments 133-227, wherein the first chamber comprises from 0.1 g to 3.0 g polymer.
229. A pouch according to any of embodiments 133-228, wherein the polymer is selected from polycarboxylate polymer, sulphonated polycarboxylate polymer, and any combination thereof.
230. A pouch according to embodiment 229, wherein the polymer comprises both a polycarboxylate polymer and a sulphonated polycarboxylate polymer.
231. A pouch according to any of embodiments 133-230, wherein the first chamber comprises surfactant.
232. A pouch according to any of embodiments 133-231, wherein the first chamber comprises a first chamber detergent composition that comprises surfactant.
233. A pouch according to any of embodiments 133-232, wherein the first chamber comprises a first chamber liquid detergent composition that comprises surfactant.
234. A pouch according to any of embodiments 133-233, wherein the first chamber comprises from 1.0 g to 10 g surfactant.
235. A pouch according to any of embodiments 231-234, wherein the surfactant is selected from:
   (i) R—O-$EO_x$, wherein R is a $C_6$-$C_{18}$ alkyl, and x is from 1 to 30; or
   (ii) R—O-$EO_xPO_y$, wherein R is a $C_6$-$C_{18}$ alkyl, x is from 1 to 20, and y is from 1 to 20; or
   (iii) R—O—$PO_yEO_x$, wherein R is a $C_6$-$C_{18}$ alkyl, x is from 1 to 20, and y is from 1 to 20; or
   (iv) R—O-$EO_xPO_yEO_x$, wherein R is a $C_6$-$C_{18}$ alkyl, each x is independently from 1 to 20, and y is from 1 to 20; or
   (v) R—O—$PO_yEO_xPO_y$, wherein R is a $C_6$-$C_{18}$ alkyl, x is from 1 to 20, and each y is independently from 1 to 20; or
   (vi) HO-$EO_xPO_yEO_x$—H, wherein, each x is independently from 1 to 50, and y is from 1 to 50; or
   (vii) HO—$PO_yEO_xPO_y$—H, wherein x is from 1 to 50, and each y is independently from 1 to 50; or
   (viii) any combination thereof.
236. A pouch according to any of embodiments 133-235, wherein the first chamber comprises a first chamber solid detergent composition and a first chamber liquid detergent composition.
237. A pouch according to embodiment 236, wherein the first chamber solid detergent composition and the first chamber liquid detergent composition are contained within separate compartments of the first chamber.
238. A pouch according to any of embodiments 133-237, wherein the first chamber comprises a first chamber liquid detergent composition, wherein the first chamber liquid detergent composition is contained within two or more separate compartments within the first chamber.
239. A pouch according to any of embodiments 133-238, wherein the first chamber comprises a first chamber liquid detergent composition, wherein the first chamber liquid detergent composition is contained within three or more separate compartments within the first chamber.
240. A pouch according to any of embodiments 133-239, wherein the first chamber comprises a first chamber liquid detergent composition, wherein the first chamber liquid detergent composition is contained within four or more separate compartments within the first chamber.
241. A pouch according to any of embodiments 133-240, wherein the first chamber comprises a first chamber liquid detergent composition, wherein the first chamber liquid detergent composition is contained within five or more separate compartments within the first chamber.
242. A pouch according to any of embodiments 1-43, wherein the second chamber comprises builder.
243. A pouch according to embodiment 242, wherein the second chamber comprises from 1.0 g to 10 g builder.
244. A pouch according to any of embodiments 242-243, wherein the second chamber comprises a second chamber detergent composition that comprises builder.
245. A pouch according to any of embodiments 242-244, wherein the second chamber comprises a second chamber solid detergent composition that comprises builder.
246. A pouch according to any of embodiments 242-245, wherein the builder is selected from aminopolycarboxylic acids and/or salts thereof, carboxylic acids and/or salts thereof, and any combination thereof.
247. A pouch according to any of embodiments 242-246, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

248. A pouch according to any of embodiments 242-247, wherein the builder is selected from methylglycine-N, N-diacetic acid and/or salt thereof, glutamic acid diacetic acid and/or salt thereof; citric acid and/or a salt thereof; and any combination thereof.

249. A pouch according to any of embodiments 242-248, wherein the builder is selected from methylglycine-N, N-diacetic acid and/or salt thereof; citric acid and/or a salt thereof; and any combination thereof.

250. A pouch according to any of embodiments 242-249, wherein the builder is selected from methylglycine-N, N-diacetic acid and/or salt thereof.

251. A pouch according to any of embodiments 242-249, wherein the builder is selected from citric acid and/or a salt thereof.

252. A pouch according to any of embodiments 242-249, wherein the builder comprises the combination of (i) methylglycine-N,N-diacetic acid and/or salt thereof and (ii) citric acid and/or a salt thereof.

253. A pouch according to any of embodiments 242-252, wherein the second chamber comprises a second chamber detergent composition that has an equilibrium pH, upon dilution to 0.1 g/l in deionized water at a temperature of 20° C., of from above 7.0 to 12.0.

254. A pouch according to any of embodiments 242-253, wherein the second chamber comprises a second chamber detergent composition that has an equilibrium pH, upon dilution to 0.1 g/l in deionized water at a temperature of 20° C., of from 9.0 to 11.0.

255. A pouch according to any of embodiments 242-254, wherein the second chamber comprises a second chamber detergent composition that has an equilibrium pH, upon dilution to 0.1 g/l in deionized water at a temperature of 20° C., of from 10.0 to 11.0.

256. A pouch according to any of embodiments 242-255, wherein the second chamber comprises an alkalinity source.

257. A pouch according to any of embodiments 242-256, wherein the second chamber comprises from 1.0 g to 10 g alkalinity source.

258. A pouch according to any of embodiments 242-257, wherein the second chamber comprises a second chamber detergent composition that comprises an alkalinity source.

259. A pouch according to any of embodiments 242-258, wherein the second chamber comprises a second chamber solid detergent composition that comprises an alkalinity source.

260. A pouch according to any of embodiments 256-259, wherein the alkalinity source is selected from sodium bicarbonate, sodium carbonate, sodium silicate, and any combination thereof.

261. A pouch according to any of embodiments 256-260, wherein the alkalinity source is selected from sodium bicarbonate. sodium carbonate, and any combination thereof.

262. A pouch according to any of embodiments 256-261, wherein the alkalinity source comprises sodium bicarbonate and sodium carbonate.

263. A pouch according to any of embodiments 242-262, wherein the second chamber comprises sodium bicarbonate and sodium carbonate in a weight ratio of from 0.2:1 to 0.8:1.

264. A pouch according to any of embodiments 242-263, wherein the second chamber is free of enzyme.

265. A pouch according to any of embodiments 242-264, wherein the second chamber is free of bleach.

266. A pouch according to any of embodiments 242-265, wherein the second chamber is free of surfactant.

267. A pouch according to any of embodiments 242-266, wherein the second chamber is free of polymer.

268. A pouch according to any of embodiments 242-267, wherein the first chamber comprises a first chamber composition that has an equilibrium pH, upon dilution to 0.1 g/l in deionized water at a temperature of 20° C., of from above 7.0 to 12.0.

269. A pouch according to any of embodiments 242-268, wherein the first chamber comprises a first chamber composition that has an equilibrium pH, upon dilution to 0.1 g/l in deionized water at a temperature of 20° C., of from 9.0 to 11.0.

270. A pouch according to any of embodiments 242-269, wherein the first chamber comprises a first chamber composition that has an equilibrium pH, upon dilution to 0.1 g/l in deionized water at a temperature of 20° C., of from 10.0 to 11.0.

271. A pouch according to any of embodiments 242-270, wherein the first chamber comprises an alkalinity source.

272. A pouch according to any of embodiments 242-271, wherein the first chamber comprises from 1.0 g to 10 g alkalinity source.

273. A pouch according to any of embodiments 242-272, wherein the first chamber comprises a first chamber detergent composition that comprises an alkalinity source.

274. A pouch according to any of embodiments 242-273, wherein the first chamber comprises a first chamber solid detergent composition that comprises an alkalinity source.

275. A pouch according to any of embodiments 271-274, wherein the alkalinity source is selected from sodium bicarbonate, sodium carbonate, sodium silicate, and any combination thereof.

276. A pouch according to any of embodiments 271-275, wherein the alkalinity source is selected from sodium carbonate, sodium silicate, and any combination thereof.

277. A pouch according to any of embodiments 271-276, wherein the alkalinity source is sodium carbonate.

278. A pouch according to any of embodiments 242-277, wherein the first chamber comprises enzyme.

279. A pouch according to any of embodiments 242-278, wherein the first chamber comprises, on an active basis, from 1.0 mg to 300 mg enzyme.

280. A pouch according to any of embodiments 242-279, wherein the first chamber comprises first chamber detergent composition that comprises enzyme.

281. A pouch according to any of embodiments 242-280, wherein the first chamber comprises first chamber solid detergent composition that comprises enzyme.

282. A pouch according to any of embodiments 242-280, wherein the first chamber comprises first chamber liquid detergent composition that comprises enzyme.

283. A pouch according to any of embodiments 242-282, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.

284. A pouch according to any of embodiments 242-283, wherein the enzyme is selected from protease, amylase, lipase, cellulase, bleaching enzyme, and any combination thereof.

285. A pouch according to any of embodiments 242-284, wherein the enzyme is selected from protease, amylase, lipase, cellulase, and any combination thereof.

286. A pouch according to any of embodiments 242-285, wherein the enzyme is selected from protease, amylase, lipase, and any combination thereof.

287. A pouch according to any of embodiments 242-286, wherein the enzyme is selected from protease, amylase, and any combination thereof.

288. A pouch according to any of embodiments 242-287, wherein the first chamber comprises protease.

289. A pouch according to any of embodiments 242-288, wherein the first chamber comprises, on an active enzyme basis, from 1.0 mg to 300 mg protease.

290. A pouch according to any of embodiments 288-289, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*.

291. A pouch according to any of embodiments 242-290, wherein the first chamber comprises amylase.

292. A pouch according to any of embodiments 242-291, wherein the first chamber comprises, on an active enzyme basis, from 1.0 mg to 100 mg amylase.

293. A pouch according to any of embodiments 291-292, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

294. A pouch according to any of embodiments 242-293, wherein the first chamber comprises lipase.

295. A pouch according to any of embodiments 242-294, wherein the first chamber comprises cellulase.

296. A pouch according to any of embodiments 242-295, wherein the first chamber comprises a bleaching enzyme.

297. A pouch according to any of embodiments 242-296, wherein the first chamber comprises a sugar degrading enzyme.

298. A pouch according to any of embodiments 242-297, wherein the first chamber comprises an enzyme selected from mannanase and/or pectate lyase.

299. A pouch according to any of embodiments 242-298, wherein the first chamber comprises bleach.

300. A pouch according to any of embodiments 242-299, wherein the first chamber comprises a first chamber detergent composition that comprises bleach.

301. A pouch according to any of embodiments 242-300, wherein the first chamber comprises a first chamber solid detergent composition that comprises bleach.

302. A pouch according to any of embodiments 242-301, wherein the first chamber comprises from 1.0 g to 5.0 g bleach.

303. A pouch according to any of embodiments 299-302, wherein the bleach comprises a source of peroxide.

304. A pouch according to embodiment 303, wherein the source of peroxide is percarbonate.

305. A pouch according to any of embodiments 299-304, wherein the bleach comprises a bleach activator.

306. A pouch according to embodiment 305, wherein the bleach activator is tetraacetylethylenediamine.

307. A pouch according to any of embodiments 299-306, wherein the bleach comprises a bleach catalyst.

308. A pouch according to embodiment 307, wherein the bleach catalyst is a transition metal bleach catalyst.

309. A pouch according to embodiment 308, wherein the transition metal bleach catalyst is a cobalt bleach catalyst, a manganese bleach catalyst, an iron bleach catalyst or any combination thereof.

310. A pouch according to any of embodiments 242-309, wherein the first chamber comprises from 1.0 g to 6.0 g source of peroxide.

311. A pouch according to any of embodiments 242-310, wherein the first chamber comprises from 1.0 mg to 10.0 mg transition metal bleach catalyst.

312. A pouch according to any of embodiments 242-311, wherein the first chamber comprises filler material.

313. A pouch according to any of embodiments 242-312, wherein the first chamber comprises a first chamber detergent composition that comprises filler material.

314. A pouch according to any of embodiments 242-313, wherein the first chamber comprises a first chamber solid detergent composition that comprises filler material.

315. A pouch according to any of embodiments 242-314, wherein the first chamber comprises from 0.5 g to 10 g filler material.

316. A pouch according to any of embodiments 312-315, wherein the filler material is sodium sulphate.

317. A pouch according to any of embodiments 242-316, wherein the first chamber comprises polymer.

318. A pouch according to any of embodiments 242-317 wherein the first chamber comprises a first chamber detergent composition that comprises polymer.

319. A pouch according to any of embodiments 242-318, wherein the first chamber comprises from 0.1 g to 3.0 g polymer.

320. A pouch according to any of embodiments 317-319, wherein the polymer is selected from polycarboxylate polymer, sulphonated polycarboxylate polymer, and any combination thereof.

321. A pouch according to embodiment 320, wherein the polymer comprises both a polycarboxylate polymer and a sulphonated polycarboxylate polymer.

322. A pouch according to any of embodiments 242-321, wherein the first chamber comprises surfactant.

323. A pouch according to any of embodiments 242-322, wherein the first chamber comprises a first chamber detergent composition that comprises surfactant.

324. A pouch according to any of embodiments 242-323, wherein the first chamber comprises a first chamber liquid detergent composition that comprises surfactant.

325. A pouch according to any of embodiments 242-324, wherein the first chamber comprises from 1.0 g to 10 g surfactant.

326. A pouch according to any of embodiments 322-325, wherein the surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

327. A pouch according to any of embodiments 242-326, wherein the first chamber comprises a first chamber solid detergent composition and a first chamber liquid detergent composition.

328. A pouch according to embodiment 327, wherein the first chamber solid detergent composition and the first chamber liquid detergent composition are contained within separate compartments of the first chamber.

329. A pouch according to any of embodiments 242-328, wherein the first chamber comprises a first chamber liquid detergent composition, wherein the first chamber liquid detergent composition is contained within two or more separate compartments within the first chamber.

330. A pouch according to any of embodiments 242-329, wherein the first chamber comprises a first chamber liquid detergent composition, wherein the first chamber liquid detergent composition is contained within three or more separate compartments within the first chamber.

331. A pouch according to any of embodiments 242-330, wherein the first chamber comprises a first chamber liquid detergent composition, wherein the first chamber liquid detergent composition is contained within four or more separate compartments within the first chamber.

332. A pouch according to any of embodiments 242-331, wherein the first chamber comprises a first chamber liquid detergent composition, wherein the first chamber liquid detergent composition is contained within five or more separate compartments within the first chamber.

333. A pouch according to any of embodiments 1-43, wherein the second chamber comprises bleach.

334. A pouch according to embodiment 333, wherein the second chamber comprises a second chamber detergent composition that comprises bleach.

335. A pouch according to any of embodiments 333-334, wherein the second chamber comprises a second chamber solid detergent composition that comprises bleach.

336. A pouch according to any of embodiments 333-335, wherein the second chamber comprises from 1.0 g to 5.0 g bleach.

337. A pouch according to any of embodiments 333-336, wherein the bleach comprises a source of peroxide.

338. A pouch according to embodiment 3337, wherein the source of peroxide is percarbonate.

339. A pouch according to any of embodiments 333-338, wherein the bleach comprises a bleach activator.

340. A pouch according to embodiment 339, wherein the bleach activator is tetraacetylethylenediamine.

341. A pouch according to any of embodiments 333-340, wherein the bleach comprises a bleach catalyst.

342. A pouch according to embodiment 341, wherein the bleach catalyst is a transition metal bleach catalyst.

343. A pouch according to embodiment 342, wherein the transition metal bleach catalyst is a cobalt bleach catalyst, a manganese bleach catalyst, an iron bleach catalyst or any combination thereof.

344. A pouch according to any of embodiments 333-343, wherein the second chamber comprises from 1.0 g to 6.0 g source of peroxide.

345. A pouch according to any of embodiments 333-344, wherein the second chamber comprises from 1.0 mg to 10.0 mg transition metal bleach catalyst.

346. A pouch according to any of embodiments 333-345, wherein the second chamber comprises a builder.

347. A pouch according to any of embodiments 333-346, wherein the second chamber comprises a second chamber solid detergent composition, wherein the second chamber solid detergent composition comprises a builder.

348. A pouch according to any of embodiments 333-347, wherein the second chamber comprises from 1.0 g to 10 g builder.

349. A pouch according to any of embodiments 333-348, wherein the second chamber comprises a second chamber solid detergent composition, wherein the second chamber solid detergent composition comprises from 1.0 g to 10 g builder.

350. A pouch according to any of embodiments 333-349, wherein the second chamber comprises a builder selected from aminopolycarboxylic acids and/or salts thereof, carboxylic acids and/or salts thereof, and any combination thereof.

351. A pouch according to any of embodiments 333-350, wherein the second chamber comprises a builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

352. A pouch according to any of embodiments 333-351, wherein the second chamber comprises a builder selected from methylglycine-N,N-diacetic acid and/or salt thereof, glutamic acid diacetic acid and/or salt thereof; citric acid and/or a salt thereof; and any combination thereof.

353. A pouch according to any of embodiments 333-352, wherein the second chamber comprises a builder selected from methylglycine-N,N-diacetic acid and/or salt thereof; citric acid and/or a salt thereof; and any combination thereof.

354. A pouch according to any of embodiments 333-353, wherein the second chamber comprises a builder selected from methylglycine-N,N-diacetic acid and/or salt thereof.

355. A pouch according to any of embodiments 333-354, wherein the second chamber comprises a builder selected from citric acid and/or a salt thereof.

356. A pouch according to any of embodiments 133-355, wherein the second chamber comprises from 1.0 g to 10 g builder selected from aminopolycarboxylic acids and/or salts thereof, carboxylic acids and/or salts thereof, and any combination thereof.

357. A pouch according to any of embodiments 333-356, wherein the second chamber comprises from 1.0 g to 10 g builder selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

358. A pouch according to any of embodiments 333-357, wherein the second chamber comprises from 1.0 g to 10 g builder selected from methylglycine-N,N-diacetic acid and/or salt thereof, glutamic acid diacetic acid and/or salt thereof; citric acid and/or a salt thereof; and any combination thereof.
359. A pouch according to any of embodiments 333-358, wherein the second chamber comprises from 1.0 g to 21 g builder selected from methylglycine-N,N-diacetic acid and/or salt thereof; citric acid and/or a salt thereof; and any combination thereof.
360. A pouch according to any of embodiments 333-359, wherein the second chamber comprises from 1.0 g to 10 g builder selected from methylglycine-N,N-diacetic acid and/or salt thereof.
361. A pouch according to any of embodiments 333-360, wherein the second chamber comprises from 1.0 g to 10 g builder selected from citric acid and/or a salt thereof.
362. A pouch according to any of embodiments 333-361, wherein the second chamber comprises a source of alkalinity.
363. A pouch according to any of embodiments 333-362, wherein the second chamber comprises from 1.0 g to 10 g source of alkalinity.
364. A pouch according to any of embodiments 333-363, wherein the second chamber comprises a source of alkalinity selected from sodium carbonate, sodium bicarbonate, sodium silicate and any combination thereof.
365. A pouch according to any of embodiments 333-364, wherein the second chamber comprises a source of alkalinity selected from sodium carbonate, sodium bicarbonate and any combination thereof.
366. A pouch according to any of embodiments 333-365, wherein the second chamber comprises a source of alkalinity that is the combination of sodium carbonate and sodium bicarbonate.
367. A pouch according to any of embodiments 333-366, wherein the second chamber comprises a source of alkalinity that is the combination of sodium carbonate and sodium bicarbonate, and wherein the weight ratio of the amount of sodium carbonate present in the second chamber to the amount of sodium bicarbonate present in the second chamber is in the range of from 2:1 to 10:1.
368. A pouch according to any of embodiments 333-367, wherein the second chamber comprises from 1.0 g to 10 g source of alkalinity selected from sodium carbonate, sodium bicarbonate, sodium silicate and any combination thereof.
369. A pouch according to any of embodiments 333-368, wherein the second chamber comprises from 1.0 g to 10 g source of alkalinity selected from sodium carbonate, sodium bicarbonate and any combination thereof.
370. A pouch according to any of embodiments 333-369, wherein the second chamber comprises from 1.0 g to 10 g source of alkalinity that is the combination of sodium carbonate and sodium bicarbonate.
371. A pouch according to any of embodiments 333-370, wherein the second chamber comprises from 1.0 g to 10 g source of alkalinity that is the combination of sodium carbonate and sodium bicarbonate, and wherein the weight ratio of the amount of sodium carbonate present in the second chamber to the amount of sodium bicarbonate present in the second chamber is in the range of from 2:1 to 10:1.
372. A pouch according to any of embodiments 333-371, wherein the second chamber is free of enzyme.
373 A pouch according to any of embodiments 333-372, wherein the second chamber is free of surfactant.
374. A pouch according to any of embodiments 333-373, wherein the second chamber is free of polymer.
375. A pouch according to any of embodiments 333-374, wherein the second chamber is free of builder.
376. A pouch according to any of embodiments 333-375, wherein the first chamber comprises enzyme.
377. A pouch according to any of embodiments 333-376, wherein the first chamber comprises, on an active basis, from 1.0 mg to 300 mg enzyme.
378. A pouch according to any of embodiments 333-377, wherein the first chamber comprises first chamber detergent composition that comprises enzyme.
379. A pouch according to any of embodiments 333-378, wherein the first chamber comprises first chamber solid detergent composition that comprises enzyme.
380. A pouch according to any of embodiments 333-379, wherein the first chamber comprises first chamber liquid detergent composition that comprises enzyme.
381. A pouch according to any of embodiments 376-380, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.
382. A pouch according to any of embodiments 376-381, wherein the enzyme is selected from protease, amylase, lipase, cellulase, bleaching enzyme, and any combination thereof.
383. A pouch according to any of embodiments 376-382, wherein the enzyme is selected from protease, amylase, lipase, cellulase, and any combination thereof.
384. A pouch according to any of embodiments 376-383, wherein the enzyme is selected from protease, amylase, lipase, and any combination thereof.
385. A pouch according to any of embodiments 376-384, wherein the enzyme is selected from protease, amylase, and any combination thereof.
386. A pouch according to any of embodiments 333-385, wherein the first chamber comprises protease.
387. A pouch according to any of embodiments 333-386, wherein the first chamber comprises, on an active enzyme basis, from 1.0 mg to 300 mg protease.
388. A pouch according to any of embodiments 386-387, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*
389. A pouch according to any of embodiments 333-388, wherein the first chamber comprises amylase.
390. A pouch according to any of embodiments 333-389 wherein the first chamber comprises, on an active enzyme basis, from 1.0 mg to 100 mg amylase.
391. A pouch according to any of embodiments 389-390, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.
392. A pouch according to any of embodiments 333-391, wherein the first chamber comprises lipase.

393. A pouch according to any of embodiments 333-392, wherein the first chamber comprises cellulase.
394. A pouch according to any of embodiments 333-393, wherein the first chamber comprises a bleaching enzyme.
395. A pouch according to any of embodiments 333-394 wherein the first chamber comprises a sugar degrading enzyme.
396. A pouch according to any of embodiments 333-395, wherein the first chamber comprises an enzyme selected from mannanase and/or pectate lyase.
399. A pouch according to any of embodiments 333-398, wherein the first chamber comprises builder.
400. A pouch according to any of embodiments 333-399, wherein the first chamber comprises from 1.0 g to 20 g builder.
401. A pouch according to any of embodiments 333-400, wherein the first chamber comprises a first chamber detergent composition that comprises builder.
402. A pouch according to any of embodiments 333-401, wherein the first chamber comprises a first chamber solid detergent composition that comprises builder.
403. A pouch according to any of embodiments 399-402, wherein the builder is selected from aminopolycarboxylic acids and/or salts thereof, carboxylic acids and/or salts thereof, and any combination thereof.
404. A pouch according to any of embodiments 399-403, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.
405. A pouch according to any of embodiments 339-404 wherein the builder is selected from methylglycine-N, N-diacetic acid and/or salt thereof.
406. A pouch according to any of embodiments 399-404, wherein the builder is selected from citric acid and/or a salt thereof.
407. A pouch according to any of embodiments 333-406, wherein the first chamber comprises a first chamber solid detergent composition having an equilibrium pH, upon dilution to 0.1 g/l in deionized water at a temperature of 20° C., of from above 7.0 to 12.0.
408. A pouch according to any of embodiments 333-407, wherein the first chamber comprises a first chamber solid detergent composition having an equilibrium pH, upon dilution to 0.1 g/l in deionized water at a temperature of 20° C., of from 9.0 to 11.0.
409. A pouch according to any of embodiments 333-408, wherein the first chamber comprises a first chamber solid detergent composition having an equilibrium pH, upon dilution to 0.1 g/l in deionized water at a temperature of 20° C., of from 10.0 to 11.0.
410. A pouch according to any of embodiments 333-409, wherein the first chamber comprises an alkalinity source.
411. A pouch according to any of embodiments 333-410 wherein the first chamber comprises a first chamber detergent composition comprising an alkalinity source.
412. A pouch according to any of embodiments 333-411, wherein the first chamber comprises a first chamber solid detergent composition comprising an alkalinity source.
413. A pouch according to any of embodiments 333-412, wherein the first chamber comprises from 1.0 g to 20 g alkalinity source.
414. A pouch according to any of embodiments 333-413, wherein the first chamber comprises a first chamber detergent composition comprising from 1.0 g to 20 g alkalinity source.
415. A pouch according to any of embodiments 333-414, wherein the first chamber comprises a first chamber solid detergent composition comprising from 1.0 g to 20 g alkalinity source.
416. A pouch according to any of embodiments 333-415, wherein the alkalinity source is selected from sodium bicarbonate, sodium carbonate, sodium silicate, and any combination thereof.
417. A pouch according to any of embodiments 333-416, wherein the alkalinity source is sodium bicarbonate and/or sodium carbonate.
418. A pouch according to any of embodiments 333-417, wherein the alkalinity source is sodium carbonate.
419. A pouch according to any of embodiments 333-418, wherein the first chamber comprises filler material.
420. A pouch according to any of embodiments 333-419, wherein the first chamber comprises a first chamber detergent composition that comprises filler material.
421. A pouch according to any of embodiments 333-420, wherein the first chamber comprises a first chamber solid detergent composition that comprises filler material.
422. A pouch according to any of embodiments 333-421, wherein the first chamber comprises from 0.5 g to 10 g filler material.
423. A pouch according to any of embodiments 419-422, wherein the filler material is sodium sulphate.
424. A pouch according to any of embodiments 333-423, wherein the first chamber comprises polymer.
425. A pouch according to any of embodiments 333-424 wherein the first chamber comprises a first chamber detergent composition that comprises polymer.
426. A pouch according to any of embodiments 333-425, wherein the first chamber comprises from 0.1 g to 3.0 g polymer.
427. A pouch according to any of embodiments 424-426, wherein the polymer is selected from polycarboxylate polymer, sulphonated polycarboxylate polymer, and any combination thereof.
428. A pouch according to embodiment 427, wherein the polymer comprises both a polycarboxylate polymer and a sulphonated polycarboxylate polymer.
429. A pouch according to any of embodiments 333-428, wherein the first chamber comprises surfactant.
430. A pouch according to any of embodiments 333-429, wherein the first chamber comprises a first chamber detergent composition that comprises surfactant.
431. A pouch according to any of embodiments 333-430, wherein the first chamber comprises a first chamber liquid detergent composition that comprises surfactant.
432. A pouch according to any of embodiments 333-431, wherein the first chamber comprises from 1.0 g to 10 g surfactant.
433. A pouch according to any of embodiments 429-433, wherein the surfactant is selected from:
   (i) R—O-$EO_x$, wherein R is a $C_6$-$C_{18}$ alkyl, and x is from 1 to 30; or
   (ii) R—O-$EO_xPO_y$, wherein R is a $C_6$-$C_{18}$ alkyl, x is from 1 to 20, and y is from 1 to 20; or
   (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

434. A pouch according to any of embodiments 333-433, wherein the first chamber comprises a first chamber solid detergent composition and a first chamber liquid detergent composition.

435. A pouch according to embodiment 434, wherein the first chamber solid detergent composition and the first chamber liquid detergent composition are contained within separate compartments of the first chamber.

436. A pouch according to any of embodiments 333-435, wherein the first chamber comprises a first chamber liquid detergent composition, wherein the first chamber liquid detergent composition is contained within two or more separate compartments within the first chamber.

437. A pouch according to any of embodiments 333-436, wherein the first chamber comprises a first chamber liquid detergent composition, wherein the first chamber liquid detergent composition is contained within three or more separate compartments within the first chamber.

438. A pouch according to any of embodiments 333-437, wherein the first chamber comprises a first chamber liquid detergent composition, wherein the first chamber liquid detergent composition is contained within four or more separate compartments within the first chamber.

439. A pouch according to any of embodiments 333-438, wherein the first chamber comprises a first chamber liquid detergent composition, wherein the first chamber liquid detergent composition is contained within five or more separate compartments within the first chamber.

440. A pouch according to any of embodiments 333-439, wherein the first chamber is free of bleach.

441. A pouch according to any of embodiments 1-43, wherein the second chamber comprises polymer.

442. A pouch according to any of embodiment 441, wherein the second chamber comprises a second chamber detergent composition that comprises polymer.

443. A pouch according to any of embodiments 441-442, wherein the second chamber comprises a second chamber solid detergent composition that comprises polymer.

444. A pouch according to any of embodiments 441-443, wherein the second chamber comprises from 0.5 g to 10 g polymer.

445. A pouch according to any of embodiments 441-444, wherein the polymer is selected from polycarboxylate polymer, sulphonated polycarboxylate polymer, and any combination thereof.

446. A pouch according to embodiment 445, wherein the polymer comprises both a polycarboxylate polymer and a sulphonated polycarboxylate polymer.

447. A pouch according to any of embodiments 441-446, wherein the second chamber comprises a source of alkalinity.

448. A pouch according to any of embodiments 441-447, wherein the second chamber comprises a second chamber detergent composition that comprises a source of alkalinity.

449. A pouch according to any of embodiments 441-448, wherein the second chamber comprises a second chamber solid detergent composition that comprises a source of alkalinity.

450. A pouch according to any of embodiments 441-449, wherein the second chamber comprises from 1.0 g to 20 g source of alkalinity.

451. A pouch according to any of embodiments 441-450, wherein the source of alkalinity is selected from sodium carbonate, sodium bicarbonate, sodium silicate and any combination thereof.

452. A pouch according to any of embodiments 441-451, wherein the source of alkalinity is selected from sodium carbonate, sodium bicarbonate and any combination thereof.

453 A pouch according to any of embodiments 441-452, wherein the source of alkalinity is the combination of sodium carbonate and sodium bicarbonate.

454. A pouch according to any of embodiment 453, wherein the weight ratio of the amount of sodium carbonate present in the second chamber to the amount of sodium bicarbonate present in the second chamber is in the range of from 1.5:1 to 5:1.

455. A pouch according to any of embodiments 441-454, wherein the second chamber comprises enzyme.

456. A pouch according to any of embodiments 441-455, wherein the second chamber comprises a second chamber detergent composition that comprises enzyme.

457. A pouch according to any of embodiments 441-456, wherein the second chamber comprises a second chamber solid detergent composition that comprises enzyme.

458. A pouch according to any of embodiments 441-457, wherein the second chamber comprises, on an active enzyme basis, from 5 mg to 500 mg enzyme.

459. A pouch according to any of embodiments 441-458, wherein the second chamber comprises, on an active enzyme basis, from 10 mg to 100 mg enzyme.

460. A pouch according to any of embodiments 441-459, wherein the second chamber comprises protease.

461. A pouch according to any of embodiments 441-460, wherein the second chamber comprises a second chamber detergent composition that comprises protease.

462. A pouch according to any of embodiments 441-461, wherein the second chamber comprises a second chamber solid detergent composition that comprises protease.

463. A pouch according to any of embodiments 441-462, wherein the second chamber comprises, on an active enzyme basis, from 5.0 mg to 100 mg protease.

464. A pouch according to any of embodiments 460-463, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

465. A pouch according to any of embodiments 441-464, wherein the second chamber comprises amylase.

466. A pouch according to any of embodiments 441-465, wherein the second chamber comprises a second chamber detergent composition that comprises amylase.

467. A pouch according to any of embodiments 441-466, wherein the second chamber comprises a second chamber solid detergent composition that comprises amylase.

468. A pouch according to any of embodiments 441-467, wherein the second chamber comprises, on an active enzyme basis, from 1.0 mg to 20 mg amylase.

469. A pouch according to any of embodiments 465-468, wherein amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

470. A pouch according to any of embodiments 441-469, wherein the second chamber comprises both protease and amylase.

471. A pouch according to any of embodiments 441-470, wherein the second chamber comprises lipase.

472. A pouch according to any of embodiments 441-471, wherein the second chamber comprises cellulase.

473. A pouch according to any of embodiments 441-472, wherein the second chamber comprises a bleaching enzyme.

474. A pouch according to any of embodiments 441-473, wherein the second chamber comprises a sugar degrading enzyme.

475. A pouch according to any of embodiments 441-474, wherein the second chamber comprises an enzyme selected from mannanase and/or pectate lyase.

476. A pouch according to any of embodiments 441-475, wherein the second chamber is free of bleach.

477. A pouch according to any of embodiments 441-476, wherein the second chamber is free of surfactant.

478. A pouch according to any of embodiments 441-477, wherein the first chamber comprises enzyme.

479. A pouch according to any of embodiments 441-478, wherein the first chamber comprises, on an active basis, from 1.0 mg to 300 mg enzyme.

480. A pouch according to any of embodiments 441-479, wherein the first chamber comprises a first chamber detergent composition that comprises enzyme.

481. A pouch according to any of embodiments 441-480, wherein the first chamber comprises a first chamber solid detergent composition that comprises enzyme.

482. A pouch according to any of embodiments 441-481, wherein the first chamber comprises a first chamber liquid detergent composition that comprises enzyme.

483. A pouch according to any of embodiments 478-482, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.

484. A pouch according to any of embodiments -478-483, wherein the enzyme is selected from protease, amylase, lipase, cellulase, bleaching enzyme, and any combination thereof.

485. A pouch according to any of embodiments 478-484, wherein the enzyme is selected from protease, amylase, lipase, cellulase, and any combination thereof.

486. A pouch according to any of embodiments 478-485, wherein the enzyme is selected from protease, amylase, lipase, and any combination thereof.

487. A pouch according to any of embodiments 478-486, wherein the enzyme is selected from protease, amylase, and any combination thereof.

488. A pouch according to any of embodiments 441-487, wherein the first chamber comprises protease.

489. A pouch according to any of embodiments 441-488, wherein the first chamber comprises, on an active enzyme basis, from 1.0 mg to 300 mg protease.

490. A pouch according to any of embodiments 488-489, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

491. A pouch according to any of embodiments 441-490, wherein the first chamber comprises amylase.

492. A pouch according to any of embodiments 441-491 wherein the first chamber comprises, on an active enzyme basis, from 1.0 mg to 100 mg amylase.

493. A pouch according to any of embodiments 491-492, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

494. A pouch according to any of embodiments 441-493, wherein the first chamber comprises lipase.

495. A pouch according to any of embodiments 441-494, wherein the first chamber comprises cellulase.

496. A pouch according to any of embodiments 441-495, wherein the first chamber comprises a bleaching enzyme.

497. A pouch according to any of embodiments 441-496 wherein the first chamber comprises a sugar degrading enzyme.

498. A pouch according to any of embodiments 441-497, wherein the first chamber comprises an enzyme selected from mannanase and/or pectate lyase.

499. A pouch according to any of embodiments 441-498, wherein the first chamber comprises builder.

500. A pouch according to any of embodiments 441-499, wherein the first chamber comprises a first chamber detergent composition that comprises builder.

501. A pouch according to any of embodiments 441-500, wherein the first chamber comprises a first chamber solid detergent composition that comprises builder.

502. A pouch according to any of embodiments 441-501, wherein the first chamber comprises from 1.0 g to 20 g builder.

503. A pouch according to any of embodiments 499-502, wherein the builder is selected from aminopolycarboxylic acids and/or salts thereof, carboxylic acids and/or salts thereof, and any combination thereof.

504. A pouch according to any of embodiments 499-503, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

505. A pouch according to any of embodiments 499-504 wherein the builder is selected from methylglycine-N, N-diacetic acid and/or salt thereof.

506. A pouch according to any of embodiments 499-504, wherein the builder is selected from citric acid and/or a salt thereof.
507. A pouch according to any of embodiments 441-506, wherein the first chamber comprises a first chamber solid detergent composition having an equilibrium pH, upon dilution to 0.1 g/l in deionized water at a temperature of 20° C., of from above 7.0 to 12.0.
508. A pouch according to any of embodiments 441-507, wherein the first chamber comprises a first chamber solid detergent composition having an equilibrium pH, upon dilution to 0.1 g/l in deionized water at a temperature of 20° C., of from 9.0 to 11.0.
509. A pouch according to any of embodiments 441-508, wherein the first chamber comprises a first chamber solid detergent composition having an equilibrium pH, upon dilution to 0.1 g/l in deionized water at a temperature of 20° C., of from 10.0 to 11.0.
510. A pouch according to any of embodiments 441-509, wherein the first chamber comprises an alkalinity source.
511. A pouch according to any of embodiments 441-510 wherein the first chamber comprises a first chamber detergent composition comprising an alkalinity source.
512. A pouch according to any of embodiments 441-511, wherein the first chamber comprises a first chamber solid detergent composition comprising an alkalinity source.
513. A pouch according to any of embodiments 441-512, wherein the first chamber comprises from 1.0 g to 20 g alkalinity source.
514. A pouch according to any of embodiments 510-513, wherein the alkalinity source is selected from sodium bicarbonate, sodium carbonate, sodium silicate, and any combination thereof.
515. A pouch according to any of embodiments 510-514, wherein the alkalinity source is sodium bicarbonate and/or sodium carbonate.
516. A pouch according to any of embodiments 510-515, wherein the alkalinity source is sodium carbonate.
517. A pouch according to any of embodiments 441-516, wherein the first chamber comprises bleach.
518. A pouch according to any of embodiments 441-517, wherein the first chamber comprises a first chamber detergent composition that comprises bleach.
519. A pouch according to any of embodiments 441-518, wherein the first chamber comprises a first chamber solid detergent composition that comprises bleach.
520. A pouch according to any of embodiments 441-519, wherein the first chamber comprises from 1.0 g to 5.0 g bleach.
521. A pouch according to any of embodiments 517-520, wherein the bleach comprises a source of peroxide.
522. A pouch according to embodiment 521, wherein the source of peroxide is percarbonate.
523. A pouch according to any of embodiments 517-522, wherein the bleach comprises a bleach activator.
524. A pouch according to embodiment 523, wherein the bleach activator is tetraacetylethylenediamine.
525. A pouch according to any of embodiments 517-524, wherein the bleach comprises a bleach catalyst.
526. A pouch according to embodiment 525, wherein the bleach catalyst is a transition metal bleach catalyst.
527. A pouch according to embodiment 526, wherein the transition metal bleach catalyst is a cobalt bleach catalyst, a manganese bleach catalyst, an iron bleach catalyst or any combination thereof.
528. A pouch according to any of embodiments 441-527, wherein the first chamber comprises from 1.0 g to 6.0 g source of peroxide.
529. A pouch according to any of embodiments 441-528, wherein the first chamber comprises from 1.0 mg to 10.0 mg transition metal bleach catalyst.
530. A pouch according to any of embodiments 441-530, wherein the first chamber comprises filler material.
531. A pouch according to any of embodiments 441-530, wherein the first chamber comprises a first chamber detergent composition that comprises filler material.
532. A pouch according to any of embodiments 441-531, wherein the first chamber comprises a first chamber solid detergent composition that comprises filler material.
533. A pouch according to any of embodiments 441-532, wherein the first chamber comprises from 0.5 g to 10 g filler material.
534. A pouch according to any of embodiments 530-533, wherein the filler material is sodium sulphate.
535. A pouch according to any of embodiments 441-534, wherein the first chamber comprises polymer.
536. A pouch according to any of embodiments 441-535 wherein the first chamber comprises a first chamber detergent composition that comprises polymer.
537. A pouch according to any of embodiments 441-536, wherein the first chamber comprises from 0.1 g to 3.0 g polymer.
538. A pouch according to any of embodiments 535-537, wherein the polymer is selected from polycarboxylate polymer, sulphonated polycarboxylate polymer, and any combination thereof.
539. A pouch according to embodiment 538, wherein the polymer comprises both a polycarboxylate polymer and a sulphonated polycarboxylate polymer.
540. A pouch according to any of embodiments 441-539, wherein the first chamber comprises surfactant.
541. A pouch according to any of embodiments 441-540, wherein the first chamber comprises a first chamber detergent composition that comprises surfactant.
542. A pouch according to any of embodiments 411-541, wherein the first chamber comprises a first chamber liquid detergent composition that comprises surfactant.
543. A pouch according to any of embodiments 411-542, wherein the first chamber comprises from 1.0 g to 10 g surfactant.
544. A pouch according to any of embodiments 540-543, wherein the surfactant is selected from:
(i) R—O-$EO_x$, wherein R is a $C_6$-$C_{18}$ alkyl, and x is from 1 to 30; or
(ii) R—O-$EO_xPO_y$, wherein R is a $C_6$-$C_{18}$ alkyl, x is from 1 to 20, and y is from 1 to 20; or
(iii) R—O—$PO_yEO_x$, wherein R is a $C_6$-$C_{18}$ alkyl, x is from 1 to 20, and y is from 1 to 20; or
(iv) R—O-$EO_xPO_yEO_x$, wherein R is a $C_6$-$C_{18}$ alkyl, each x is independently from 1 to 20, and y is from 1 to 20; or
(v) R—O—$PO_yEO_xPO_y$, wherein R is a $C_6$-$C_{18}$ alkyl, x is from 1 to 20, and each y is independently from 1 to 20; or
(vi) HO-$EO_xPO_yEO_x$—H, wherein, each x is independently from 1 to 50, and y is from 1 to 50; or
(vii) HO—$PO_yEO_xPO_y$—H, wherein x is from 1 to 50, and each y is independently from 1 to 50; or
(viii) any combination thereof.

545. A pouch according to any of embodiments 441-544, wherein the first chamber comprises a first chamber solid detergent composition and a first chamber liquid detergent composition.

546. A pouch according to embodiment 547, wherein the first chamber solid detergent composition and the first chamber liquid detergent composition are contained within separate compartments of the first chamber.

547. A pouch according to any of embodiments 441-546, wherein the first chamber comprises a first chamber liquid detergent composition, wherein the first chamber liquid detergent composition is contained within two or more separate compartments within the first chamber.

548. A pouch according to any of embodiments 441-547, wherein the first chamber comprises a first chamber liquid detergent composition, wherein the first chamber liquid detergent composition is contained within three or more separate compartments within the first chamber.

549. A pouch according to any of embodiments 441-548, wherein the first chamber comprises a first chamber liquid detergent composition, wherein the first chamber liquid detergent composition is contained within four or more separate compartments within the first chamber.

550. A pouch according to any of embodiments 441-549, wherein the first chamber comprises a first chamber liquid detergent composition, wherein the first chamber liquid detergent composition is contained within five or more separate compartments within the first chamber.

551. A pouch according to any of embodiments 1-43, wherein the second chamber comprises surfactant.

552. A pouch according to embodiment 551, wherein the second chamber comprises a second chamber detergent composition that comprises surfactant.

553. A pouch according to any of embodiments 551-552, wherein the second chamber comprises a second chamber solid detergent composition that comprises surfactant.

554. A pouch according to any of embodiments 551-553, wherein the second chamber comprises a second chamber liquid detergent composition that comprises surfactant.

555. A pouch according to any of embodiments 551-554, wherein the second chamber comprises from 1.0 g to 10 g surfactant.

556. A pouch according to any of embodiments 551-555, wherein the surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

557. A pouch according to any of embodiments 551-556, wherein the surfactant has the formula:

R—O-$EO_x$ wherein R is a $C_6$-$C_{18}$ alkyl, and x is from 1 to 30.

558. A pouch according to any of embodiments 551-556, wherein the surfactant has the formula:

R—O-$EO_xPO_y$, wherein R is a $C_6$-$C_{18}$ alkyl, x is from 1 to 20, and y is from 1 to 20.

559. A pouch according to any of embodiments 551-556, wherein the surfactant has the formula:

R—O—$PO_yEO_x$, wherein R is a $C_6$-$C_{18}$ alkyl, x is from 1 to 20, and y is from 1 to 20.

560. A pouch according to any of embodiments 551-556, wherein the surfactant has the formula:

R—O-$EO_xPO_yEO_x$, wherein R is a $C_6$-$C_{18}$ alkyl, each x is independently from 1 to 20, and y is from 1 to 20.

561. A pouch according to any of embodiments 551-556, wherein the surfactant has the formula:

R—O—$PO_yEO_xPO_y$, wherein R is a $C_6$-$C_{18}$ alkyl, x is from 1 to 20, and each y is independently from 1 to 20.

562. A pouch according to any of embodiments 551-556, wherein the surfactant has the formula:

HO-$EO_xPO_yEO_x$—H, wherein, each x is independently from 1 to 50, and y is from 1 to 50.

562. A pouch according to any of embodiments 551-556, wherein the surfactant has the formula:

HO—$PO_yEO_xPO_y$—H, wherein x is from 1 to 50, and each y is independently from 1 to 50.

563. A pouch according to any of embodiments 551-562, wherein the second chamber comprises a source of alkalinity.

564. A pouch according to any of embodiments 551-563, wherein the second chamber comprises a second chamber detergent composition that comprises a source of alkalinity.

565. A pouch according to any of embodiments 551-564, wherein the second chamber comprises a second chamber solid detergent composition that comprises a source of alkalinity.

566. A pouch according to any of embodiments 551-564, wherein the second chamber comprises a second chamber liquid detergent composition that comprises a source of alkalinity.

567. A pouch according to any of embodiments 551-566, wherein the second chamber comprises from 1.0 g to 20 g source of alkalinity.

568. A pouch according to any of embodiments 563-567, wherein the source of alkalinity is selected from sodium carbonate, sodium bicarbonate, sodium silicate and any combination thereof.

569. A pouch according to any of embodiments 563-568, wherein the source of alkalinity is selected from sodium carbonate, sodium bicarbonate and any combination thereof.

570 A pouch according to any of embodiments 563-569, wherein the source of alkalinity is the combination of sodium carbonate and sodium bicarbonate.

571. A pouch according to any of embodiment 570, wherein the weight ratio of the amount of sodium carbonate present in the second chamber to the amount of sodium bicarbonate present in the second chamber is in the range of from 1.5:1 to 5:1.

572. A pouch according to any of embodiments 551-571, wherein the first chamber comprises enzyme.

573. A pouch according to any of embodiments 551-572, wherein the first chamber comprises, on an active basis, from 1.0 mg to 300 mg enzyme.

574. A pouch according to any of embodiments 551-573, wherein the first chamber comprises a first chamber detergent composition that comprises enzyme.

575. A pouch according to any of embodiments 551-574, wherein the first chamber comprises a first chamber solid detergent composition that comprises enzyme.

576. A pouch according to any of embodiments 551-575, wherein the first chamber comprises a first chamber liquid detergent composition that comprises enzyme.

577. A pouch according to any of embodiments 572-576, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.

578. A pouch according to any of embodiments -572-577, wherein the enzyme is selected from protease, amylase, lipase, cellulase, bleaching enzyme, and any combination thereof.

579. A pouch according to any of embodiments 572-578, wherein the enzyme is selected from protease, amylase, lipase, cellulase, and any combination thereof.

580. A pouch according to any of embodiments 572-579, wherein the enzyme is selected from protease, amylase, lipase, and any combination thereof.

581. A pouch according to any of embodiments 572-580, wherein the enzyme is selected from protease, amylase, and any combination thereof.

582. A pouch according to any of embodiments 551-581, wherein the first chamber comprises protease.

583. A pouch according to any of embodiments 551-582, wherein the first chamber comprises, on an active enzyme basis, from 1.0 mg to 300 mg protease.

584. A pouch according to any of embodiments 582-583, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*.

585. A pouch according to any of embodiments 551-584, wherein the first chamber comprises amylase.

586. A pouch according to any of embodiments 551-585 wherein the first chamber comprises, on an active enzyme basis, from 1.0 mg to 100 mg amylase.

587. A pouch according to any of embodiments 585-586, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

588. A pouch according to any of embodiments 551-587, wherein the first chamber comprises lipase.

589. A pouch according to any of embodiments 551-588, wherein the first chamber comprises cellulase.

560. A pouch according to any of embodiments 551-559, wherein the first chamber comprises a bleaching enzyme.

561. A pouch according to any of embodiments 551-560 wherein the first chamber comprises a sugar degrading enzyme.

562. A pouch according to any of embodiments 551-561, wherein the first chamber comprises an enzyme selected from mannanase and/or pectate lyase.

563. A pouch according to any of embodiments 551-562, wherein the first chamber comprises builder.

564. A pouch according to any of embodiments 551-563, wherein the first chamber comprises a first chamber detergent composition that comprises builder.

565. A pouch according to any of embodiments 551-564, wherein the first chamber comprises a first chamber solid detergent composition that comprises builder.

566. A pouch according to any of embodiments 551-565, wherein the first chamber comprises from 1.0 g to 20 g builder.

567. A pouch according to any of embodiments 563-566, wherein the builder is selected from aminopolycarboxylic acids and/or salts thereof, carboxylic acids and/or salts thereof, and any combination thereof.

568. A pouch according to any of embodiments 563-567, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.

569. A pouch according to any of embodiments 563-568 wherein the builder is selected from methylglycine-N, N-diacetic acid and/or salt thereof.

570. A pouch according to any of embodiments 563-568, wherein the builder is selected from citric acid and/or a salt thereof.

571. A pouch according to any of embodiments 551-570, wherein the first chamber comprises a first chamber solid detergent composition having an equilibrium pH, upon dilution to 0.1 g/l in deionized water at a temperature of 20° C., of from above 7.0 to 12.0.

572. A pouch according to any of embodiments 551-571, wherein the first chamber comprises a first chamber solid detergent composition having an equilibrium pH, upon dilution to 0.1 g/l in deionized water at a temperature of 20° C., of from 9.0 to 11.0.

573. A pouch according to any of embodiments 551-572, wherein the first chamber comprises a first chamber solid detergent composition having an equilibrium pH, upon dilution to 0.1 g/l in deionized water at a temperature of 20° C., of from 10.0 to 11.0.

574. A pouch according to any of embodiments 551-573, wherein the first chamber comprises an alkalinity source.

575. A pouch according to any of embodiments 551-574 wherein the first chamber comprises a first chamber detergent composition comprising an alkalinity source.

576. A pouch according to any of embodiments 551-575, wherein the first chamber comprises a first chamber solid detergent composition comprising an alkalinity source.

577. A pouch according to any of embodiments 551-576, wherein the first chamber comprises from 1.0 g to 20 g alkalinity source.

578. A pouch according to any of embodiments 574-577, wherein the alkalinity source is selected from sodium bicarbonate, sodium carbonate, sodium silicate, and any combination thereof.
579. A pouch according to any of embodiments 574-578, wherein the alkalinity source is sodium bicarbonate and/or sodium carbonate.
580. A pouch according to any of embodiments 574-579, wherein the alkalinity source is sodium carbonate.
581. A pouch according to any of embodiments 551-580, wherein the first chamber comprises bleach.
582. A pouch according to any of embodiments 551-581, wherein the first chamber comprises a first chamber detergent composition that comprises bleach.
583. A pouch according to any of embodiments 551-582, wherein the first chamber comprises a first chamber solid detergent composition that comprises bleach.
584. A pouch according to any of embodiments 551-583, wherein the first chamber comprises from 1.0 g to 5.0 g bleach.
585. A pouch according to any of embodiments 581-584, wherein the bleach comprises a source of peroxide.
586. A pouch according to embodiment 585, wherein the source of peroxide is percarbonate.
587. A pouch according to any of embodiments 581-586, wherein the bleach comprises a bleach activator.
588. A pouch according to embodiment 587, wherein the bleach activator is tetraacetylethylenediamine.
589. A pouch according to any of embodiments 581-588, wherein the bleach comprises a bleach catalyst.
590. A pouch according to embodiment 589, wherein the bleach catalyst is a transition metal bleach catalyst.
591. A pouch according to embodiment 590, wherein the transition metal bleach catalyst is a cobalt bleach catalyst, a manganese bleach catalyst, an iron bleach catalyst or any combination thereof.
592. A pouch according to any of embodiments 551-591, wherein the first chamber comprises from 1.0 g to 6.0 g source of peroxide.
593. A pouch according to any of embodiments 551-592, wherein the first chamber comprises from 1.0 mg to 10.0 mg transition metal bleach catalyst.
594. A pouch according to any of embodiments 551-593, wherein the first chamber comprises filler material.
595. A pouch according to any of embodiments 551-594, wherein the first chamber comprises a first chamber detergent composition that comprises filler material.
596. A pouch according to any of embodiments 551-595, wherein the first chamber comprises a first chamber solid detergent composition that comprises filler material.
597. A pouch according to any of embodiments 551-596, wherein the first chamber comprises from 0.5 g to 10 g filler material.
598. A pouch according to any of embodiments 594-597, wherein the filler material is sodium sulphate.
599. A pouch according to any of embodiments 551-598, wherein the first chamber comprises polymer.
600 A pouch according to any of embodiments 551-599 wherein the first chamber comprises a first chamber detergent composition that comprises polymer.
601. A pouch according to any of embodiments 551-600, wherein the first chamber comprises from 0.1 g to 3.0 g polymer.
602. A pouch according to any of embodiments 599-601, wherein the polymer is selected from polycarboxylate polymer, sulphonated polycarboxylate polymer, and any combination thereof.
603. A pouch according to embodiment 602, wherein the polymer comprises both a polycarboxylate polymer and a sulphonated polycarboxylate polymer.
604. A pouch according to any of embodiments 551-603, wherein the first chamber comprises surfactant.
605. A pouch according to any of embodiments 551-604, wherein the first chamber comprises a first chamber detergent composition that comprises surfactant.
606. A pouch according to any of embodiments 551-605, wherein the first chamber comprises a first chamber liquid detergent composition that comprises surfactant.
607. A pouch according to any of embodiments 551-606, wherein the first chamber comprises from 1.0 g to 10 g surfactant.
608. A pouch according to any of embodiments 604-607, wherein the surfactant is selected from:
   (i) R—O-$EO_x$, wherein R is a $C_6$-Cis alkyl, and x is from 1 to 30; or
   (ii) R—O-$EO_xPO_y$, wherein R is a $C_6$-$C_{18}$ alkyl, x is from 1 to 20, and y is from 1 to 20; or
   (iii) R—O—$PO_yEO_x$, wherein R is a $C_6$-Cis alkyl, x is from 1 to 20, and y is from 1 to 20; or
   (iv) R—O-$EO_xPO_yEO_x$, wherein R is a $C_6$-Cis alkyl, each x is independently from 1 to 20, and y is from 1 to 20; or
   (v) R—O—$PO_yEO_xPO_y$, wherein R is a $C_6$-Cis alkyl, x is from 1 to 20, and each y is independently from 1 to 20; or
   (vi) HO-$EO_xPO_yEO_x$—H, wherein, each x is independently from 1 to 50, and y is from 1 to 50; or
   (vii) HO—$PO_yEO_xPO_y$—H, wherein x is from 1 to 50, and each y is independently from 1 to 50; or
   (viii) any combination thereof.
609. A pouch according to any of embodiments 551-608, wherein the first chamber comprises a first chamber solid detergent composition and a first chamber liquid detergent composition.
610. A pouch according to embodiment 609, wherein the first chamber solid detergent composition and the first chamber liquid detergent composition are contained within separate compartments of the first chamber.
611. A pouch according to any of embodiments 551-610, wherein the first chamber comprises a first chamber liquid detergent composition, wherein the first chamber liquid detergent composition is contained within two or more separate compartments within the first chamber.
612. A pouch according to any of embodiments 551-611, wherein the first chamber comprises a first chamber liquid detergent composition, wherein the first chamber liquid detergent composition is contained within three or more separate compartments within the first chamber.
613. A pouch according to any of embodiments 551-612, wherein the first chamber comprises a first chamber liquid detergent composition, wherein the first chamber liquid detergent composition is contained within four or more separate compartments within the first chamber.
614. A pouch according to any of embodiments 551-613, wherein the first chamber comprises a first chamber liquid detergent composition, wherein the first chamber liquid detergent composition is contained within five or more separate compartments within the first chamber.

615. A pouch according to any of embodiments 551-614, wherein the second chamber comprises a second chamber solid detergent composition and a second chamber liquid detergent composition.
616. A pouch according to embodiment 615, wherein the second chamber solid detergent composition and the second chamber liquid detergent composition are contained within separate compartments of the second chamber.
617. A pouch according to any of embodiments 551-616, wherein the second chamber comprises a second chamber liquid detergent composition, wherein the second chamber liquid detergent composition is contained within two or more separate compartments within the second chamber.
618. A pouch according to any of embodiments 551-617, wherein the second chamber comprises a second chamber liquid detergent composition, wherein the second chamber liquid detergent composition is contained within three or more separate compartments within the second chamber.
619. A pouch according to any of embodiments 551-618, wherein the second chamber comprises a second chamber liquid detergent composition, wherein the second chamber liquid detergent composition is contained within four or more separate compartments within the second chamber.
620. A pouch according to any of embodiments 551-619, wherein the second chamber comprises a second chamber liquid detergent composition, wherein the second chamber liquid detergent composition is contained within five or more separate compartments within the second chamber.
621. A pouch according to any of embodiments 1-43, wherein the second chamber comprises solvent.
622. A pouch according to embodiment 621, wherein the second chamber comprises a second chamber detergent composition that comprises a solvent.
623. A pouch according to any of embodiments 621-622, wherein the second chamber comprises a second chamber liquid detergent composition that comprises a solvent.
624. A pouch according to any of embodiments 621-623, wherein the second chamber comprises from 0.5 g to 10 g solvent.
625. A pouch according to any of embodiments 621-624, wherein the solvent is an alkanolamine 626. A pouch according to any of embodiments 621-624, wherein the solvent is an ethanolamine.
627. A pouch according to any of embodiments 621-624, wherein the solvent is selected from monoethanolamine, diethanolamine, triethanolamine, or any combination thereof.
628. A pouch according to any of embodiments 621-624, wherein the solvent is monoethanolamine.
629. A pouch according to any of embodiments 621-624, wherein the solvent is diethanolamine.
630. A pouch according to any of embodiments 621-624, wherein the solvent is triethanolamine.
631. A pouch according to any of embodiments 621-624, wherein the solvent is methylglucamine.
632. A pouch according to any of embodiments 621-631, wherein the second chamber comprises builder.
633. A pouch according to any of embodiments 621-632, wherein the second chamber comprises a second chamber detergent composition that comprises builder.
634. A pouch according to any of embodiments 621-633, wherein the second chamber comprises a second chamber solid detergent composition that comprises builder.
635. A pouch according to any of embodiments 621-634, wherein the second chamber comprises a second chamber liquid detergent composition that comprises builder.
636. A pouch according to any of embodiments 621-635, wherein the second chamber comprises from 0.5 g to 10 g builder.
637. A pouch according to any of embodiments 632-636, wherein the builder is selected from aminopolycarboxylic acids and/or salts thereof, carboxylic acids and/or salts thereof, and any combination thereof.
638. A pouch according to any of embodiments 632-636, wherein the builder is selected from methylglycine-N,N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.
639. A pouch according to any of embodiments 632-636, wherein the builder is selected from methylglycine-N,N-diacetic acid and/or salt thereof, glutamic acid diacetic acid and/or salt thereof; citric acid and/or a salt thereof; and any combination thereof.
640. A pouch according to any of embodiments 632-636, wherein the builder is selected from methylglycine-N,N-diacetic acid and/or salt thereof; citric acid and/or a salt thereof; and any combination thereof.
641. A pouch according to any of embodiments 632-636, wherein the builder is selected from methylglycine-N,N-diacetic acid and/or salt thereof.
642. A pouch according to any of embodiments 632-636, wherein the builder is selected from citric acid and/or a salt thereof.
643. A pouch according to any of embodiments 632-636, wherein the builder is the combination of (i) methylglycine-N,N-diacetic acid and/or salt thereof and (ii) citric acid and/or a salt thereof.
644. A pouch according to any of embodiments 621-643, wherein the second chamber comprises a source of alkalinity.
645. A pouch according to any of embodiments 621-644, wherein the second chamber comprises a second chamber detergent composition that comprises a source of alkalinity.
646. A pouch according to any of embodiments 621-645, wherein the second chamber comprises a second chamber solid detergent composition that comprises a source of alkalinity.
647. A pouch according to any of embodiments 621-646, wherein the second chamber comprises a second chamber liquid detergent composition that comprises a source of alkalinity.
648. A pouch according to any of embodiments 621-647, wherein the second chamber comprises from 1.0 g to 20 g source of alkalinity.
649. A pouch according to any of embodiments 621-648, wherein the source of alkalinity is selected from sodium carbonate, sodium bicarbonate, sodium silicate and any combination thereof.
650. A pouch according to any of embodiments 644-649, wherein the source of alkalinity is selected from sodium carbonate, sodium bicarbonate and any combination thereof.

651. A pouch according to any of embodiments 644-650, wherein the source of alkalinity is the combination of sodium carbonate and sodium bicarbonate.
652. A pouch according to any of embodiment 651, wherein the weight ratio of the amount of sodium carbonate present in the second chamber to the amount of sodium bicarbonate present in the second chamber is in the range of from 1.5:1 to 5:1.
653. A pouch according to any of embodiments 621-652, wherein the first chamber comprises enzyme.
654. A pouch according to any of embodiments 621-653, wherein the first chamber comprises, on an active basis, from 1.0 mg to 300 mg enzyme.
655. A pouch according to any of embodiments 621-654, wherein the first chamber comprises a first chamber detergent composition that comprises enzyme.
656. A pouch according to any of embodiments 621-655, wherein the first chamber comprises a first chamber solid detergent composition that comprises enzyme.
657. A pouch according to any of embodiments 621-656, wherein the first chamber comprises a first chamber liquid detergent composition that comprises enzyme.
658. A pouch according to any of embodiments 653-657, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.
659. A pouch according to any of embodiments -653-658, wherein the enzyme is selected from protease, amylase, lipase, cellulase, bleaching enzyme, and any combination thereof.
660. A pouch according to any of embodiments 653-659, wherein the enzyme is selected from protease, amylase, lipase, cellulase, and any combination thereof.
661. A pouch according to any of embodiments 653-660, wherein the enzyme is selected from protease, amylase, lipase, and any combination thereof.
662. A pouch according to any of embodiments 653-661, wherein the enzyme is selected from protease, amylase, and any combination thereof.
663. A pouch according to any of embodiments 621-662, wherein the first chamber comprises protease.
664. A pouch according to any of embodiments 621-663, wherein the first chamber comprises, on an active enzyme basis, from 1.0 mg to 300 mg protease.
665. A pouch according to any of embodiments 663-664, wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis*.
666. A pouch according to any of embodiments 621-665, wherein the first chamber comprises amylase.
667. A pouch according to any of embodiments 621-666 wherein the first chamber comprises, on an active enzyme basis, from 1.0 mg to 100 mg amylase.
668. A pouch according to any of embodiments 666-667, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.
669. A pouch according to any of embodiments 621-668, wherein the first chamber comprises lipase.
670. A pouch according to any of embodiments 621-669, wherein the first chamber comprises cellulase.
671. A pouch according to any of embodiments 621-670, wherein the first chamber comprises a bleaching enzyme.
672. A pouch according to any of embodiments 621-671 wherein the first chamber comprises a sugar degrading enzyme.
673. A pouch according to any of embodiments 621-672, wherein the first chamber comprises an enzyme selected from mannanase and/or pectate lyase.
674. A pouch according to any of embodiments 621-673, wherein the first chamber comprises builder.
675. A pouch according to any of embodiments 621-674, wherein the first chamber comprises a first chamber detergent composition that comprises builder.
676. A pouch according to any of embodiments 621-675, wherein the first chamber comprises a first chamber solid detergent composition that comprises builder.
677. A pouch according to any of embodiments 621-676, wherein the first chamber comprises from 1.0 g to 20 g builder.
678. A pouch according to any of embodiments 674-677, wherein the builder is selected from aminopolycarboxylic acids and/or salts thereof, carboxylic acids and/or salts thereof, and any combination thereof.
679. A pouch according to any of embodiments 674-678, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.
680. A pouch according to any of embodiments 674-679 wherein the builder is selected from methylglycine-N, N-diacetic acid and/or salt thereof.
681. A pouch according to any of embodiments 674-679, wherein the builder is selected from citric acid and/or a salt thereof.
682. A pouch according to any of embodiments 621-681, wherein the first chamber comprises a first chamber solid detergent composition having an equilibrium pH, upon dilution to 0.1 g/l in deionized water at a temperature of 20° C., of from above 7.0 to 12.0.
683. A pouch according to any of embodiments 621-682, wherein the first chamber comprises a first chamber solid detergent composition having an equilibrium pH, upon dilution to 0.1 g/l in deionized water at a temperature of 20° C., of from 9.0 to 11.0.
684. A pouch according to any of embodiments 621-683, wherein the first chamber comprises a first chamber solid detergent composition having an equilibrium pH, upon dilution to 0.1 g/l in deionized water at a temperature of 20° C., of from 10.0 to 11.0.
685. A pouch according to any of embodiments 621-684, wherein the first chamber comprises an alkalinity source.
686. A pouch according to any of embodiments 621-685 wherein the first chamber comprises a first chamber detergent composition comprising an alkalinity source.
687. A pouch according to any of embodiments 621-686, wherein the first chamber comprises a first chamber solid detergent composition comprising an alkalinity source.
688. A pouch according to any of embodiments 621-687, wherein the first chamber comprises from 1.0 g to 20 g alkalinity source.

689. A pouch according to any of embodiments 685-688, wherein the alkalinity source is selected from sodium bicarbonate, sodium carbonate, sodium silicate, and any combination thereof.
690. A pouch according to any of embodiments 685-689, wherein the alkalinity source is sodium bicarbonate and/or sodium carbonate.
691. A pouch according to any of embodiments 685-690, wherein the alkalinity source is sodium carbonate.
692. A pouch according to any of embodiments 621-691, wherein the first chamber comprises bleach.
693. A pouch according to any of embodiments 621-692, wherein the first chamber comprises a first chamber detergent composition that comprises bleach.
694. A pouch according to any of embodiments 621-693, wherein the first chamber comprises a first chamber solid detergent composition that comprises bleach.
695. A pouch according to any of embodiments 621-694, wherein the first chamber comprises from 1.0 g to 5.0 g bleach.
696. A pouch according to any of embodiments 692-695, wherein the bleach comprises a source of peroxide.
697. A pouch according to embodiment 696, wherein the source of peroxide is percarbonate.
698. A pouch according to any of embodiments 692-697, wherein the bleach comprises a bleach activator.
699. A pouch according to embodiment 698, wherein the bleach activator is tetraacetylethylenediamine.
700. A pouch according to any of embodiments 692-699, wherein the bleach comprises a bleach catalyst.
701. A pouch according to embodiment 700, wherein the bleach catalyst is a transition metal bleach catalyst.
702. A pouch according to embodiment 701, wherein the transition metal bleach catalyst is a cobalt bleach catalyst, a manganese bleach catalyst, an iron bleach catalyst or any combination thereof.
703. A pouch according to any of embodiments 621-702, wherein the first chamber comprises from 1.0 g to 6.0 g source of peroxide.
704. A pouch according to any of embodiments 621-703, wherein the first chamber comprises from 1.0 mg to 10.0 mg transition metal bleach catalyst.
705. A pouch according to any of embodiments 621-704, wherein the first chamber comprises filler material.
706. A pouch according to any of embodiments 621-705, wherein the first chamber comprises a first chamber detergent composition that comprises filler material.
707. A pouch according to any of embodiments 621-706, wherein the first chamber comprises a first chamber solid detergent composition that comprises filler material.
708. A pouch according to any of embodiments 621-707, wherein the first chamber comprises from 0.5 g to 10 g filler material.
709. A pouch according to any of embodiments 705-708, wherein the filler material is sodium sulphate.
710. A pouch according to any of embodiments 621-709, wherein the first chamber comprises polymer.
711. A pouch according to any of embodiments 621-710, wherein the first chamber comprises a first chamber detergent composition that comprises polymer.
712. A pouch according to any of embodiments 621-711, wherein the first chamber comprises from 0.1 g to 3.0 g polymer.
713. A pouch according to any of embodiments 710-712, wherein the polymer is selected from polycarboxylate polymer, sulphonated polycarboxylate polymer, and any combination thereof.
714. A pouch according to embodiment 713, wherein the polymer comprises both a polycarboxylate polymer and a sulphonated polycarboxylate polymer.
715. A pouch according to any of embodiments 621-714, wherein the first chamber comprises surfactant.
716. A pouch according to any of embodiments 621-715, wherein the first chamber comprises a first chamber detergent composition that comprises surfactant.
717. A pouch according to any of embodiments 621-716, wherein the first chamber comprises a first chamber liquid detergent composition that comprises surfactant.
718. A pouch according to any of embodiments 621-717, wherein the first chamber comprises from 1.0 g to 10 g surfactant.
719. A pouch according to any of embodiments 715-718, wherein the surfactant is selected from:
    (i) R—O-$EO_x$, wherein R is a $C_6$-$C_{18}$ alkyl, and x is from 1 to 30; or
    (ii) R—O-$EO_xPO_y$, wherein R is a $C_6$-$C_{18}$ alkyl, x is from 1 to 20, and y is from 1 to 20; or
    (iii) R—O—$PO_yEO_x$, wherein R is a $C_6$-$C_{18}$ alkyl, x is from 1 to 20, and y is from 1 to 20; or
    (iv) R—O-$EO_xPO_yEO_x$, wherein R is a $C_6$-$C_{18}$ alkyl, each x is independently from 1 to 20, and y is from 1 to 20; or
    (v) R—O—$PO_yEO_xPO_y$, wherein R is a $C_6$-$C_{18}$ alkyl, x is from 1 to 20, and each y is independently from 1 to 20; or
    (vi) HO-$EO_xPO_yEO_x$—H, wherein, each x is independently from 1 to 50, and y is from 1 to 50; or
    (vii) HO—$PO_yEO_xPO_y$—H, wherein x is from 1 to 50, and each y is independently from 1 to 50; or
    (viii) any combination thereof.
720. A pouch according to any of embodiments 621-719, wherein the first chamber comprises a first chamber solid detergent composition and a first chamber liquid detergent composition.
721. A pouch according to embodiment 720, wherein the first chamber solid detergent composition and the first chamber liquid detergent composition are contained within separate compartments of the first chamber.
722. A pouch according to any of embodiments 621-721, wherein the first chamber comprises a first chamber liquid detergent composition, wherein the first chamber liquid detergent composition is contained within two or more separate compartments within the first chamber.
723. A pouch according to any of embodiments 621-722, wherein the first chamber comprises a first chamber liquid detergent composition, wherein the first chamber liquid detergent composition is contained within three or more separate compartments within the first chamber.
724. A pouch according to any of embodiments 621-723, wherein the first chamber comprises a first chamber liquid detergent composition, wherein the first chamber liquid detergent composition is contained within four or more separate compartments within the first chamber.
725. A pouch according to any of embodiments 621-724, wherein the first chamber comprises a first chamber liquid detergent composition, wherein the first chamber liquid detergent composition is contained within five or more separate compartments within the first chamber.

726. A pouch according to any of embodiments 1-43, wherein the second chamber comprises a source of alkalinity 727. A pouch according to any of embodiment 726, wherein the second chamber comprises a second chamber detergent composition that comprises a source of alkalinity.

728. A pouch according to any of embodiments 726-727, wherein the second chamber comprises a second chamber solid detergent composition that comprises a source of alkalinity.

729. A pouch according to any of embodiments 726-728, wherein the second chamber comprises a second chamber liquid detergent composition that comprises a source of alkalinity.

730. A pouch according to any of embodiments 726-729, wherein the second chamber comprises from 1.0 g to 20 g source of alkalinity.

731. A pouch according to any of embodiments 726-730, wherein the source of alkalinity is selected from sodium carbonate, sodium bicarbonate, sodium silicate and any combination thereof.

732. A pouch according to any of embodiments 726-731, wherein the source of alkalinity is selected from sodium carbonate, sodium bicarbonate and any combination thereof.

733. A pouch according to any of embodiments 726-732, wherein the source of alkalinity is the combination of sodium carbonate and sodium bicarbonate.

734. A pouch according to any of embodiment 733, wherein the weight ratio of the amount of sodium carbonate present in the second chamber to the amount of sodium bicarbonate present in the second chamber is in the range of from 1.5:1 to 5:1.

735. A pouch according to any of embodiments 726-730, wherein the source of alkalinity is sodium hydroxide and/or calcium oxide.

736. A pouch according to any of embodiments 726-730, wherein the source of alkalinity is sodium hydroxide.

737. A pouch according to any of embodiments 726-736, wherein the second chamber comprises a second chamber detergent composition having an equilibrium pH, upon dilution to 0.1 g/l in deionized water at a temperature of 20° C., of from above 7.0 to 12.0.

738. A pouch according to any of embodiments 726-737, wherein the second chamber comprises a second chamber detergent composition having an equilibrium pH, upon dilution to 0.1 g/l in deionized water at a temperature of 20° C., of from 9.0 to 11.0.

739. A pouch according to any of embodiments 726-738, wherein the second chamber comprises a second chamber detergent composition having an equilibrium pH, upon dilution to 0.1 g/l in deionized water at a temperature of 20° C., of from 10.0 to 11.0.

740. A pouch according to any of embodiments 737-739, wherein the second chamber detergent composition is a second chamber solid detergent composition.

741. A pouch according to any of embodiments 737-740, wherein the second chamber detergent composition is a second chamber liquid detergent composition.

742. A pouch according to any of embodiments 726-741, wherein the first chamber comprises enzyme.

743. A pouch according to any of embodiments 726-742, wherein the first chamber comprises, on an active basis, from 1.0 mg to 300 mg enzyme.

744. A pouch according to any of embodiments 726-743, wherein the first chamber comprises a first chamber detergent composition that comprises enzyme.

745. A pouch according to any of embodiments 726-744, wherein the first chamber comprises a first chamber solid detergent composition that comprises enzyme.

746. A pouch according to any of embodiments 726-745, wherein the first chamber comprises a first chamber liquid detergent composition that comprises enzyme.

747. A pouch according to any of embodiments 742-746, wherein the enzyme is selected from protease, amylase, lipase, cellulase, bleaching enzyme, sugar degrading enzyme, glucanase, glycosyl hydrolase, hemicellulose, mannanase, phospholipase, xylanase, and any combination thereof.

748. A pouch according to any of embodiments 742-747, wherein the enzyme is selected from protease, amylase, lipase, cellulase, bleaching enzyme, and any combination thereof.

749. A pouch according to any of embodiments 742-748, wherein the enzyme is selected from protease, amylase, lipase, cellulase, and any combination thereof.

750. A pouch according to any of embodiments 742-749, wherein the enzyme is selected from protease, amylase, lipase, and any combination thereof.

751. A pouch according to any of embodiments 742-750, wherein the enzyme is selected from protease, amylase, and any combination thereof.

752. A pouch according to any of embodiments 726-751, wherein the first chamber comprises protease.

753. A pouch according to any of embodiments 726-752, wherein the first chamber comprises, on an active enzyme basis, from 1.0 mg to 300 mg protease.

754. A pouch according to any of embodiments 752-753 wherein the protease is selected from protease variants of: *Bacillus alcalophilus, Bacillus amyloliquefaciens, Bacillus clausii, Bacillus lentus, Bacillus gibsonii* Bgi02446, *Bacillus gibsonii* DSM14391, *Bacillus pumilus*, and *Bacillus subtilis.*

754. A pouch according to any of embodiments 726-753, wherein the first chamber comprises amylase.

755. A pouch according to any of embodiments 726-754 wherein the first chamber comprises, on an active enzyme basis, from 1.0 mg to 100 mg amylase.

756. A pouch according to any of embodiments 754-755, wherein the amylase is selected from amylase variants of: *Bacillus amyloliquefaciens, Bacillus licheniformis, Bacillus stearothermophilus, Bacillus subtilis*, or other *Bacillus* sp., such as *Bacillus* sp. 707, AA2560, DSM 9375, DSM 12368, DSM 12649, DSM 12651, KSM AP1378, KSM K36, KSM K38, NCIB 12289, NCIB 12512, and NCIB 12513.

757. A pouch according to any of embodiments 726-756, wherein the first chamber comprises lipase.

758. A pouch according to any of embodiments 726-757, wherein the first chamber comprises cellulase.

759. A pouch according to any of embodiments 726-758, wherein the first chamber comprises a bleaching enzyme.

760. A pouch according to any of embodiments 726-759 wherein the first chamber comprises a sugar degrading enzyme.

761. A pouch according to any of embodiments 726-760, wherein the first chamber comprises an enzyme selected from mannanase and/or pectate lyase.

762. A pouch according to any of embodiments 726-761, wherein the first chamber comprises builder.

763. A pouch according to any of embodiments 726-762, wherein the first chamber comprises a first chamber detergent composition that comprises builder.

764. A pouch according to any of embodiments 726-763, wherein the first chamber comprises a first chamber solid detergent composition that comprises builder.
765. A pouch according to any of embodiments 726-764, wherein the first chamber comprises from 1.0 g to 20 g builder.
766. A pouch according to any of embodiments 762-765, wherein the builder is selected from aminopolycarboxylic acids and/or salts thereof, carboxylic acids and/or salts thereof, and any combination thereof.
767. A pouch according to any of embodiments 762-766, wherein the builder is selected from methylglycine-N, N-diacetic acid and/or salt thereof, glutamic acid diacetic acid and/or salt thereof, iminodisuccinic acid and/or salt thereof; hydroxyethyleiminodiacetic acid and/or salt thereof; citric acid and/or a salt thereof; and any combination thereof.
768. A pouch according to any of embodiments 762-767 wherein the builder is selected from methylglycine-N, N-diacetic acid and/or salt thereof.
769. A pouch according to any of embodiments 762-767, wherein the builder is selected from citric acid and/or a salt thereof.
770. A pouch according to any of embodiments 726-769, wherein the first chamber comprises a first chamber solid detergent composition having an equilibrium pH, upon dilution to 0.1 g/l in deionized water at a temperature of 20° C., of from above 7.0 to 12.0.
771. A pouch according to any of embodiments 726-770, wherein the first chamber comprises a first chamber solid detergent composition having an equilibrium pH, upon dilution to 0.1 g/l in deionized water at a temperature of 20° C., of from 9.0 to 11.0.
772. A pouch according to any of embodiments 726-771, wherein the first chamber comprises a first chamber solid detergent composition having an equilibrium pH, upon dilution to 0.1 g/l in deionized water at a temperature of 20° C., of from 10.0 to 11.0.
773. A pouch according to any of embodiments 726-772, wherein the first chamber comprises an alkalinity source.
774. A pouch according to any of embodiments 726-773, wherein the first chamber comprises a first chamber detergent composition comprising an alkalinity source.
775. A pouch according to any of embodiments 726-774, wherein the first chamber comprises a first chamber solid detergent composition comprising an alkalinity source.
776. A pouch according to any of embodiments 726-774, wherein the first chamber comprises a first chamber liquid detergent composition comprising an alkalinity source.
777. A pouch according to any of embodiments 726-776, wherein the first chamber comprises from 1.0 g to 20 g alkalinity source.
778. A pouch according to any of embodiments 773-777, wherein the alkalinity source is selected from sodium bicarbonate, sodium carbonate, sodium silicate, and any combination thereof.
779. A pouch according to any of embodiments 773-778, wherein the alkalinity source is sodium bicarbonate and/or sodium carbonate.
780. A pouch according to any of embodiments 773-779, wherein the alkalinity source is sodium carbonate.
781. A pouch according to any of embodiments 773-777, wherein the alkalinity source is sodium hydroxide and/or calcium oxide.
782. A pouch according to any of embodiments 773-777, wherein the alkalinity source is sodium hydroxide.
783. A pouch according to any of embodiments 726-782, wherein the first chamber comprises bleach.
784. A pouch according to any of embodiments 726-783, wherein the first chamber comprises a first chamber detergent composition that comprises bleach.
785. A pouch according to any of embodiments 726-784, wherein the first chamber comprises a first chamber solid detergent composition that comprises bleach.
786. A pouch according to any of embodiments 726-785, wherein the first chamber comprises from 1.0 g to 5.0 g bleach.
787. A pouch according to any of embodiments 783-786, wherein the bleach comprises a source of peroxide.
789. A pouch according to embodiment 787, wherein the source of peroxide is percarbonate.
790. A pouch according to any of embodiments 783-789, wherein the bleach comprises a bleach activator.
791. A pouch according to embodiment 790, wherein the bleach activator is tetraacetylethylenediamine.
792. A pouch according to any of embodiments 783-791, wherein the bleach comprises a bleach catalyst.
793. A pouch according to embodiment 792, wherein the bleach catalyst is a transition metal bleach catalyst.
794. A pouch according to embodiment 793, wherein the transition metal bleach catalyst is a cobalt bleach catalyst, a manganese bleach catalyst, an iron bleach catalyst or any combination thereof.
795. A pouch according to any of embodiments 726-794, wherein the first chamber comprises from 1.0 g to 6.0 g source of peroxide.
796. A pouch according to any of embodiments 726-795, wherein the first chamber comprises from 1.0 mg to 10.0 mg transition metal bleach catalyst.
797. A pouch according to any of embodiments 726-796, wherein the first chamber comprises filler material.
798. A pouch according to any of embodiments 726-797, wherein the first chamber comprises a first chamber detergent composition that comprises filler material.
799. A pouch according to any of embodiments 726-798, wherein the first chamber comprises a first chamber solid detergent composition that comprises filler material.
800. A pouch according to any of embodiments 726-799, wherein the first chamber comprises from 0.5 g to 10 g filler material.
801. A pouch according to any of embodiments 797-800, wherein the filler material is sodium sulphate.
802. A pouch according to any of embodiments 726-801, wherein the first chamber comprises polymer.
803. A pouch according to any of embodiments 726-802, wherein the first chamber comprises a first chamber detergent composition that comprises polymer.
804. A pouch according to any of embodiments 726-803, wherein the first chamber comprises from 0.1 g to 3.0 g polymer.
805. A pouch according to any of embodiments 802-804, wherein the polymer is selected from polycarboxylate polymer, sulphonated polycarboxylate polymer, and any combination thereof.
806. A pouch according to embodiment 805, wherein the polymer comprises both a polycarboxylate polymer and a sulphonated polycarboxylate polymer.
807. A pouch according to any of embodiments 726-806, wherein the first chamber comprises surfactant.

808. A pouch according to any of embodiments 726-807, wherein the first chamber comprises a first chamber detergent composition that comprises surfactant.

809. A pouch according to any of embodiments 726-808, wherein the first chamber comprises a first chamber liquid detergent composition that comprises surfactant.

810. A pouch according to any of embodiments 726-809, wherein the first chamber comprises from 1.0 g to 10 g surfactant.

811. A pouch according to any of embodiments 807-810, wherein the surfactant is selected from:

(i) R—O-$EO_x$, wherein R is a $C_6$-$C_{18}$ alkyl, and x is from 1 to 30; or (ii) R—O-$EO_xPO_y$, wherein R is a $C_6$-$C_{18}$ alkyl, x is from 1 to 20, and y is from 1 to 20; or (iii) R—O—$PO_yEO_x$, wherein R is a $C_6$-$C_{18}$ alkyl, x is from 1 to 20, and y is from 1 to 20; or (iv) R—O-$EO_xPO_yEO_x$, wherein R is a $C_6$-$C_{18}$ alkyl, each x is independently from 1 to 20, and y is from 1 to 20; or (v) R—O—$PO_yEO_xPO_y$, wherein R is a $C_6$-$C_{18}$ alkyl, x is from 1 to 20, and each y is independently from 1 to 20; or (vi) HO-$EO_xPO_yEO_x$—H, wherein, each x is independently from 1 to 50, and y is from 1 to 50; or (vii) HO—$PO_yEO_xPO_y$—H, wherein x is from 1 to 50, and each y is independently from 1 to 50; or (viii) any combination thereof.

812. A pouch according to any of embodiments 726-811, wherein the first chamber comprises a first chamber solid detergent composition and a first chamber liquid detergent composition.

813. A pouch according to embodiment 812, wherein the first chamber solid detergent composition and the first chamber liquid detergent composition are contained within separate compartments of the first chamber.

814. A pouch according to any of embodiments 726-813, wherein the first chamber comprises a first chamber liquid detergent composition, wherein the first chamber liquid detergent composition is contained within two or more separate compartments within the first chamber.

815. A pouch according to any of embodiments 726-814, wherein the first chamber comprises a first chamber liquid detergent composition, wherein the first chamber liquid detergent composition is contained within three or more separate compartments within the first chamber.

816. A pouch according to any of embodiments 726-815, wherein the first chamber comprises a first chamber liquid detergent composition, wherein the first chamber liquid detergent composition is contained within four or more separate compartments within the first chamber.

817. A pouch according to any of embodiments 727-816, wherein the first chamber comprises a first chamber liquid detergent composition, wherein the first chamber liquid detergent composition is contained within five or more separate compartments within the first chamber.

818. A method of washing dishware in an automatic dishwashing machine, wherein the method comprises the steps of:

(a) placing a pouch according to any preceding embodiment in an automatic dishwashing machine such that the first chamber is placed inside a dispenser drawer in the automatic dishwashing machine and the dispenser drawer is closed, and the second chamber, whilst still being connected to the first chamber by the linking portion of film, hangs outside of the dispenser drawer in the washing zone of the automatic dishwashing machine;

(b) introducing first water into the washing zone of the automatic dishwashing machine and performing a pre-wash of the dishware contained therein, wherein during step (b) at least part of the water-soluble film that forms the second chamber dissolves such that at least some of the detergent ingredients comprised within the second chamber are released into the washing zone of the automatic dishwashing machine during this pre-washing step;

(c) optionally, removing at least some of the water from washing zone of the automatic dishwashing machine;

(d) introducing second water into the washing zone of the automatic dishwashing machine and performing a main wash of the dishware contained therein, wherein during step (d) the closed dispenser drawer is opened and at least part of the water-soluble film that forms the first chamber dissolves such that at least some of the detergent ingredients comprised within the first chamber are released into the washing zone of the automatic dishwashing machine during this main washing step; and (e) removing at least some of the water from the washing zone of the automatic dishwashing machine.

819. A method according to embodiment 818, wherein the method comprises the steps:

(f) introducing third water into the washing zone of the automatic dishwashing machine and rinsing the dishware contained therein; and (g) removing at least some of the water from the washing zone of the automatic dishwashing machine.

820. A method according to any of embodiments 818-819, wherein the method comprises the step:

(h) drying the dishware contained in the washing zone of the automatic dishwashing machine.

821. A method according to any of embodiments 818-820, wherein during step (b) the inlet temperature of the first water can be in the range of from 15° C. to 60° C.

822. A method according to any of embodiments 818-821, wherein the duration of step (b) is in the range of from 60 seconds to 30 minutes.

823. A method according to any of embodiments 818-822, wherein step (c) is not optional but instead is an essential step.

824. A method according to any of embodiments 818-823, wherein during step (d) the inlet temperature of the first water can be in the range of from 15° C. to 70° C.

825. A method according to any of embodiments 818-824, wherein the duration of step (d) is in the range of from 5 minutes to 90 minutes.

826. A method according to any of embodiments 818-825, wherein during step (f) the inlet temperature of the third water is in the range of from 15° C. to 80° C.

827. A method according to any of embodiments 819-826, wherein the duration of step (f) is in the range of from 5 minutes to 60 minutes.

828. A method according to any of embodiments 819-825, wherein during step (h) the maximum drying temperature is in the range of from 45° C. to 90° C.

829. A method according to any of embodiments 820-825, wherein step (h) has a duration of from 5 minutes to 60 minutes.

EXAMPLES

Example 1

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| Ingredient | Automatic Dishwashing Composition 1 | 2 | 3 | 4 |
|---|---|---|---|---|
| | Level (grams active per dose) | | | |
| Sodium hydrogen carbonate | | | 5 | 5 |
| Sodium carbonate | 2.4 | 2.4 | | |
| TAED (tetraacetylethylenediamine) | | 1 | | 1 |
| MnTACN (1,4,7-trimethyl-1,4,7-triazacyclononane) | | 0.008 | | 0.008 |
| Sodium percarbonate | | 3 | | 3 |
| MGDA (Tri-sodium salt of methyl glycine diacetic acid) | | | 2.4 | 2.4 |
| Amylase | | | 0.05 | 0.05 |
| Protease | | | 0.05 | 0.05 |
| Sulphonated polyacrylate (Acusol ™ 588 supplied by Dow) | | | 0.76 | 0.76 |
| Lutensol ® TO7 (non-ionic surfactant supplied by BASF) | | | 0.90 | 0.90 |
| Plurafac ® SLF180 (non-ionic surfactant supplied by BASF) | | | 0.81 | 0.81 |
| Processing Aids: Glycerine & Dipropylene Glycol | | | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| Cooked Cereal Tile | P&G internal technical monitor | Stainless steel tile with 0.7 g of cereal applied and cooked | 2 |

Dishwasher monitors were purchased from Center for Test materials B. V. Netherlands. The following stains were used

| Code | Stain |
|---|---|
| n/a-made internally | Cooked Cereal Tile |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains tested. The stains were analyzed before and after washing via gravimetric analysis (weighted). Percentage soil removal by weight is a 0-100 scale with 0=no stain removal and 100=full removal of the soil.

| | % Soil (Stain) removal (Cooked tile) |
|---|---|
| Example A (comparative) | 70% |
| Example B | 84% |

As shown in the table above Example B has a superior cleaning performance versus comparative Example A.

Example 2

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| Ingredient | Automatic Dishwashing Composition 1 | 2 | 3 | 4 |
|---|---|---|---|---|
| | Level (grams active per dose) | | | |
| PAP (Phthalimidoperoxycaprioc acid) | | 1 | | 1 |
| Amylase | | | 0.05 | 0.05 |
| Protease | | | 0.05 | 0.05 |
| Sodium hydrogen carbonate | | | 5 | 5 |
| Sulphonated polyacrylate (Acusol ™ 588 supplied by Dow) | | | 0.76 | 0.76 |
| MGDA Tri-sodium salt of methyl glycine diacetic acid | | | 2.4 | 2.4 |
| Lutensol ® TO7 (non-ionic surfactant supplied by BASF) | 0.90 | 0.90 | 0.90 | 0.90 |
| Plurafac ® SLF180 (non-ionic surfactant supplied by BASF) | 0.81 | 0.81 | 0.81 | 0.81 |
| Processing Aids: Glycerine & Dipropylene Glycol | 0.33 | 0.33 | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFT Tiles | Center for Test materials B. V. Netherlands | Melamine tile with double layer of baked cheese applied | 2 |
| Cooked Cereal Tile | P&G internal technical monitor | Stainless steel tile with 0.7 g of cereal applied and cooked | 2 |

Dishwasher monitors were purchased from Center for Testmaterials B. V. Netherlands. The following stains were used

| Code | Stain |
|---|---|
| DM06 | Single baked cheese |
| n/a-made internally | Cooked Cereal Tile |

Test Wash Procedure

Automatic Dishwasher: Miele, model GSL2

Wash volume: 5000 ml

Pre-Wash Water temperature: 35'C (12 minutes)

Main Wash Water temperature: 50'C (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains tested. The stains were analysed before and after washing via Image Analysis System OR via gravimetric analysis to measure % stain removed, and stain removal index (SRI) and w/w % soil removed were calculated. SRI & Percentage soil removal by weight is a 0-100 scale with 0=no stain removal and 100=full removal of the soil.

| | SRI CFT DM06 | % Soil (stain) removal (Cooked tile) |
|---|---|---|
| Example A (comparative) | 44.8% | 64% |
| Example B | 56.7% | 82% |

As shown in the table above Example B has a superior cleaning performance versus comparative Example A.

Example 3

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| Ingredient | Automatic Dishwashing Composition 1 | 2 | 3 | 4 |
|---|---|---|---|---|
| | Level (grams active per dose) | | | |
| Sodium carbonate | 5 | 5 | | |
| MGDA (Tri-sodium salt of methyl glycine diacetic acid) | | 5.1 | | 5.1 |
| Amylase | | | 0.01 | 0.01 |
| Citric acid | | | 1 | 1 |
| Lutensol ® TO7 (non-ionic surfactant supplied by BASF) | | | 0.90 | 0.90 |

-continued

| Ingredient | Automatic Dishwashing Composition 1 | 2 | 3 | 4 |
|---|---|---|---|---|
| | Level (grams active per dose) | | | |
| Plurafac ® SLF180 (non-ionic surfactant supplied by BASF) | | | 0.74 | 0.74 |
| Processing Aids: Dipropylene Glycol and Glycerine | | | 0.40 | 0.40 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| Libbey Glass | Artis | Libbey Straight sided Collins 29 cl drinking glasses - Libbey code 918823 | 6 |
| Plastic Tumblers | Mistral Brands Ltd | Long drink glasses, made of the plastic SAN, 250 ml | 2 |

Test Wash Procedure

- Automatic Dishwasher: Miele, model GSL2
- Wash volume: 5000 ml
- Pre-Wash Water temperature: 35° C. (12 minutes)
- Main Wash Water temperature: 50° C. (17 minutes)
- Water hardness: 21 gpg
- Pre-wash composition addition: Added at the start of cycle before the dispenser opens, when PVA is dissolved by the pre-wash water releasing the contents into the dishwasher.
- Main Wash composition addition: Added when the detergent dispenser opens at the start of the main wash.

Shine Performance

| | Pre-wash composition | Main Wash composition |
|---|---|---|
| Example A (comparative) | Composition 1 | Composition 4 |
| Example B | Composition 2 | Composition 3 |

A dishwasher was loaded with the items as detailed above which were washed using as described. After running 4 consecutive cycles, the glass and plastic tumblers were then photographed against a black background and the images were analyzed using computer aided software. The image produced is analyzed versus the greyscale and assigned a number to indicate the average transmission of light through the same. The whiter the image, the lower the transmission of light through the sample, the blacker the image, the higher the transmission of light through the sample. The number is converted to a percentage scale and called % clarity. A clarity difference of 2 is significant, with a higher % clarity desired.

% clarity=100−((Average Grey Scale Value/255)*100)

A spot is defined as a circular cluster larger than 4 pixels with higher gray scale (4 units) versus the background, while grit is defined as a circular cluster smaller than 4 pixels with higher gray scale (4 units) versus the background. A lower spot count is desired.

| | Libbey Glasses % Clarity | Plastic Tumblers % Clarity |
|---|---|---|
| Example A (comparative) | 0.0 | 0.8 |
| Example B | 92.5 | 88.1 |

As shown in the table above, Example B has superior clarity on both glass and plastic versus comparative Example A.

Example 4

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| Ingredient | Automatic Dishwashing Composition 1 | 2 | 3 | 4 |
|---|---|---|---|---|
| | Level (grams active per dose) | | | |
| Sodium carbonate | 1.53 | 1.53 | 4 | 4 |
| Sodium hydrogen carbonate | 3.47 | 3.47 | | |
| Amylase | | 0.05 | | 0.05 |
| MGDA (Tri-sodium salt of methyl glycine diacetic acid) | | | 2.4 | 2.4 |
| Sodium percarbonate | | | 3 | 3 |
| TAED (tetraacetylethylenediamine) | | | 1 | 1 |
| MnTACN (1,4,7-trimethyl-1,4,7-triazacyclononane) | | | 0.008 | 0.008 |
| Lutensol ® TO7 (non-ionic surfactant supplied by BASF) | | | 0.90 | 0.90 |
| Plurafac ® SLF180 (non-ionic surfactant supplied by BASF) | | | 0.74 | 0.74 |
| Processing Aids: Glycerine & Dipropylene Glycol | | | 0.40 | 0.40 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFT Tiles | Center for Test materials B. V. Netherlands | Melamine tile with double layer of Bake cheese applied | 2 |

Dishwasher monitors were purchased from Center for Test materials B. V. Netherlands. The following stains were used

| Code | Stain |
|---|---|
| DM08 | Double Baked Cheese |

Test Wash Procedure

Automatic Dishwasher: Miele, model GSL2

Wash volume: 5000 ml

Pre-Wash Water temperature: 35'C (12 minutes)

Main Wash Water temperature: 50'C (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates of each of the stains were tested. The stains were analyzed before and after washing via Image Analysis System to measure % stain removed, and stain removal index (SRI) was calculated. SRI is a 0-100 scale with 0=no stain removal and 100=full removal of the soil.

| | SRI CFT (%) |
|---|---|
| Example A (comparative) | 8.2 |
| Example B | 22.9 |

As shown in the table above Example B has a superior cleaning performance versus comparative Example A.

Example 5

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| | Automatic Dishwashing Composition | | | |
|---|---|---|---|---|
| | 1 | 2 | 3 | 4 |
| Ingredient | Level (grams active per dose) | | | |
| Sodium carbonate | | | 4 | 4 |
| Sodium hydrogen carbonate | 2.5 | 2.5 | | |
| Protease | | 0.05 | | 0.05 |
| Glycerine | | 4.35 | | 4.35 |
| MGDA Tri-sodium salt of methyl glycine diacetic acid | | | 4.8 | 4.8 |
| Sodium percarbonate | | | 3 | 3 |
| TAED (tetraacetylethylenediamine) | | | 1 | 1 |
| MnTACN (1,4,7-trimethyl-1,4,7-triazacyclononane) | | | 0.008 | 0.008 |
| Lutensol ® TO7 (non-ionic surfactant supplied by BASF) | | | 0.90 | 0.90 |
| Plurafac ® SLF180 (non-ionic surfactant supplied by BASF) | | | 0.81 | 0.81 |
| Processing Aids: Glycerine & Dipropylene Glycol | | | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFT Tiles | Center for Test materials B. V. Netherlands | Melamine tile with double layer of mined meat applied | 2 |

Dishwasher monitors were purchased from Center for Test materials B. V. Netherlands. The following stains were used

| Code | Stain |
|---|---|
| DM92 | Double Minced Meat |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains were tested. The stains were analyzed before and after washing via Image Analysis System to measure % stain removed, and stain removal index (SRI) was calculated. SRI is a 0-100 scale with 0=no stain removal and 100=full removal of the soil.

| | SRI CFT |
|---|---|
| Example A (comparative) | 44.2 |
| Example B | 54.9 |

As shown in the table above Example B has a superior cleaning performance versus comparative Example A.

Example 6

Automatic dishwashing compositions were made as detailed herein below.

Preparation of Test Compositions

Pre-Wash compositions (herein Compositions 1, 2, 3 and 4) and Main Wash compositions (herein Compositions 5 and 6) were prepared as detailed below:

| | Automatic Dishwashing Composition | | | | | |
|---|---|---|---|---|---|---|
| | 1 | 2 | 3 | 4 | 5 | 6 |
| Ingredient | Level (grams active per dose) | | | | | |
| Sodium hydrogen carbonate | 5 | 5 | 1.53 | 1.53 | | |
| Sodium carbonate | | | 3.47 | 3.47 | 4 | 4 |
| Protease | | 0.05 | | 0.05 | | 0.05 |
| Amylase | | 0.05 | | 0.05 | | 0.05 |
| MGDA (Tri-sodium salt of methyl glycine diacetic acid) | | | | | 2.4 | 2.4 |
| Sodium percarbonate | | | | | 3 | 3 |
| TAED (tetraacetylethylenediamine) | | | | | 1 | 1 |
| MnTACN (1,4,7-trimethyl-1,4,7-triazacyclononane) | | | | | 0.008 | 0.008 |
| Lutensol ® TO7 (non-ionic surfactant supplied by BASF) | | | | | 0.90 | 0.90 |
| Plurafac ® SLF180 (non-ionic surfactant supplied by BASF) | | | | | 0.74 | 0.74 |
| Processing Aids: Glycerine & Dipropylene Glycol | | | | | 0.40 | 0.40 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFT Tiles | Center for Test materials B. V. Netherlands | Melamine tile with single (DM06) and double (DM08) layer of baked cheese applied | 2 |

Dishwasher monitors were purchased from Center for Test materials B. V. Netherlands. The following stains were used

| Code | Stain |
|---|---|
| DM06 | Single Baked Cheese |
| DM08 | Double Baked Cheese |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| TEST 1 | Pre-wash composition | Main wash composition |
|---|---|---|
| Example A (comparative) | Composition 1 | Composition 6 |
| Example B | Composition 2 | Composition 5 |

| TEST 2 | Pre-wash composition | Main wash composition |
|---|---|---|
| Example C (comparative) | Composition 3 | Composition 6 |
| Example D | Composition 4 | Composition 5 |

A dishwasher was loaded with the dishwasher monitors as detailed above which were washed as described. Two replicates for each of the stains were tested. The stains were analyzed before and after washing via Image Analysis System to measure % stain removed, and stain removal index (SRI) was calculated. SRI is a 0-100 scale with 0=no stain removal and 100=full removal of the soil.

| TEST 1 | SRI CFT DM06 | SRI CFT DM08 |
|---|---|---|
| Example A (comparative) | 77.8 | 25.3 |
| Example B | 96.7 | 58.5 |

As shown in the table above Example B has a superior cleaning performance versus comparative Example A.

| TEST 2 | SRI CFT DM08 |
|---|---|
| Example C (comparative) | 32.7 |
| Example D | 63.7 |

As shown in the table above Example D has a superior cleaning performance versus comparative Example C.

Example 7

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| | Automatic Dishwashing Composition | | | |
|---|---|---|---|---|
| | 1 | 2 | 3 | 4 |
| Ingredient | Level (grams active per dose) | | | |
| Sodium carbonate | 4 | 4 | 4 | 4 |
| MGDA (Tri-sodium salt of methyl glycine diacetic acid) | | | 4.8 | 4.8 |
| Amylase | 0.05 | 0.05 | 0.025 | 0.025 |
| Protease | 0.05 | 0.05 | 0.025 | 0.025 |
| Sulphonated polyacrylate (Acusol ™ 588 supplied by Dow) | | 2 | | 2 |
| Polyacrylate (Sokalan ® PA25 supplied by BASF) | | 2 | | 2 |
| Lutensol ® TO7 (non-ionic surfactant supplied by BASF) | | | 0.90 | 0.90 |
| Plurafac ® SLF180 (non-ionic surfactant supplied by BASF) | | | 0.81 | 0.81 |
| Processing aids: Dipropylene Glycol and Glycerine | | | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFTs | Center for Test materials B. V. Netherlands | Melamine tile with double layer of baked cheese applied (DM08) | 2 |
| Cooked BOBO Tile | P&G internal technical monitor | Stainless steel tile with total 1 g of Mac and Cheese BOBO (Burnt On Baked On) applied | 2 |

Dishwasher monitors were purchased from Center for Test materials B. V. Netherlands. The following stains were used

| Code | Stain |
|---|---|
| DM08 | Double Baked Cheese |
| n/a-<br>made internally | Cooked BOBO (Baked On Burnt On) Tile |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main-wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains tested. The BOBO stains were analyzed before and after washing via gravimetric analysis (weighed). Percentage soil removal by weight is a 0-100 scale with 0%=no soil removal and 100%=full soil removal. The CFT stains were analyzed before and after washing via Image Analysis System to measure % stain removed, and stain removal index (SRI) was calculated. SRI is a 0-100 scale with 0=no stain removal and 100=full removal of the soil.

| | SRI CFT DM08 | % Soil (Stain) removal (BOBO Tile) |
|---|---|---|
| Example A (comparative) | 83.0 | 80% |
| Example B | 95.8 | 90% |

As shown in the table above Example B has a superior cleaning performance versus comparative Example A.

Example 8

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| | Automatic Dishwashing Composition | | | |
|---|---|---|---|---|
| | 1 | 2 | 3 | 4 |
| Ingredient | Level (grams active per dose) | | | |
| Sodium carbonate | 2.4 | 2.4 | | |
| MGDA (Tri-sodium salt of methyl glycine diacetic acid) | 2.4 | 2.4 | | |
| Methyl glucamine | | 5 | | 5 |
| Citric Acid | | | 1.57 | 1.57 |
| Sulphonated polyacrylate (Acusol 588 supplied by Dow) | | | 0.76 | 0.76 |
| Sodium citrate tribasic dihydrate | | | 3.42 | 3.42 |
| Lutensol ® TO7 (non-ionic surfactant supplied by BASF) | | | 0.90 | 0.90 |
| Plurafac ® SLF180 (non-ionic surfactant supplied by BASF) | | | 0.81 | 0.81 |
| Processing Aids: Glycerine & Dipropylene Glycol | | | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| CFT Tiles | Center for Test materials B. V. Netherlands | Melamine tiles with Dark Tea applied (DM14) | 2 |
| Real item teacups | Prepared internally according to IKW method | White colour teacups stained with tea | 2 |

Dishwasher monitors were purchased from Center for Test materials B. V. Netherlands. The following stains were used

| Code | Stain |
|---|---|
| DM14 | Black tea |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains tested were tested. The CFT stains were analyzed before and after washing via Image Analysis System to measure % stain removed, and stain removal index (SRI) was calculated. SRI is a 0-100 scale with 0=no stain removal and 100=full removal of the soil. The teacups were graded visually. The visual grading is a 0-10 scale with 0=no stain removal and 10=full removal of the soil

| | SRI CFT DM14 | Visual Grade Teacups |
|---|---|---|
| Example A (comparative) | 43.2 | 5.8 |
| Example B | 60.8 | 8.0 |

As shown in the table above Example B has a superior cleaning performance versus comparative Example A.

Example 9

Automatic dishwashing compositions were made as detailed herein below.

Preparation of Test Compositions

Pre-Wash compositions (herein Compositions 1 and 2) and Main Wash compositions (herein Compositions 3 and 4) were prepared as detailed below:

| | Automatic Dishwashing Composition | | | |
|---|---|---|---|---|
| | 1 | 2 | 3 | 4 |
| Ingredient | Level (grams active per dose) | | | |
| Sodium carbonate | 2.4 | 2.4 | | |
| MGDA (Tri-sodium salt of methyl glycine diacetic acid) | 2.4 | 2.4 | | |
| TEA (Triethanolamine) | | 5 | | 5 |
| Citric Acid | | | 1.57 | 1.57 |
| Sulphonated polyacrylate (Acusol ™ 588 supplied by Dow) | | | 0.76 | 0.76 |
| Sodium citrate tribasic dihydrate | | | 3.42 | 3.42 |
| Lutensol ® TO7 (non-ionic surfactant supplied by BASF) | | | 0.90 | 0.90 |
| Plurafac ® SLF180 (non-ionic surfactant supplied by BASF) | | | 0.81 | 0.81 |
| Processing Aids: Glycerine & Dipropylene Glycol | | | 0.33 | 0.33 |

The compositions above were pouched in polyvinyl alcohol (PVA) pouches and closed by heat sealing. For each example, a pre-wash composition pouched in PVA was attached to a main wash composition pouched in PVA with a linking piece of PVA (>20 mm), to create a single unit comprising a pre-wash pouch and a main wash pouch. The main wash PVA pouch is added into the detergent dispenser at the start of the cycle, with part of the linker portion and the pre-wash PVA pouch hanging outside of the drawer, but still attached to the main wash PVA pouch.

Test Items

The following items were sourced and added to each automatic dishwasher

| Test Item | Supplier | Description | Number of Replicates added and position in machine |
|---|---|---|---|
| Real item teacups | Prepared internally according to IKW method | White color teacups stained with tea | 2 |

Test Wash Procedure

Automatic Dishwasher: Miele, model GSL2

Wash volume: 5000 ml

Pre-Wash Water temperature: 35° C. (12 minutes)

Main Wash Water temperature: 50° C. (17 minutes)

Water hardness: 7 gpg

Pre-wash composition addition: Added at the start of cycle before the dispenser opens, when PVA is dissolved by the pre-wash water releasing the contents into the dishwasher.

Main Wash composition addition: Added when the detergent dispenser opens at the start of the main wash.

Cleaning Performance

The pre-wash compositions were added to the automatic dishwasher at the start of the pre-wash cycle, while the main wash compositions were added to the main wash at the start of the main wash cycle, amounts as detailed in the table below.

| | Pre-wash composition | Main wash composition |
|---|---|---|
| Example A (comparative) | Composition 1 | Composition 4 |
| Example B | Composition 2 | Composition 3 |

A dishwasher was loaded with the dishwasher monitors as detailed above which were washed as described. Two replicates for each of the stains were tested. The stains were analyzed before and after washing via visual grading. The visual grading is a 0-10 scale with 0=no stain removal and 10=full removal of the stain.

| | Visual Grade Teacups |
|---|---|
| Example A (comparative) | 2.9 |
| Example B | 6.6 |

As shown in the table above Example B has a superior cleaning performance versus comparative Example A.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

The invention claimed is:

1. A method of washing dishware in an automatic dishwashing machine, wherein the method comprises the steps of:

(a) placing an automatic dishwashing detergent water-soluble pouch, wherein the pouch comprises a water-soluble film that forms at least two separate chambers that are enclosed by water-soluble film, the separate chambers are:

(i) a first chamber; and (ii) a second chamber, wherein the first chamber is connected to the second chamber by a linking portion of water-soluble film, wherein the length of the linking portion of water-soluble film between the first chamber and second chamber is at least 0.5 cm, and wherein the first chamber and second chamber comprise detergent ingredients, in an automatic dishwashing machine such that the first chamber is placed inside a dispenser drawer in the automatic dishwashing machine and the dispenser drawer is closed, and the second chamber, whilst still being connected to the first chamber by the linking portion of film, hangs outside of the dispenser drawer in the washing zone of the automatic dishwashing machine;

(b) introducing first water into the washing zone of the automatic dishwashing machine and performing a pre-wash of the dishware contained therein, wherein during step (b) at least part of the water-soluble film that forms the second chamber dissolves such that at least some of the detergent ingredients comprised within the second chamber are released into the washing zone of the automatic dishwashing machine during this pre-washing step;

(c) optionally, removing at least some of the water from washing zone of the automatic dishwashing machine;

(d) introducing second water into the washing zone of the automatic dishwashing machine and performing a main wash of the dishware contained therein, wherein during step (d) the closed dispenser drawer is opened and at least part of the water-soluble film that forms the first chamber dissolves such that at least some of the detergent ingredients comprised within the first chamber are released into the washing zone of the automatic dishwashing machine during this main washing step; and (e) removing at least some of the water from the washing zone of the automatic dishwashing machine.

2. A method according to claim 1, wherein the method comprises the steps:

(f) introducing third water into the washing zone of the automatic dishwashing machine and rinsing the dishware contained therein; and (g) removing at least some of the water from the washing zone of the automatic dishwashing machine.

3. A method according to claim 1, wherein the method comprises the step:

(h) drying the dishware contained in the washing zone of the automatic dishwashing machine.

* * * * *